(12) United States Patent
Trandal et al.

(10) Patent No.: US 8,285,604 B1
(45) Date of Patent: *Oct. 9, 2012

(54) METHODS AND SYSTEMS FOR RECEIPT MANAGEMENT AND PRICE COMPARISON

(76) Inventors: David S. Trandal, Santa Barbara, CA (US); David Brahm, The Woodlands, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/843,765

(22) Filed: Jul. 26, 2010

Related U.S. Application Data

(63) Continuation of application No. 12/247,511, filed on Oct. 8, 2008, now Pat. No. 7,792,709.

(51) Int. Cl.
*G06Q 30/00* (2006.01)
(52) U.S. Cl. ..................................................... 705/26.7
(58) Field of Classification Search ................. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 6,938,002 B2 * | 8/2005 | Moskowitz et al. | ......... 705/26.1 |
| 7,069,240 B2 | 6/2006 | Spero et al. | |
| 7,552,087 B2 | 6/2009 | Schultz | |
| 7,742,989 B2 | 6/2010 | Schultz | |
| 2001/0051884 A1 | 12/2001 | Wallis et al. | |
| 2001/0056359 A1 | 12/2001 | Abreu | |
| 2002/0049652 A1 | 4/2002 | Moore et al. | |
| 2002/0188561 A1 | 12/2002 | Schultz | |
| 2003/0061104 A1 | 3/2003 | Thomson et al. | |
| 2004/0172260 A1 | 9/2004 | Junger et al. | |
| 2006/0282342 A1 | 12/2006 | Chapman | |
| 2007/0043600 A1 | 2/2007 | Solomon | |
| 2007/0050258 A1 | 3/2007 | Dohse | |
| 2007/0100713 A1 | 5/2007 | Del Favero et al. | |
| 2007/0265914 A1 | 11/2007 | McClung, III | |
| 2008/0028473 A1 | 1/2008 | Cehelnik | |
| 2008/0033847 A1 | 2/2008 | McIntosh | |
| 2008/0046276 A1 | 2/2008 | Hamilton et al. | |

OTHER PUBLICATIONS

William Swinyard, "Retailing trends in the USA: competition, consumers, technology, and the economy." International Journal of Retail & Distribution Management, v25, n8-9, p. 244(12), Aug. 1997. Retrieved from Dialog File: 148, #10162037.*
Article: Sharma, Amol and Vascellaro, Jessica E.; "Phones Will Soon Tell Where You Are"; Wall Street Journal, Mar. 28, 2008.
Article: Lawton, Christopher; "The War on Returns"; Wall Street Journal, May 8, 2008.

* cited by examiner

*Primary Examiner* — Naeem Haq

(57) ABSTRACT

The present invention relates to shopping assistance solutions, and in particular, to methods and systems for maintaining purchase records, creating shopping lists, and comparing merchant pricing. The user experience in performing shopping functions is simplified and enhanced over existing methods.

20 Claims, 43 Drawing Sheets

```
                                              4320
                                                4330
                                                                4430

Bottled Water Special!
Buy one get one free!

Sales Receipt
Shell
1060 State Street
Santa Barbara, CA 93101

Date 09/07/08  11:42AM
Invoice #    240010
Auth#     438750
Shell MC  Account Number
XXXX XXXX XXXX 7722
Smith/John Pump      Product     $/G
 07        Unld       $3.859

Gallons    Fuel       Total
 7.113                $27.45

Fountain Soda 24 Oz $.89
With this Coupon   !!
Drive Safely
```

METHODS AND SYSTEMS FOR RECEIPT MANAGEMENT AND PRICE COMPARISON

REFERENCE TO RELATED APPLICATIONS

The application is a continuation of U.S. application Ser. No. 12/247,511, filed Oct. 8, 2008, which is hereby incorporated by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF THE INVENTION

The present invention relates to retail receipt management, shopping list creation, and best price determination using digital imaging, data processing and data/voice networks.

BACKGROUND OF THE INVENTION

Most consumers have access to multiple local retail outlets for their shopping convenience (e.g., groceries, pharmacy, gasoline, etc.). In many cases, several retailers offer the same or similar items at different prices. It is difficult for consumers to determine, particularly on a day-to-day basis, which items to purchase at which retailers to minimize their expenses. As a result, consumers waste millions of dollars annually by purchasing items without the benefit of convenient, current, and accurate price comparisons.

In addition, most consumers create a shopping list before heading to the retailer. This manual list creation takes time and is often error prone. Items missed on a trip to the retailer result in consumer inconvenience and additional expense.

SUMMARY OF THE INVENTION

Example embodiments listed create a more convenient, reliable, complete, and secure record keeping process for purchased items. In addition, embodiments of the present invention provide methods and systems to enable a service provider to offer price comparison services (or shopping assistance) that include searching, organizing, and storing purchase records and to assist consumer purchase decisions. In addition, internal and external databases/data stores are queried to link or further enhance the data/objects organized and stored related to consumer purchases. In addition, certain methods and systems described herein facilitate the creation of shopping lists which optionally include local price comparisons. In addition, certain methods and system described herein provide price alert notification services related to items typically purchased by a consumer.

BRIEF DESCRIPTION OF THE DRAWINGS

Example embodiments will now be described with reference to the drawings summarized below. These drawings and the associated descriptions are provided to illustrate example embodiments of the invention, and not to limit the scope of the invention.

FIG. 4 illustrates an example gasoline purchase receipt.

FIG. 10 illustrates another example Web-based SA user interface display of a user's stored receipt for user individual item examination and modification.

DETAILED DESCRIPTION OF THE PRESENT INVENTION

The methods and systems of the present invention simplify and enhance the consumer shopping experience and item purchase record capture and reconciliation process.

Unless otherwise indicated, the functions described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a Personal Computer (PC) system or data device, other computer or electronic systems can be used as well, such as, without limitation, an interactive television, a network-enabled personal digital assistant (PDA), a network game console, a networked entertainment device, a smart phone (e.g., with an operating system and on which a user can install applications) and so on.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

In addition, while certain user inputs or gestures are described as being provided via phone key presses, data entry via a keyboard, or by clicking a computer mouse or button, optionally, user inputs can be provided using other techniques, such as by voice or otherwise. The example screen layouts, appearance, and terminology as depicted and described herein, are intended to be illustrative and exemplary, and in no way limit the scope of the invention as claimed.

The functionality, operation, and implementation for an example Shopping Assistant (SA) system will now be described in further detail.

Figure 1:
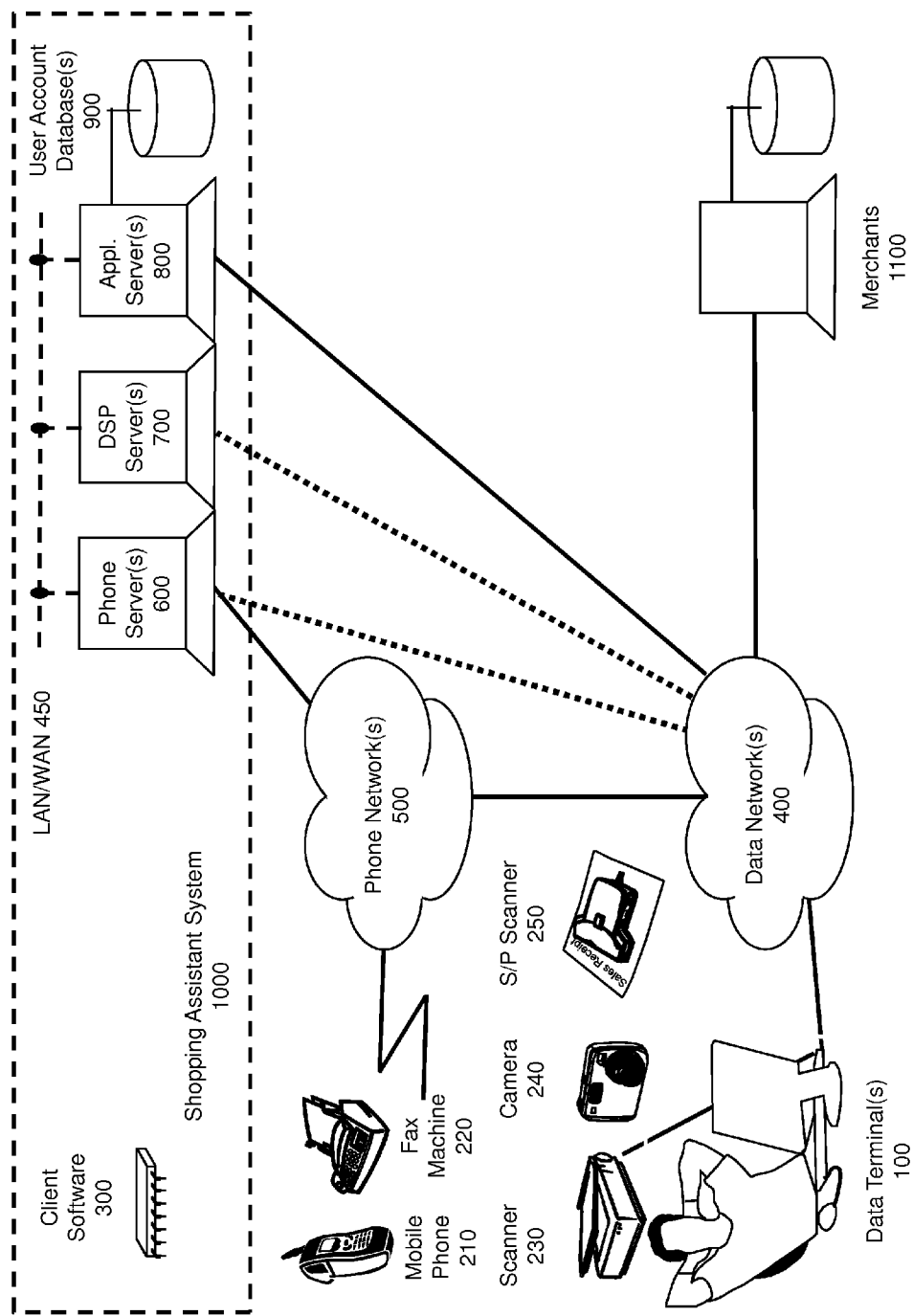
FIG. 1 illustrates an example network operating environment for a Shopping Assistant (SA) system.

FIG. 1 illustrates an example SA system 1000 that can be used in accordance with the present invention. As illustrated, the SA system includes a plurality of user mobile phones 210 which function as receipt scanners. The mobile phones 210 are connected to a phone (wireless) network 500 and data network 400. Optionally, wireline phones are connected to a phone (wireline) network 500. Optionally, the mobile phones 210 are capable of receiving one or more software applications 300 over a phone network 500. Optionally, the mobile phones 210 are capable of taking pictures of receipts and these receipts can be downloaded over a phone network 500 and/or data network 400 to a server 800. Optionally, web server 800 offloads image and speech processing to Digital Signal Processing (DSP) Servers 700 to assist in image processing of scanned documents or purchase receipts. Live operators can also serve to assist and/or replace the DSP servers 700 in carrying out these services. Optionally, other types of devices with image scanning capabilities can be utilized with the SA system 1000. For example, a facsimile device 220 can be used to scan and transmit an image across the phone network 500 and received by the phone server 600 of the SA system 1000.

As further illustrated, the SA system 1000 interacts with a plurality of computer/data terminals 100. The data/computer terminals 100 can be a personal computer having a monitor, keyboard, memory, a disk drive, and a data communication interface. In addition, the computer terminal 100 can be an interactive television, a networked-enabled personal digital assistant (PDA) or the like. The data/computer terminals 100 are connected to a data network 400 (e.g., the Internet or a corporate LAN or WAN). The data network 400 includes wireline data networks (like the public Internet accessed using dialup or DSL/cable modems) and wireless data networks (e.g., wireless mobile and WiFi data networks).

As further illustrated, the SA system 1000 includes a plurality of conventional scanners 230 that can optionally be connected to and integrated with a data terminal 100. Optionally, a digital camera 240 can be used to take a picture of a receipt or document and download the image to a data terminal 100. Scanned images can be stored within a data terminal 100 or transmitted over a data network 400 (e.g., the Internet or a corporate LAN or WAN). Optionally, a plurality of more sophisticated scanners (e.g., self-standing scanners not requiring a data terminal 100) or specialized receipt scanners 250 (e.g., a special purpose scanner built explicitly to scan merchant receipts) are directly connected to a data network 400 (e.g., the Internet or a corporate LAN or WAN). These specialized receipt scanners 250 can optionally include a display, an input keyboard, computer memory, a disk drive, and a data communication interface (including wireless mobile and WiFi).

As further illustrated, the SA system 1000 optionally interconnects with merchant databases/data stores 1100 over a data network 400. The SA system 1000 optionally accesses the merchant databases/data stores 1100 to retrieve merchant item information (e.g., item naming, pricing, etc.), user transaction records (e.g., a listing of user purchases, amount, line item costs, etc.), and customer loyalty status and program rules.

In an example embodiment, a downloadable, application software program 300 connects to and communicates with a phone server 600 and/or a web server 800 either directly via the phone network 500 or indirectly by linking the wireless network 500 with the data network 400. The application program 300, executing on a subscriber's mobile phone 210 or other host, can interact with the optical scanning capabilities of the mobile phone to receive an image or the content of an image. Optionally, the application program 300 can be used to directly transmit data to the SA system 1000 (e.g., by transmitting a message over the Internet). Optionally, the application program 300 can make the user's online presence known to the SA system 1000 (e.g., by periodically transmitting a message over the Internet to the SA system 1000). Optionally, the application program 300 can be used to receive and store in a computer readable medium a password from the user. For example, the user invokes the application (if the application is not already active) and enters a password (e.g., by key pressing or speaking a password). Optionally, the application program 300 can be used to receive and store in a computer readable medium a copy of a password from a SA service provider 1000 that the user has previously registered with. For example, the SA system transmits a message over a wireless data connection to the application program 1000 or via a Short Message Service (SMS). SMS is a wireless messaging service that enables the transmission of messages between mobile subscribers (and their phones) and external systems such as electronic mail services. Optionally, the application program 300 can display user instructions, status, success, and failure messages to the user. Optionally, the application program 300 provides a user interface through which a user can enter data and/or respond to messages. Optionally, the application programs functional capabilities can be integrated into and can be a part of another application (e.g., a telecommunications client or a contact management client).

The SA Servers 600, 700, and 800 are interconnected either through Data Network 400 (e.g. the public Internet—as depicted by the dotted line connections in FIG. 1) or via a private Local Area Network (LAN) or private Wide Area Network (WAN) 450—as shown by the dashed line connections in FIG. 1.

The SA system 1000 in this example contains centralized databases and/or general-purpose storage area, optionally including, but not limited to, some or all of the following: a customer/user account database 900, a purchase receipt image store, a dictionary or library of image patterns (e.g. merchant receipt logos), a dictionary or library of manufacturers and associated product items, merchant Stock Keeping Units (SKU) identifiers, a dictionary of keyword search terms matching item and merchant names, locality information (e.g., zip codes, street address, city, state). The storage subsystem of the SA optionally stores a dictionary of product terms or labels. The storage subsystem of the SA optionally stores a dictionary or library of product items, associated common names, abbreviated names, and prices across various merchants.

The Shopping Assistant system optionally includes a database of merchant reward programs and practices. This information and a user's current status can be made available to a user upon request. Optionally, the SA system interfaces to a merchant's reward program for user status. Optionally, the SA system actively notifies a user if a reward level has been achieved or if a reward is nearing expiration.

The SA system stores a history of price changes for a given item. Rapid fluctuation in prices can optionally be detected by the SA system and SA personnel can be notified based on configurable thresholds (e.g., two price changes within the same day at the same retailer).

The user interfaces for access to the stored/archived information are optionally device specific. By way of example, the user interface for a computer may be provided via a widget/gadget, a more traditional web portal, and/or an executable client. For a mobile handset, the interaction is optionally tailored to the available display space and interaction mechanism, where the functionality is similar although optionally reduced in scope. For example, for a smart phone handset, certain logos, menus, images, and the like can be reduced in relative size or eliminated.

The SA system in this example contains a phone server subsystem 600 with call processing capabilities. These servers optionally provide interactive voice response, voice messaging, voice recognition, text-to-speech services and voice message transcription to natural-language text.

The Shopping Assistant system 1000 optionally includes a Customer Relationship Management (CRM) subsystem. The CRM engine can data mine certain information with respect to a user's purchasing behavior and usage of the SA system. For example, the SA system can promote certain products and/or services based on items purchased and/or locations where items have been purchased. For example, if a user frequents a particular gas station/merchant, the SA system might promote a rewards credit card for that particular brand of gasoline.

In this example, the SA servers 600, 700, and 800 are optionally centralized at a given location, or distributed to a number of locations. The SA system 1000 can be implemented as a standalone system (e.g., a SA system used by a number of service providers) or the SA system can be integrated into a service provider's internal systems (e.g., those systems employed to provide users online information services). Optionally, the Shopping Assistant system is provided by a telecommunication carrier (e.g., Verizon) to service providers (e.g.'s, Merchants, Google, or Intuit). Optionally, there are no charges to use the SA service. Optionally, the voice and/or data transactions between a user's mobile device and one or more SA servers are not charged to the user but to the service provider or telecommunication carrier/service provider. Optionally, the SA system 1000 is connected to a data communication network 400 and a wireless network 500. The SA system interconnects with the wireless network 500 using telecommunication interfaces (e.g., SS7) and via data communication networks using a secure router subsystem and an SMS server subsystem which optionally serves as a mail relay to transmit and receive SMS and MMS messages via a Short Message Service Center (e.g., an SMSC operated by a network carrier). These subsystems of the SA system are optionally interconnected via a Local Area Network (LAN), a Private Wide Area Private Network (WAN), and/or a Public Wide Area Network (e.g., Internet).

Optionally, the SA system includes a presence management subsystem. Presence managers optionally authenticate and track an application's online presence and interact with a given application (e.g., an application program 300 hosted on a user's mobile phone 210 or data terminal 100) as information (e.g., passwords, scanned receipts) is synchronized with the centralized databases/data stores to provide the user secure, reliable, and timely data transmissions and synchronized user interactions.

Optionally, the SA system includes a Global Positioning System (GPS) resolution and mapping subsystem. The resolution and mapping system optionally determines a user's location. This location information can be used to provide the user with enhanced information content. For example, the SA system can optionally provide a user with their customized grocery list for the retailer/merchant they are currently at without the user having to specify their location. Optionally, the SA system interfaces to an externally hosted and managed GPS resolution and mapping system.

Optionally the SA system includes a purchase receipt identification subsystem. The subsystem includes various programs and/or devices including a control program which submits images/files to an internal or independent device (e.g., a dedicated device including hardware and/or software) specialized for identifying if there are multiple receipts within an image using a combination of image filtering, pattern recognition, color change detection, receipt outline detection, repetitious text, text alignment, conventional receipt dimensions, etc. and receives back one or more files each consisting of one receipt together with a set of values representing probability or confidence values relating to the item recognition and other features. Optionally, the receipt recognizer can make the output available to a human operator (or notify the user) if the confidence values fall below a threshold value. Optionally, the receipt recognizer uses a different recognition engine and/or item database/dictionary based on user or merchant specific characteristics including but not limited to: the geographic region of the user (e.g., determined from the user's mobile phone identifier and/or user account registration); standardized merchant receipts; standardized credit card receipts; etc.

Figure 3:
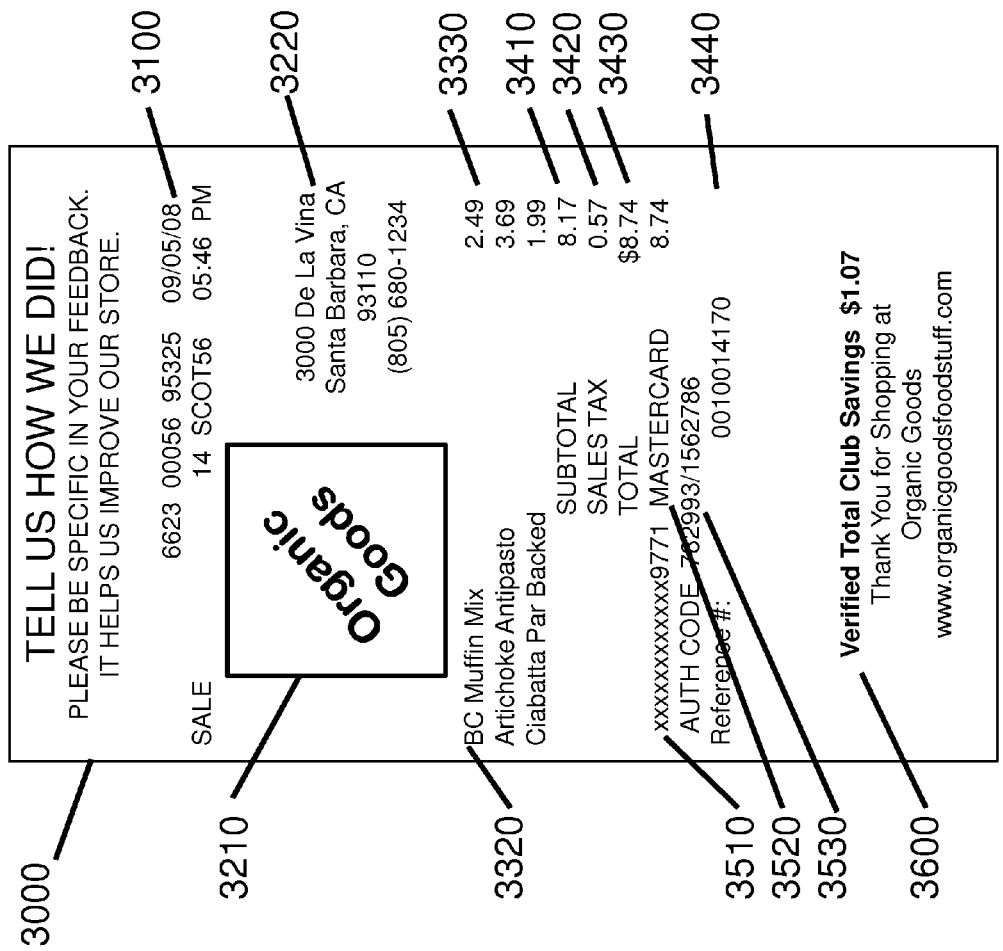
FIG. 3 illustrates an example grocery merchant purchase receipt.

The SA system 1000 contains an image/digital signal processing subsystem 700 for merchant receipt parsing and element recognition within a receipt. The subsystem 700 performs word and pattern recognition by comparing items in an image (or scanned receipt) against a database of merchant receipt names and logos, and/or other techniques and/or algorithms (e.g., using simple Bayesian classifiers or more powerful neural networks). FIG. 3 illustrates an example receipt where a unique merchant icon, "Organic Goods" 3210 is present on the receipt. The subsystem 700 includes a control program which submits images/files to an internal or independent device (e.g., a dedicated device including hardware and/or software) specialized for word and pattern recognition, and receives back a text file that includes the identity of the merchant together with a set of values relating to the merchant recognition and other features. Optionally, the merchant receipt recognizer uses a different recognition engine and/or merchant receipt database/dictionary based on user specific characteristics including but not limited to: the geographic region of the user; language; demographics, psychographics, etc. Optionally, The merchant receipt recognizer can be personalized or tuned based on direct feedback from a user (e.g., user changing the name of the merchant) or indirect feedback (e.g., user item search requests). Initially, the merchant recognizer is populated with a wide collection of known receipts and/or merchant logos.

The SA system 1000 optionally assists the user (or service provider personnel) by identifying problematic merchant receipt images which are likely to yield Optical Character Recognition (OCR) results of low certainty or confidence. Low certainty can result from many sources including poor receipt quality, an improper scan, a crumpled receipt, unknown merchant, etc. Optionally, a low certainty merchant recognition or unknown recognition may cause the output to be routed to humans for review and/or manual merchant recognition. New merchants can be automatically or manually added to the merchant recognizer library.

The SA image processing subsystem 700 enhances the legibility of poor quality receipt images. For example, some receipts are difficult to read because the original ink has faded or the original receipt printer was malfunctioning. The SA system processes the scanned in receipt image and enhances the definition of the printed elements of the receipt (e.g., darkens print by enhancing the background contrast).

The SA web server 800 controls user access to recorded database objects including purchase receipts. Users can sort and search information by merchant, by item type, by date, by location, and by item price. For example, a user can search for all receipts from a given retail merchant. In addition, the system creates a knowledge base of merchant descriptors as users of the system enter search terms. So if the user is searching for "The Home Depot®" receipts, the user can enter in different variations (e.g., Home Depo, Home Deep, Depo, etc.).

The kind of objects that can be stored by a SA service provider is optionally not limited to a particular set of objects. Therefore, the list below includes nonlimiting example illustrative objects that people can relate to and make use of if they are readily accessible but is not meant to be a complete list:

Purchase Receipt—information regarding a purchase transaction available on a purchase receipt, such as, by way of example, some or all of the following (see FIG. 2, FIG. 3, and FIG. 4): time and date of purchase 2100, 3100, and 4100; transaction reference/invoice number 2440, 3440, and 4440; retail merchant (e.g., derived from merchant logo 2210 and 3210 or from direct receipt text 4210); retail merchant address (and optional phone number) 3220 and 4220; merchant item identifier (e.g., SKU) 2311, 2312, and 2313; merchant item description 2321, 2322, 2323, 3320 and 4320; merchant item purchase price 2331, 2332, 2333, 3330, and 4330; quantity or size of items purchased 4340; purchase subtotal 2410 and 3410; sales tax 2420 and 3420; total purchase price 2430, 3430, and 4430; payment method 2520, 3520, and 4520; card authorization number 2530, 3530, and 4530; card number and/or last four digits of card number 2510, 3510, and 4510; card member name 4540; merchant rewards accumulation or contribution; merchant return policy 2600; merchant item savings 3600; next sale discount coupons 4600; and other optional advertising 4700. Optionally, each purchased item that the SA system 1000 stores will have a database record for the item manufacturer, the item model number (where available), and the generic name of the item.

Credit Card Receipt—information regarding the payment method and the type of card (e.g., Visa, MasterCard, American Express, Discover)

Item Manufacturer—manufacturer of a purchased item.

Item Serial Number—a unique number assigned for identification purposes.

Item Universal Product Code—a specific type of barcode that is widely used by merchants for tracking items.

Some or all of the information described above is obtained directly from a user (or their scanned purchase receipt or credit card receipt for example) or merchant database/data stores. Some of the information is derived from common global SA system libraries. This optionally includes item manufacturer, common item names, item type, item category, item class, etc.

The captured/stored data is organized and is made readily accessible to join various pieces of information of interest (e.g., frequency of purchase). Some or all of the following techniques are optionally used to help organize the data and make it more accessible to the user:

Optical Character Recognition (OCR)—OCR (software that translates text images into computer readable text) may be applied to purchase receipt images to facilitate search and item selection and to make these receipts more usable and optionally editable (e.g., attach a customized name to a purchased item).

Optical Icon/Logo Recognition—pattern matching optionally is applied to purchase receipt images to determine retail merchant to facilitate search and display.

Text-to-Speech—optionally purchase receipt text is converted to speech (e.g., for item selection and/or confirmation by the user).

Figure 2:
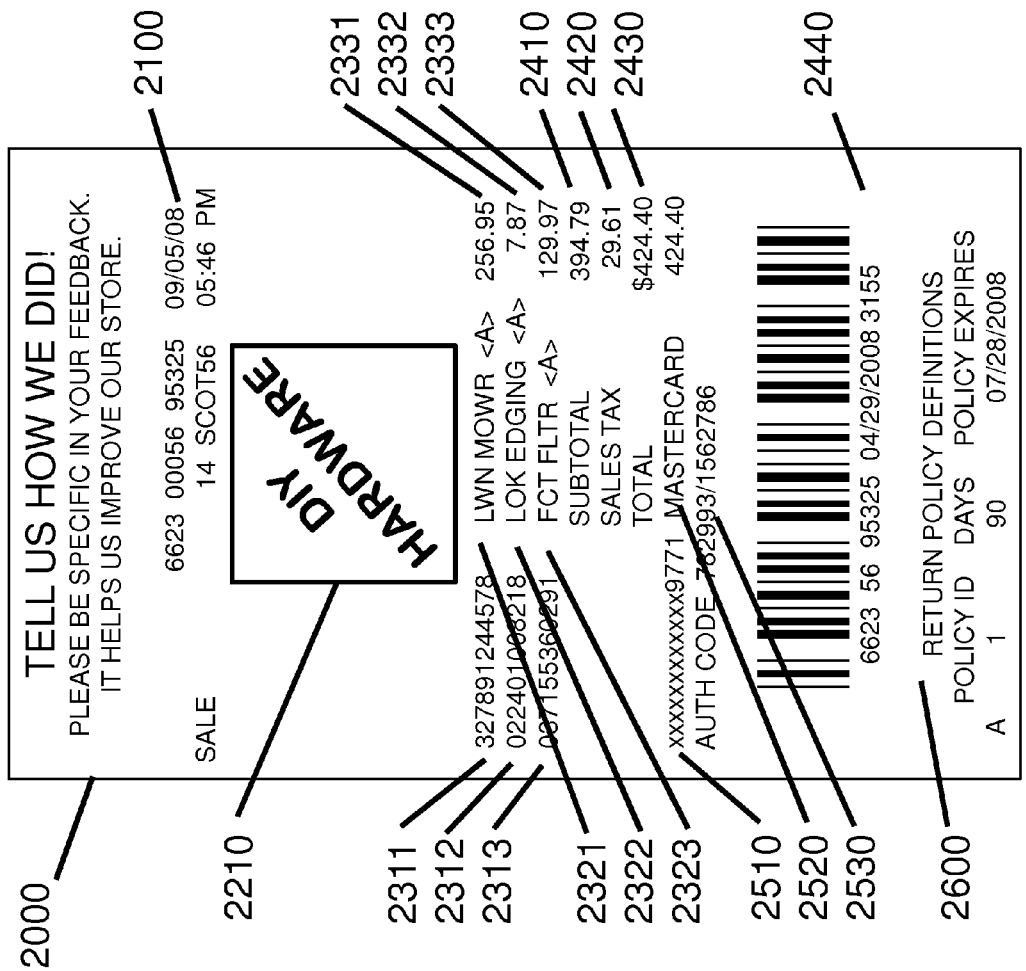
FIG. 2 illustrates an example hardware merchant purchase receipt.

The Shopping Assistant system optionally includes a database/data store and/or an interface to an external database/data store 1100 managed by a merchant that allows the SA system to determine a specific item purchased and its attributes (e.g., container size). In an example method of obtaining additional information regarding an item purchase, the SA system electronically accesses the merchant database and queries the merchant database using as indices the conventionally terse receipt description, date and time, and price. For example the description, "BC Muffin Mix" at $2.49 (regular price $3.75) purchased at a specific merchant identifies the purchase of a 22 ounce package of Betty Crocker Muffin Mix. Alternatively, the merchant database can be queried by the SA system using as indices, the transaction date and/or time, a user identifier (e.g., user's telephone number, club/reward membership number, credit card number), the conventionally terse item description, and/or price. For example, the merchant, the user's club reward number, time and date, the item description "BC Muffin Mix", and price $2.49 identifies the purchase of a 22 ounce, twice blueberries, Betty Crocker Muffing Mix. Alternatively, the merchant database can be queried by the SA system using a unique identifier (e.g, SKU). An item identifier, the Stock Keeping Unit or SKU 2311, 2312, 2313 is conventionally printed on the receipt next to the brief description of the purchased item 2321, 23211, and 2322 as can be seen in FIG. 2. The SKU allows the merchant to uniquely identify an item and is conventionally used by the merchant for managing inventory. The SA server 800 translates the purchased item SKU 2311, 2312, and 2313 into a more specific or general item description for the user of the SA system 1000. The SA system 1000 optionally queries one or more internal or external databases/data stores to determine additional product attributes (e.g., size).

The SA system can also analyze the OCR output to determine if the user is participating and/or if the merchant is offering a rewards program. Conventionally, customer loyalty program status is identified in a separate portion of the receipt. In addition, the SA system 1000 can query one or more databases/data stores to determine the terms and conditions of any redeemable reward. Optionally, a consolidate rewards/club status/benefit across multiple merchants can be provided in a web or phone display, or via a notification (e.g., widget/gadget, text message, etc.). Optionally, the SA system can publish to the user a recommended merchant(s) that the user can purchase their groceries from in order to achieve a reward level (or before a reward level period closes).

The Shopping Assistant system includes a notification subsystem. This subsystem enables the Shopping Assistant system to display alerts/notification messages (e.g., in a Widget application on a data terminal 100 or mobile device 210), transmit notification/alert messages to a user's mobile device 210, transmit notification/alert messages to a user's email address, transmit notifications/alert messages to an instant message application, etc. For example, the Shopping Assistant system may transmit an alert when the price of a collection of items falls below a configurable threshold over a wireless data connection via a Short Message Service (SMS) or Multi-Media Messaging Service (MMS). SMS and MMS are wireless messaging services that enable the transmission of messages between mobile subscribers (and their phones) and external systems such as electronic mail services. In another example, the phone server 600 may place an outbound call and play an audio message alerting the user to the availability of an item previously out-of-stock.

The SA system also contains a sophisticated subsystem for cataloging and storing items scanned by the user. Conventionally, the item name identified on the receipt is too cryptic or a name not easily remembered (or a name not recognized by other family members using the shopping list). For example, one of the purchased item in FIG. 3 is a Betty Crocker Blueberry Muffin Mix listed on the receipt as "BC Muffin Mix" 3320. It might be difficult for the user or a family member to recall this abbreviation so the selected item is indexed to a more specific search terms (e.g. Better Crocker Blueberry Muffin Mix). The SA system 1000 also allows the user to specify a custom name for the item, one which they can easily remember (as is discussed below in FIG. 10). The SA system continually updates and expands the database of terms by using user customized terms, user search entry keywords, analysis of merchant receipts, etc.

The SA system 1000 optionally creates individualized shopping lists. The SA system tracks and stores items purchased by the user. The stored information is used by the system to create a shopping list of items for the convenience of the user. For example, the SA system can generate a list of all items the user has ever purchased (e.g., since becoming a user of the system). Alternatively, the SA system can generate a list of all items the user has purchased more than once or a list of the top 10 (or other count of) most frequently purchased items. The SA system can generate a list of items purchased at one merchant or across all merchants. Optionally, item lists can be sorted by type (e.g., produce, dairy, meat, etc.). Optionally, item lists can also be sorted by item price.

The SA system 1000 optionally uses a combination of networked users and access to one or more databases/data stores to determine price optimized shopping lists. Knowing the price of items at various local merchants enables the SA system 1000 to create price optimized shopping lists/data for the user. For example, if the user specifies a list of items (or the SA system 1000 creates a list of items for the user), the SA system 1000 can query one or more databases/data stores to determine where items can be purchased to minimize the user's overall expenses. One method of creating a pricing database is by continually analyzing scanned user receipt data. Another method of creating a pricing database is by accessing merchant databases/data stores after a user purchases items at a merchant and downloading a list of the items purchased. Alternatively, the SA system can directly access merchant databases/data stores containing merchant items, pricing, and item availability.

The SA system 1000 optionally facilitates the collection and delivery of merchant items. Optionally, the SA system 1000, in response to a user request (e.g., a user gesture selecting a confirmation button in the SA system web display) sends a shopping list to a merchant. Upon receiving the request, the merchant collects the specified items, scans the items for checkout, and bags the items. When the user arrives at the merchant, the user simply picks up their bagged purchase and checks out (pays or authorizes payment for the items). Optionally, the merchant delivers the items requested by the user, saving the user a trip to the merchant.

The SA system 1000 optionally identifies for the user specific low price or sale items at a specified merchant. For example, if the user specifies or selects a merchant they intend to visit, the SA system 1000 can identify to the user a list of items which are on sale or offered at a lower price (relative to the user's purchase history). Configurable notification thresholds can be optionally set for price differentials. For example, if an item price differential is 5% lower than the historical average, the user may not be interested. If however, the price differential exceeds 20%, the user may be interested. Optionally, this low price/sale item information for a specified set of merchant can be presented in the CRM areas of the SA system 1000 (e.g., web CRM display 11600, see FIG. 11).

Optionally, the SA system 1000 includes merchant location information in shopping list creation. For example, the SA system can identify for the user the most convenient shopping experience (e.g., minimizing the travel time). Optionally, the SA system 1000 factors in expense associated with distance traveled in calculating the optimal shopping lists. For example, if items can be purchased for a savings at a big box merchant, but the merchant is 30 miles away, the cost of travel may eliminate the savings to the user. Optionally, the SA system uses mobile GPS coordinates and/or user profile information (e.g., home address and automobile type or Miles Per Gallon (MPG) to determine travel costs).

Optionally, the SA system 1000 can query internal or external databases/data stores to determine optimal routing for the purchase of items at one or more merchant. Optionally, the SA system 1000, can query internal or external databases/data stores to determine driving/travel (including bus schedules) directions based on the user's GPS coordinates (e.g., from the user's mobile phone) and one or more user selected merchants.

Optionally, the SA system 1000 can detect out-of-stock conditions and restocked conditions. Optionally, the SA system 1000 queries merchant databases/data stores for item availability at the time of shopping list creation. If an item is out-of-stock, the subscriber can be warned of the out-of-stock condition and/or the SA system can recommend an alternative location to purchase the item. Optionally, the SA system 1000 can use the notification subsystem to notify the user when an out-of-stock item becomes available (e.g., by detecting the purchase of an item by another SA system user, by periodically querying a merchant's inventory database, or using a direct server to server notification interface to request a message when status conditions change).

FIG. 2 illustrates an example purchase receipt 2000 from a hardware merchant. The example receipt includes a retail merchant logo 2210 and a listing of purchased items including the name (e.g., 2321, 2322, and 2323), SKU number (e.g. 2311, 2312, and 2313), and the price of each item (e.g., 2331, 2332, and 2333). Purchase receipts conventionally also include the purchase date 2100, method of payment 2520, and if a credit card purchase the last 4 digits of the credit card number 2510 and credit card authorization number 2530. Some receipts also include a reference number for the transaction 2440. Some purchase receipts also contain a merchant return policy 2600.

FIG. 3 illustrates another example purchase receipt 3000 from a grocery merchant. The example receipt includes a retail merchant logo 3210 and a listing of purchased items including the name 3320 for each purchased item, and the price 3330 of each item. Purchase receipts conventionally also include the purchase date 3100, method of payment 3520, and if a credit card purchase, the last 4 digits of the credit card number 3510 and credit card authorization number 3530. Some receipts also include a reference number for the transaction 3440 and address and/or phone number for the merchant location 3220. Purchase receipts conventionally include a subtotal, tax total, and total amount 3410, 3420, and 3430 respectively. Additionally, some purchase receipts also contain information about frequent shopper club membership savings and/or reward points 3600.

FIG. 4 illustrates another example purchase receipt 4000 from a gasoline merchant. The example receipt includes the items purchased including the fuel type 4320, the fuel price 4330, and the number of gallons 4340. Purchase receipts conventionally also include purchase total 4430, purchase date 4100, and the method of payment 4520. Additionally, if a credit card purchase, a credit card authorization number 4530, the last 4 digits of the credit card number 4510 and credit card owner's name 4540 are also provided. Some receipts also include a reference number for the transaction 4440. Gasoline purchase receipts conventionally include the merchant's name or Logo 4210 and the retail location 4220. The receipt may also include advertising 4700.

In an example embodiment, a widget application 5000 (see, for example FIG. 5) connects to and communicates with a SA system via the Internet, an Intranet, or other data network. The widget application, executing on a user's computer terminal or other host, can be used to, for example, login and authenticate into a SA web site, navigate directly to different sections of a SA web site, receive image files (e.g., of a scanned receipt), alert the user of important events, and display selected information. In this example embodiment, the Widget 5000 can be in one of two modes, receipt processing and normal display. In normal operational display mode 5000, the widget displays the name/branding of the SA service provider 5100. Optionally, if the user double clicks on the branding control 5100, the user's browser is activated (if not already active), the user is auto-logged into their SA service provider account, and the SA service provider welcome page (see FIG. 11 for an example SA user account home/welcome page) is displayed. The example widget also has an alert display 5200 which notifies the user of important information or events (e.g., a formerly out-of-stock item that has recently been restocked). In another example, the alert icon 5200 might flash yellow when a redeemable club reward is within a week from its expiration date. Optionally, a user gesture such as double clicking on the alert icon/control causes the activation of the user's browser (if not already active), the user to be auto-logged into their SA service provider account, and the SA service provider welcome web page to be displayed (see FIG. 11 for an example SA user account home/welcome page). The welcome page displays the content of the alert messages which can be reviewed and optionally individually deleted. Additionally, an active alert notification (e.g., flashing icon) can be acknowledged/cleared (transitioned to a non-flashing alerting state) by a single click (or double click as described above) on the alert icon 5200. Optionally, the widget's active alert can be cleared by a user logging into their SA system account and deleting any listed alerts. The widget's alert notifier 5200 can also optionally display the number and/or type of alert messages for review by the user. The widget also optionally contains an account information access control. Selecting (e.g., single or double clicking) the account control 5300 activates the user's browser (if not already active), auto-logs the customer into their account and displays their account information (e.g., name, password, email address for updates and notifications, mobile phone number for notifications and/or security authentication, etc.). The widget 5000 also optionally contains a control "Groceries" 5400 for accessing stored grocery receipts and for accessing web pages for grocery list creation and price comparisons. Selecting the "Groceries" control 5400 activates the user's browser (if not already active), auto-logs the customer into their account and begins the first step in creating a grocery list (see FIG. 12 for an example). The widget 5000 also optionally contains a control "Gasoline" 5500 for accessing lowest price gasoline retailers. Selecting the "Gasoline" control 5500 activates the user's browser (if not already active), auto-logs the customer into their account and presents a list of low price gasoline retailers (see FIG. 19 for an example). The widget 5000 also optionally contains a control "Hardware" 5600 for creating a price comparison shopping list and/or checking item availability. Selecting the "Hardware" control 5600 activates the user's browser (if not already active), auto-logs the customer into their account and begins the first step in creating a shopping list (see FIG. 12 for an example). The widget 5000 also optionally contains a control "Pharmacy" 5700 for creating a price comparison shopping list and/or checking item availability. Selecting the "Pharmacy" control 5700 activates the user's browser (if not already active), auto-logs the customer into their account and begins the first step in creating a shopping list (see FIG. 12 for an example). Selecting the "My Receipts" control 5800 activates the user's browser (if not already active), auto-logs the customer into their account and displays a top-level view of their stored receipts (see FIG. 8 for an example).

Figure 5:
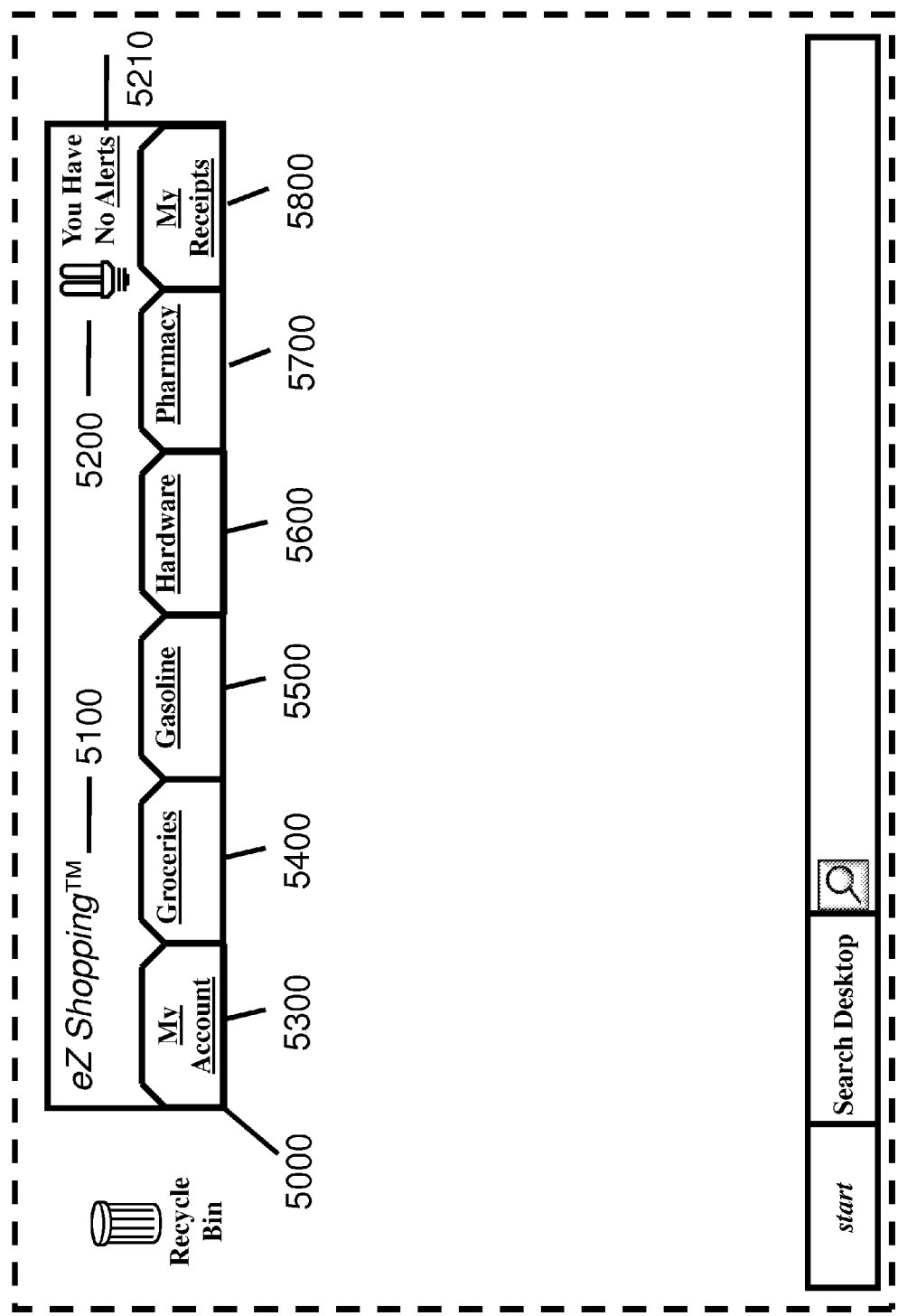
FIG. 5 illustrates a first example Widget-based SA alert notifier and Web-access navigational Graphical User Interface (GUI).
Figure 6:
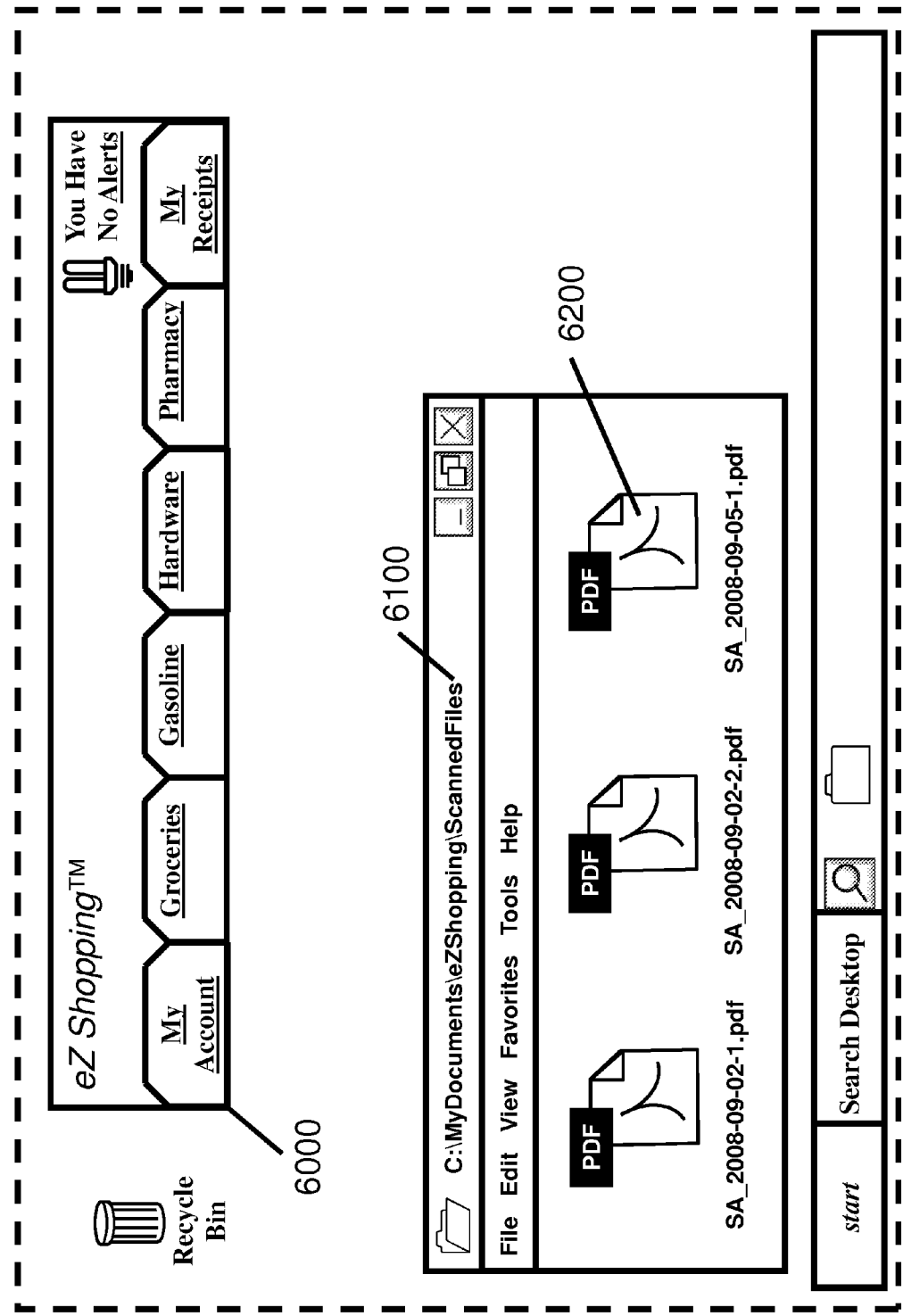
FIG. 6 illustrates another example Widget-based alert notifier and Web-access navigational GUI together with an open file folder.
Figure 7:
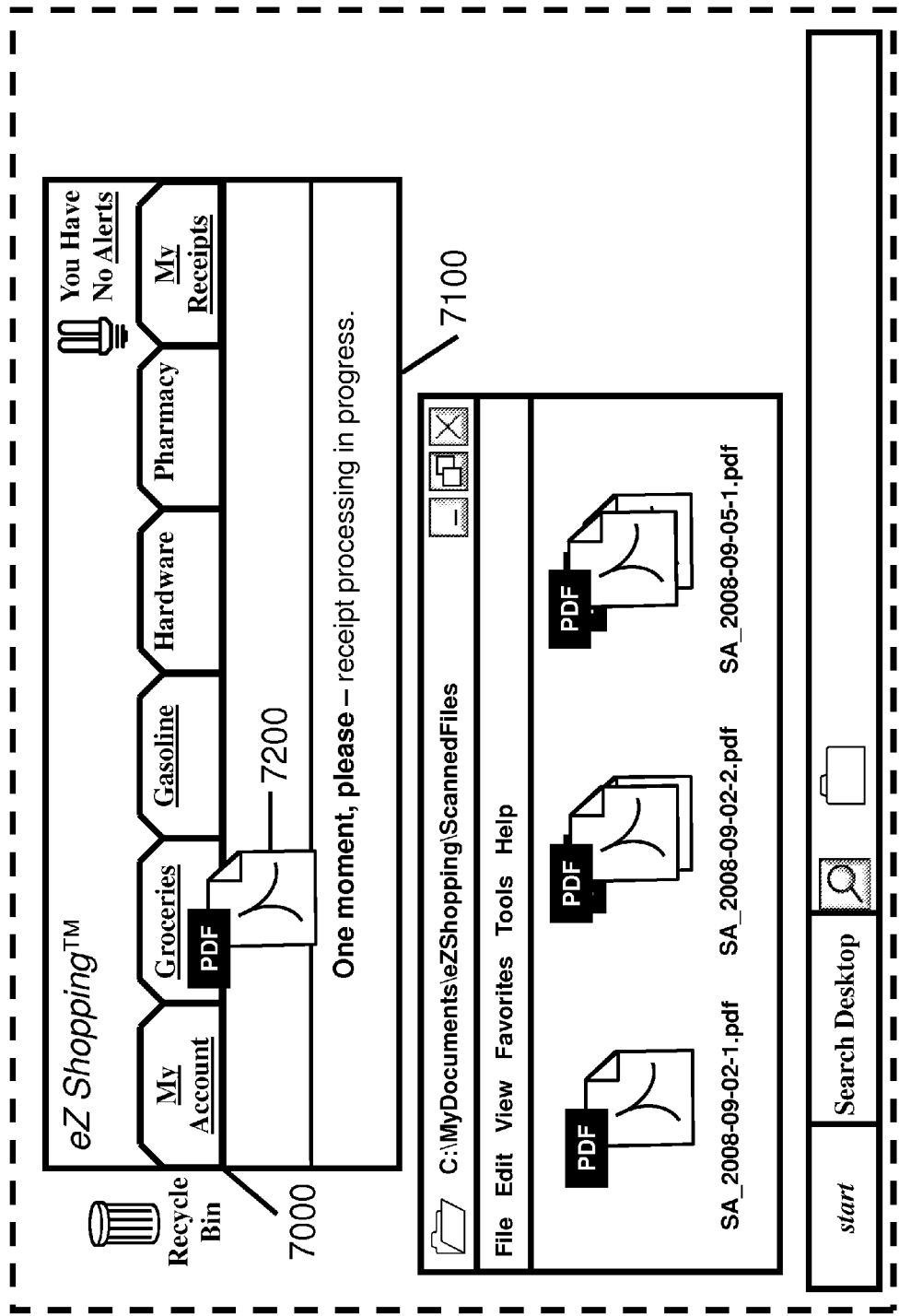
FIG. 7 illustrates another example Widget-based alert notifier and Web navigational GUI processing/transmitting a scanned receipt.

In an example embodiment, the second mode of operation of the widget is receipt processing. To transmit a purchase receipt to the SA provider, a user scans their purchase receipts (e.g., using a scanner 230 connected to a data terminal 100). FIG. 6 illustrates an example data terminal desktop display where a user has scanned in a purchase receipt 6200 using a flatbed scanner 230 (which in this example, the scanner software records the scanned image as a pdf file—image file formats such as .bmp, .jpeg, .pdf can also be used). The resulting scanned image is stored on the user's data terminal 100 (e.g. in the location "C:\MyDocuments\ezShopping\ScannedFiles" 6100 and titled SA_2008-09-05-1.pdf 6200). The widget 6000 is also running in the display of the data terminal 100. The user has also opened the file folder "ScannedFiles" 6100 in a window on the desktop of the data terminal. The file folder contains three scanned documents. In this example, to transmit the scanned receipt, the user drags the image file 7200 onto the widget 7000 as illustrated in FIG. 7. The widget 7000 changes mode and displays a message (e.g., "One moment please, widget processing in progress") in the message display area 7100. If there are any errors in transmission, the user is alerted with an updated message in the message display area 7100. After receiving the transmitted purchase receipt, the SA system optionally sends a confirmation message back to the user (e.g., Your receipt has been received.), processes the image (e.g., using OCR capabilities in the DSP server 700), and stores the processed receipt/image. After the optional confirmation message is displayed to the user (for a configurable period of time, e.g., 15 seconds) the widget display reverts back to desktop operational mode 5000 as illustrated in FIG. 5.

Figure 8:
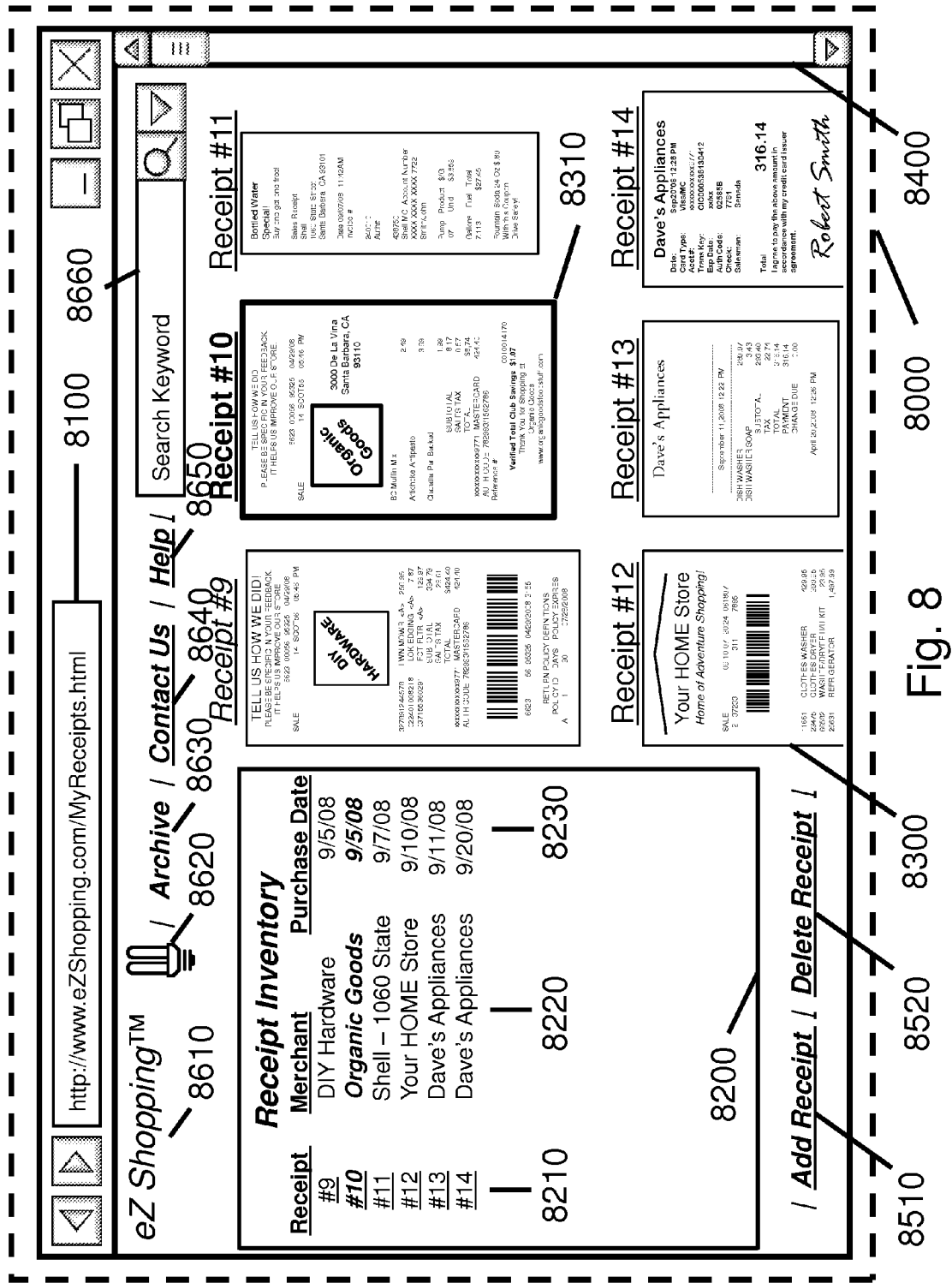
FIG. 8 illustrates an example Web-based user interface display of a SA system user's stored purchase receipts.

FIG. 8 illustrates an example Shopping Assistant system user interface 8000 presented via a browser (or other interface application) to a user. The browser can be, by way of example, executing on a computer terminal 100, such as a PC, a Wireless Application Protocol (WAP) or browser-enabled phone 210, a PDA or the like. The web page can optionally be accessed by selecting a control on a widget/gadget application program 5800 (see FIG. 5), by supplying the appropriate Uniform Resource Locator (URL) to the browser 8100, by selecting a link in response to a search query, or the like (the latter two access methods optionally would require the user first login by submitting a user id and/or password). The example user interface provides a top-level listing 8200 of all receipts stored by a user during a system or user configurable time period (e.g., in last month). In addition, the web page user interface optionally allows the user to add new purchase receipts directly from the web (as an example alternative to the widget purchase receipt capture process described above). The example user interface includes an area of common controls replicated on most of the example web-based pages. These common controls include branding 8610 (e.g., eZShopper™), an Alert/Notification Indicator 8620, links 8650 and 8640 to other Shopping Assistant system services (e.g., help and contact information respectively), and a search capability 8660 to assist the user in finding receipts, merchant locations, and/or individual shopping items. Optionally the left portion of the web page 8200 presents an inventory of active receipts stored by the SA system for a given user. Optionally the receipt inventory listing 8200 includes a number identifier 8210 assigned by the system (e.g., a simple chronological numbering of receipts beginning from 1), the retail merchant 8220 where the items were purchased, and the purchase date 8230. Optionally the right hand portion of the web site displays thumbnail images 8300 of the stored receipts. Optionally, the thumbnail listing includes all of the receipt images listed in the left-hand portion of the web user interface display. Double clicking on a specific thumbnail image (e.g. Receipt #10—Organic Goods 8310) optionally activates a new browser with an expanded view of the selected receipt and conventional browser options (e.g., print). Optionally, if there are more receipt images than can fit in a single web page view, the browser includes a scroll control 8400. Optionally, the web page has a delete receipt control 8520. The user optionally deletes a receipt by selecting a receipt in the inventory listing 8210 or by selecting a thumbnail image 8300 and then clicking on the delete receipt control 8520. A selected receipt is optionally highlighted in the receipt list 8200 and its outline is bolded in the thumbnail display 8300. The receipt 8310 number 10 is in a selected mode in FIG. 8. Optionally, the user can store/process a new receipt from the web by selecting the add receipt control 8510. The user first scans in their purchase receipts (e.g., using a scanner 230 connected to a data terminal 100) and selects the add receipt control 8510. In response, the system optionally presents a web dialog box (not shown in FIG. 8). The web dialog instructs the user to specify the path name or browse to the scanned in stored receipt and select a download control. In this example, the specified file is then downloaded across the data network 400, stored in the user account database 900 and displayed as a numbered receipt. Optionally the browser user interface also includes an archive link 8630. Selecting the Archive control displays a listing of all receipts which have been stored within the SA system user account and which exceed a given configurable time period and/or where deleted by the user (optionally, the archive control displays all stored receipts which were not explicitly deleted by a user). Optionally, while archived information is being displayed, the name of the Archive control toggles to "Current" to allow the user to return to a listing of only non-archived merchant receipts. The browser user interface also includes an alert or message notification control 8620 which notifies the user of important information or events. For example, the alert icon might flash yellow when a redeemable club/reward award is a week or other configurable time period from expiring. Optionally, a user gesture such as double clicking on the alert icon 8620 causes the activation of a new browser user interface window to the SA service provider welcome page (see FIG. 11 for an example display). The welcome/user home page displays the content of alert messages which can be optionally deleted. Optionally, an active alert notification (e.g., flashing icon) can be cleared or acknowledged (transitioned to a non-flashing/alerting state) by a single click (or double click as described above) on the alert icon 8620. Optionally, the alert notification can be acknowledged by a user browsing to the SA system welcome page and deleting all listed alerts.

Figure 9:
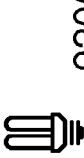
FIG. 9 illustrates another example Web-based SA user interface display of a selected purchase receipt for user review.
Figure 10:
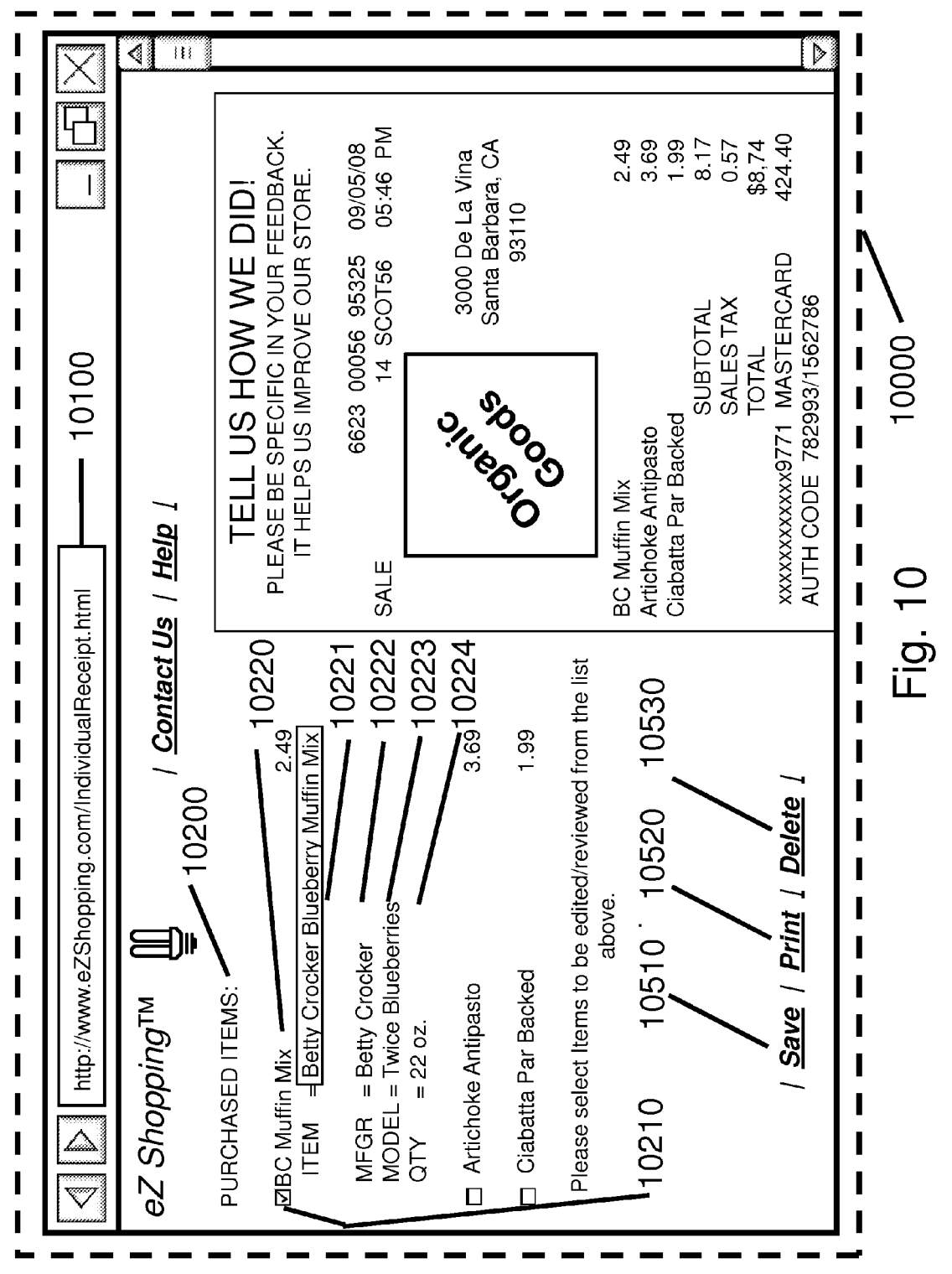

FIG. 9 illustrates an example Shopping Assistant system user interface 9000 presented via a browser (or other interface application) to a user. The web page can optionally be accessed by selecting a control on a widget/gadget application program, by supplying the appropriate Uniform Resource Locator (URL) to the browser 9100, by selecting a link in response to a search query, by selecting an individual receipt from the receipt inventory listing 8200 or by selecting a thumbnail image 8300 in FIG. 8, or the like. The example user interface provides an enlarged view 9300 of an individual receipt. Optionally, the browser user interface display includes a collection of web-site common controls including branding, an alert/notifier, and contact and help information links. Optionally, if there are more purchased items in the list than can fit in a single web page view or the receipt thumbnail is large, the browser includes a scroll control 9400. The left hand portion of the display 9200 optionally includes a list of the purchased items derived from a text rendering of the receipt and the right hand portion of the display includes an image of the receipt 9300. The user is optionally provided instructions 9230 to edit the names of the purchased item. The user selects an item from the receipt list by clicking in the box 9210 to the left of the purchase receipt item name 9220. In response to a user selecting a purchased item, an edit box is optionally displayed to allow the entry of a customized friendly name as shown in FIG. 10. Optionally, the web page has a delete receipt control 9530 which deletes the current receipt and transitions control back to the top-level receipt view (see FIG. 8). The user can optionally print the current receipt by selecting the print control 9520.

FIG. 10 illustrates an example Shopping Assistant system user interface 10000 presented via a browser (or other interface application) to a user. Optionally, the browser user interface display includes a collection of web-site common controls including branding, an alert/notifier, and help and contact information links. Optionally, if there are more purchased items in the list than can fit in a single web page view or the receipt is large, the browser includes a scroll control 10400. In this example display, the user selects a single item, BC Muffin Mix, by clicking in the associated item selection box 10210 next to the item descriptions 10220. Optionally the SA system confirms the selection by placing a check mark within the selected box. In addition to responding with a check mark, the SA system displays a blank text box or a text box with a friendly item name 10221 (optionally, as determined by other local users within the SA system network of users or an item name assigned by SA staff). For example in FIG. 10, the BC Muffin Mix item when selected displays a common name 10221 for the item 10220, Betty Crocker Blueberry Muffin Mix. The detailed information is generated by the SA system 1000 (e.g., by querying internal or external databases). For example, the item name optionally is assigned by the SA provider personnel (e.g., all purchases from Organic Foods with a matching receipt description and similar price are assigned the common name Betty Crocker Blueberry Muffin Mix). The common name can also be assigned by a manufacturer, a retail merchant, a user or collection of users in the SA network optionally with an electronic interface into the SA system. Names can be determined from other databases such as Wikipedia, dictionaries, or SA keyword searches. For example, the SA system may determine from internal mining of keyword searches and user customizations that user's prefer the common name "Betty Crocker Blueberry Muffin Mix" rather than "BC Muffin Mix". Optionally, additional more detailed information is provided including the manufacturer 10222, model information 10223, and quantity or package size 10224 (or other information relating to the item). User edits to the item name are optionally transmitted immediately (assuming the data terminal 100 is connected to a data network and server 800) or when the user selects the save control 10510. Optionally, the web page has a delete receipt control 10530 which deletes the current receipt and transitions control back to the top-level receipt view (see FIG. 8). The user can optionally print the current receipt by selecting the print control 10520.

Figure 11:
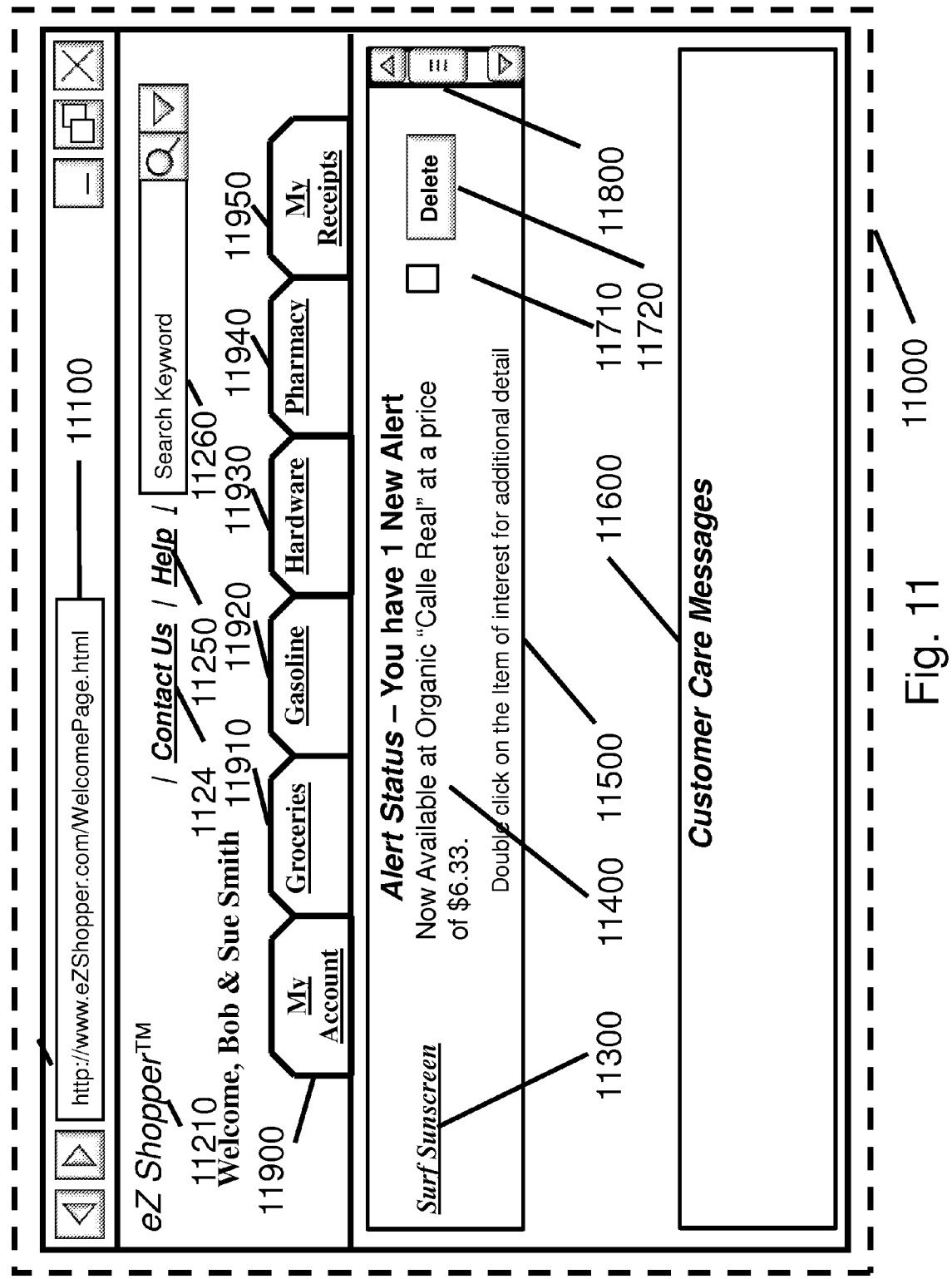
FIG. 11 illustrates a Web-based SA GUI serving as the user's Home/Welcome page to display, alerts, account summary status, and to provide navigational controls.

FIG. 11 illustrates an example Shopping assistant system home page user interface 11000 presented via a browser (or other interface application) to a user. The web page can optionally be accessed by selecting a control on a widget/gadget application program, by supplying the appropriate Uniform Resource Locator (URL) to the browser 11100, by selecting a link in response to a search query, by selecting an alert icon/control, or the like. Optionally, the browser user interface display includes a collection of web-site common controls including branding 11210, contact and help information links (11250 and 11240 respectively), and a search function 11260 to assist the user in finding receipts, merchant locations, and/or individual shopping items. The SA home page optionally includes an alert message display 11500. Informational messages related to the availability of items (in or out of stock at a particular merchant and/or now available or discontinued at a particular merchant) and item price changes (sales or price increases exceeding an optional threshold (e.g greater than a certain percentage)) and other related messages are displayed in this area. In this example there is one alert displayed. The alert message 11400 informs the user of the availability of a previously out-of-stock item. Optionally, alert messages include embedded URL links 11300. If the URL link is selected by the user, a new web page is optionally opened with additional information related to the alert message. Optionally, alert messages include a delete control 11720. If the user clicks the item selection box 11710 and then clicks the delete control 11720, the selected alert status messages are deleted from the display. Optionally, if there are more alerts in the list than can fit in a single view, the view includes a scroll control 11800. Optionally, the SA welcome page 11000 includes a Customer Relationship Management (CRM) display 11600. The CRM display provides the user with informational messages related to the user's account (e.g., to notify a user that their password has not changed in over 6 months and it should be modified for added account security), helpful hints on how best to use the system, and promotional messages relating to user item purchases (e.g., purchase recommendations for like minded buyers). Optionally the SA welcome page includes navigation controls or tabs 11900-11950 for traversing the SA web site. Selecting (e.g., single or double clicking) the My Accounts control 11900 displays a user's account information which optionally can be examined and modified (e.g., user name, payment information, password, email address for updates and notifications, mobile phone number for notifications and/or security authentication, etc.). Selecting (e.g., single or double clicking) the Groceries control 11910 enables the user to access one or more web pages for grocery list creation and price comparisons, see FIG. 12 for an example. Selecting (e.g., single or double clicking) the Gasoline control 11920 enables the user to access one or more web pages for comparing lowest price gasoline retailers, see FIG. 19 for an example. Selecting (e.g., single or double clicking) the Hardware control 11930 enables the user to access one or more web pages for price comparison shopping and item availability of home improvement items, see FIG. 12 for an example. Selecting (e.g., single or double clicking) the Pharmacy control 11940 enables the user to access one or more web pages for drug merchant shopping list creation, price comparison shopping, and item availability of drug merchant items, see FIG. 12 for an example. Selecting the "My Receipts" control 11950 displays a top-level view of the user's stored receipts (see FIG. 8 for an example).

Figure 12:
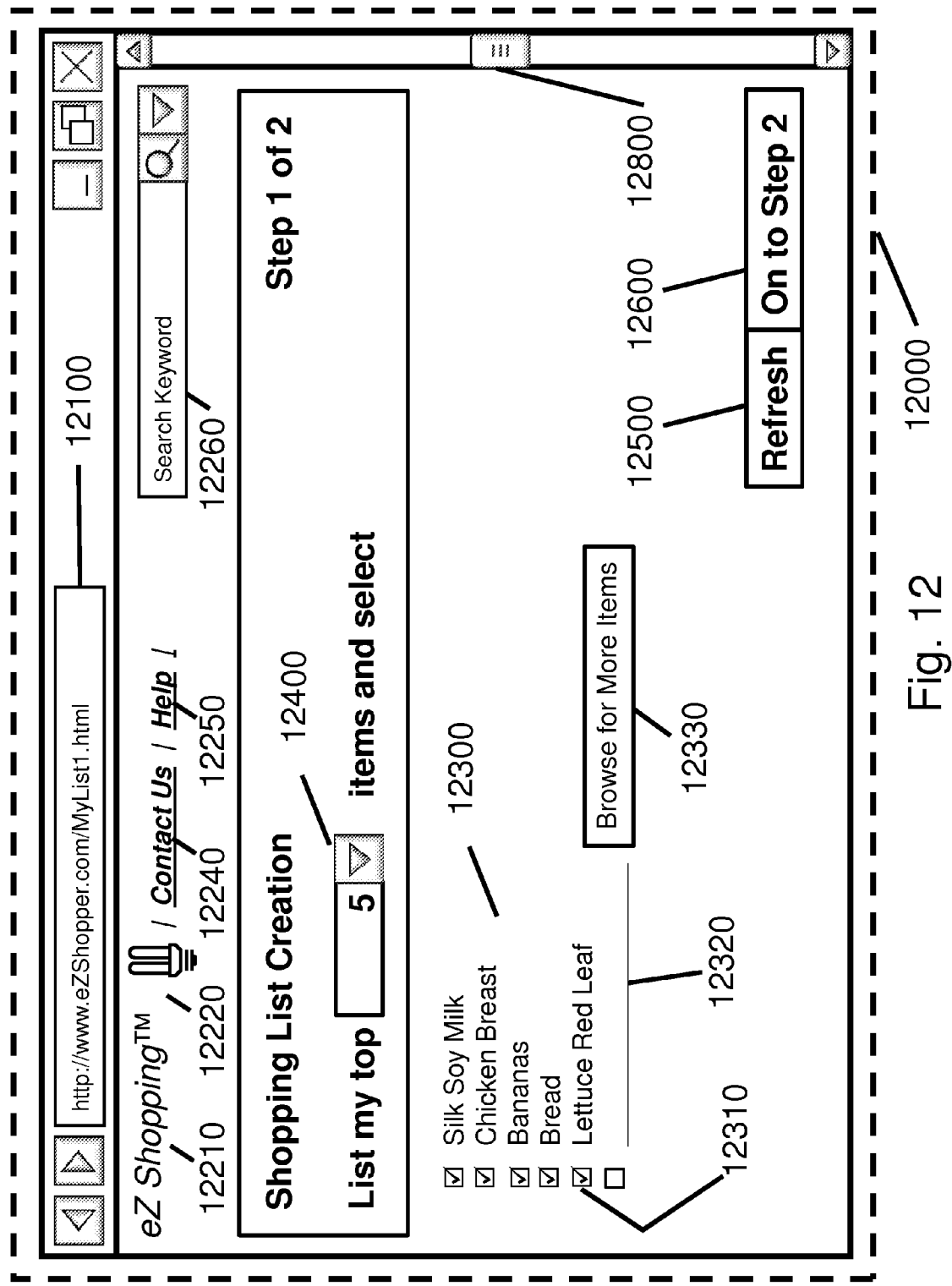
FIG. 12 illustrate an example Web-based SA user interface display of the first step in creating a shopping list of items.
Figure 13:
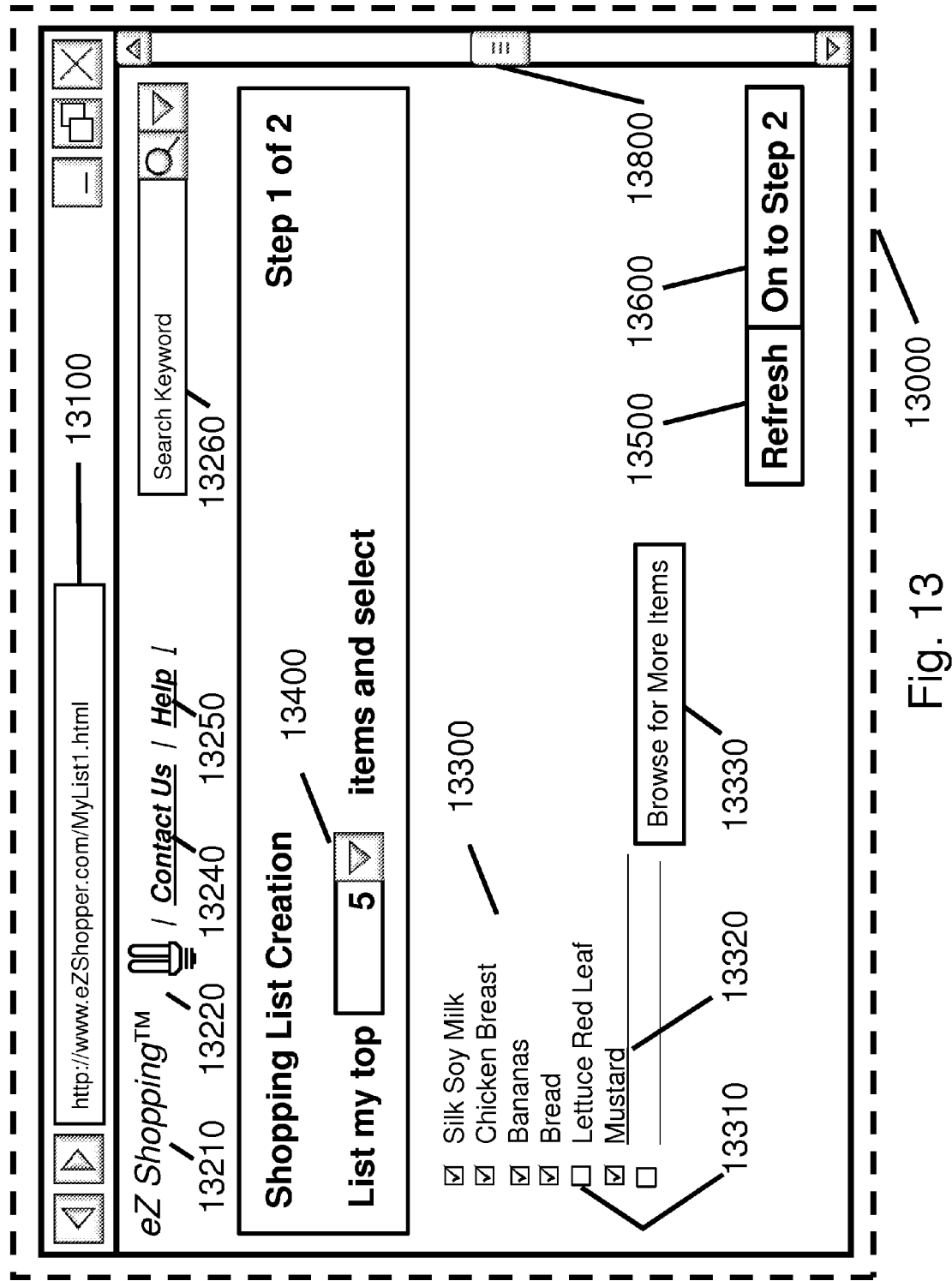
FIG. 13 illustrates another example Web-based SA user interface display of user edits to a shopping list of items.
Figure 14:
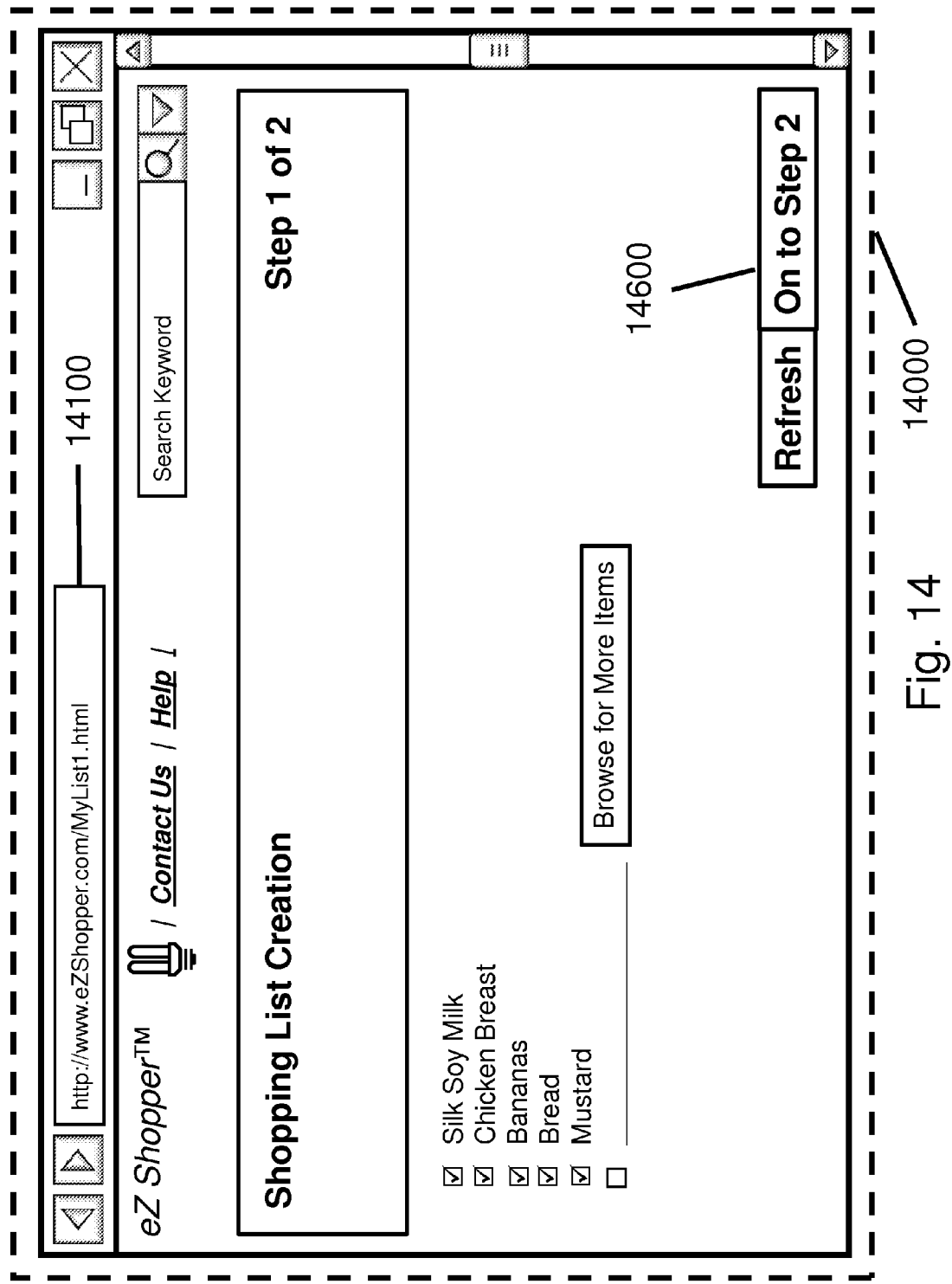
FIG. 14 illustrates another example Web-based SA user interface display of a screen refresh in the creation of a shopping list of items.

FIG. 12 illustrates an example Shopping Assistant system user interface 12000 presented via a browser (or other interface application) to a user. The web page can optionally be accessed by selecting a control on a widget/gadget application program (e.g. 5400 in FIG. 5 or 22210 in FIG. 22), by supplying the appropriate Uniform Resource Locator (URL) to the browser 12100, by selecting a link in response to a search query, by selecting the grocery control 11910 in FIG. 11, or the like. The example user interface provides the first of two steps in creating a shopping list. Optionally, the browser user interface display includes a collection of web-site common controls including branding 12210, an alert/notifier 12220, contact 12250 and help 12240 information links, and a search function 12260 to assist the user in finding receipts, merchant locations, and/or individual shopping items. Optionally, when a user accesses the web page, a default number of grocery/shopping items are listed 12300. In this example, the default number 12400 of items is set to 5. The SA system displays the 5 most commonly purchased grocery items. Optionally, there is a control 12400 which allows the user to display a larger or smaller list (e.g., 10, 15, 25, 30, all items by selecting from a pull down menu). Optionally, the user can select the text box and enter the desired number of items (e.g., a user can type in the number 7 to see a display of the 7 most common items purchased). Optionally, if the user enters a value exceeding the number of items entered into the system by the user, the system displays all items entered into the SA system 1000 by the user. Optionally, if there are more items in the list than can fit in a single web page view, the browser includes a scroll control 12800. Each of the items in the list 12300 is a linked URL that when selected provides the user with additional detail regarding the selected item (for example by displaying additional information underneath the item or presenting a new web page window with the additional information, see FIG. 10 for an example display of additional information 10221-10224 that can be provided by the SA system). Optionally, the user can add items to the shopping list by typing in a new item 13320 see FIG. 13. (The example shows the user typing a new item mustard). Optionally, the SA system performs an internal or external database search to find a matching grocery item to that matching the user entered item keyword. Optionally, the user can browse 12330 to select from a list of grocery items including but not limited to the items they have previously purchased and/or items available from local merchants. Optionally, all the items are by default initially selected (optionally, the default could be changed to have none of the items selected). To remove an item from the shopping list, the user selects the check box control to the left of the item description 12310 (see FIG. 12) to toggle the control to unchecked. FIG. 13 illustrates the resulting web page display 13310 after a user has toggled the "Lettuce Red Leaf" item and typed in the item "mustard". Optionally, the unchecked items are removed from the display when the user selects the refresh control 12500, see FIG. 12. FIG. 14 is an example web page display after a user has unselected certain items and manually entered a new item selection "mustard" in the field 12320/13320. Optionally, the count of displayed items 12400 is decremented by the number of unchecked items. To finish creating a shopping list, the user selects the "On to Step 2" button/control 14600 which links to another web page (see FIG. 15).

FIG. 13 illustrates an example Shopping Assistant system user interface 13000 presented via a browser (or other interface application) to a user. The user interface illustrates changes to the user interface web page FIG. 12 described above after the user has unchecked an item "Lettuce Red Leaf" and typed in a new item "Mustard" as describe above.

FIG. 14 illustrates an example Shopping Assistant system user interface 14000 presented via a browser (or other interface application) to a user. The user interface illustrates changes to the user interface web page FIG. 13 described above after the user has unchecked an item "Lettuce Red Leaf", typed in a new item "Mustard", and then selected the refresh screen control 13500. Optionally, the unchecked items are removed from the display and replaced with the new item "Mustard".

Figure 15:
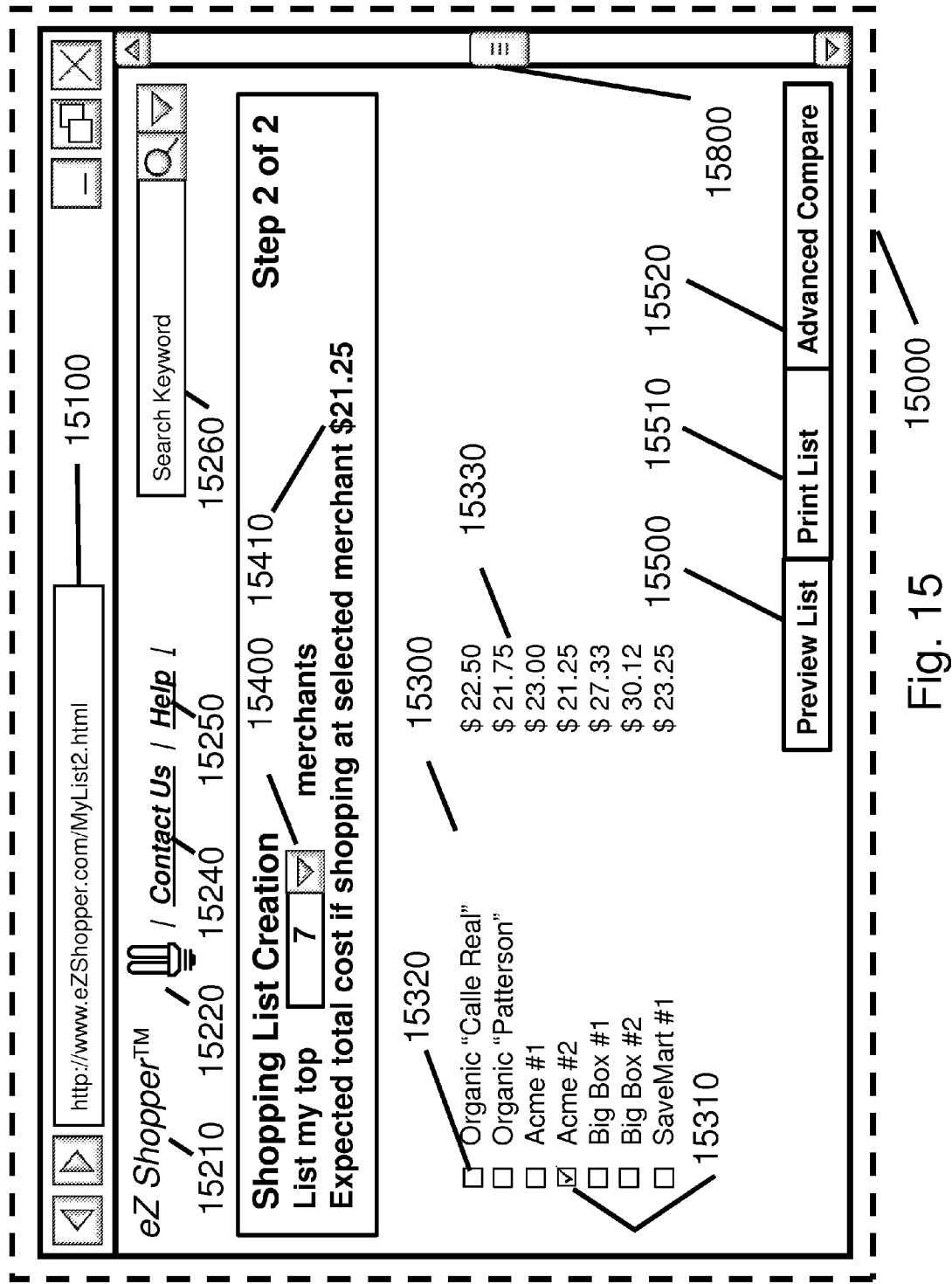
FIG. 15 illustrates another example Web-based SA user interface display of merchant selection for one or more shopping list items. In this example, the SA system has preselected a merchant.

FIG. 15 illustrates an example Shopping Assistant system user interface 14000 presented via a browser (or other interface application) to a user. The example user interface provides the second of two steps in creating a shopping list. The web page can optionally be accessed by selecting a control on a widget/gadget application program, by supplying the appropriate Uniform Resource Locator (URL) to the browser 15100, by selecting a link in response to a search query, after selecting a list of shopping items and then selecting the "On to Step 2" control 12600 in FIG. 12, control 13600 in FIG. 13, control 14600 in FIG. 14, or the like. Optionally, the browser user interface display includes a collection of web-site common controls including branding 15210, an alert/notifier 15220, contact and help information links 15250 and 15240, and a search function 15260 to assist the user in finding receipts, merchant locations, and/or individual shopping items. In this example, the SA system displays a list of the local merchants frequented by the user and where these items can be purchased. In this example, the default number of merchants 15440 is set to 7. The SA system displays the 7 most commonly frequented merchants. Optionally, there is a control 15400 which allows the user to display a larger or smaller list (e.g., 10, 15, 25, 30, all merchants within 5 miles, 10 miles, etc.). The distance to the local merchant is determined by querying one or more location databases. Optionally, if the user selects all merchants within a specified radius, the system prompts the user to enter or select a location (e.g., the address of the user as listed in their personal profile or GPS of their phone). Optionally, the user can select the text box and enter the desired number of merchants (e.g., a user can type in the number 3 to see a display of the 3 most common frequented merchants). Optionally, if the user enters a value exceeding the number of merchants in a location, the system displays all merchants in the area. Optionally, if there are more merchants in the list than can fit in a single web page view, the browser includes a scroll control 15800. Each of the merchants in the list 15300 is a linked URL that when clicked provides the user with additional detail regarding the selected merchant (e.g, name of merchant, location, driving distances from user's residence, recent (or all) purchase receipts including date of purchase and totals). The additional merchant detail can optionally be displayed under the merchant name with the merchant list shifted downward to make room or a new web page can optionally be opened to display the requested information. Optionally, the low cost merchant in the list is by default initially selected (the default could be changed to all merchants selected, none of the merchants selected, etc). The selection is signified by a check mark in the control 15310 to the left of the merchant name. The SA determines the expected cost of purchasing the items selected 13330 (see FIG. 13) in step 1 of the process at the selected merchant(s).

Figure 16:
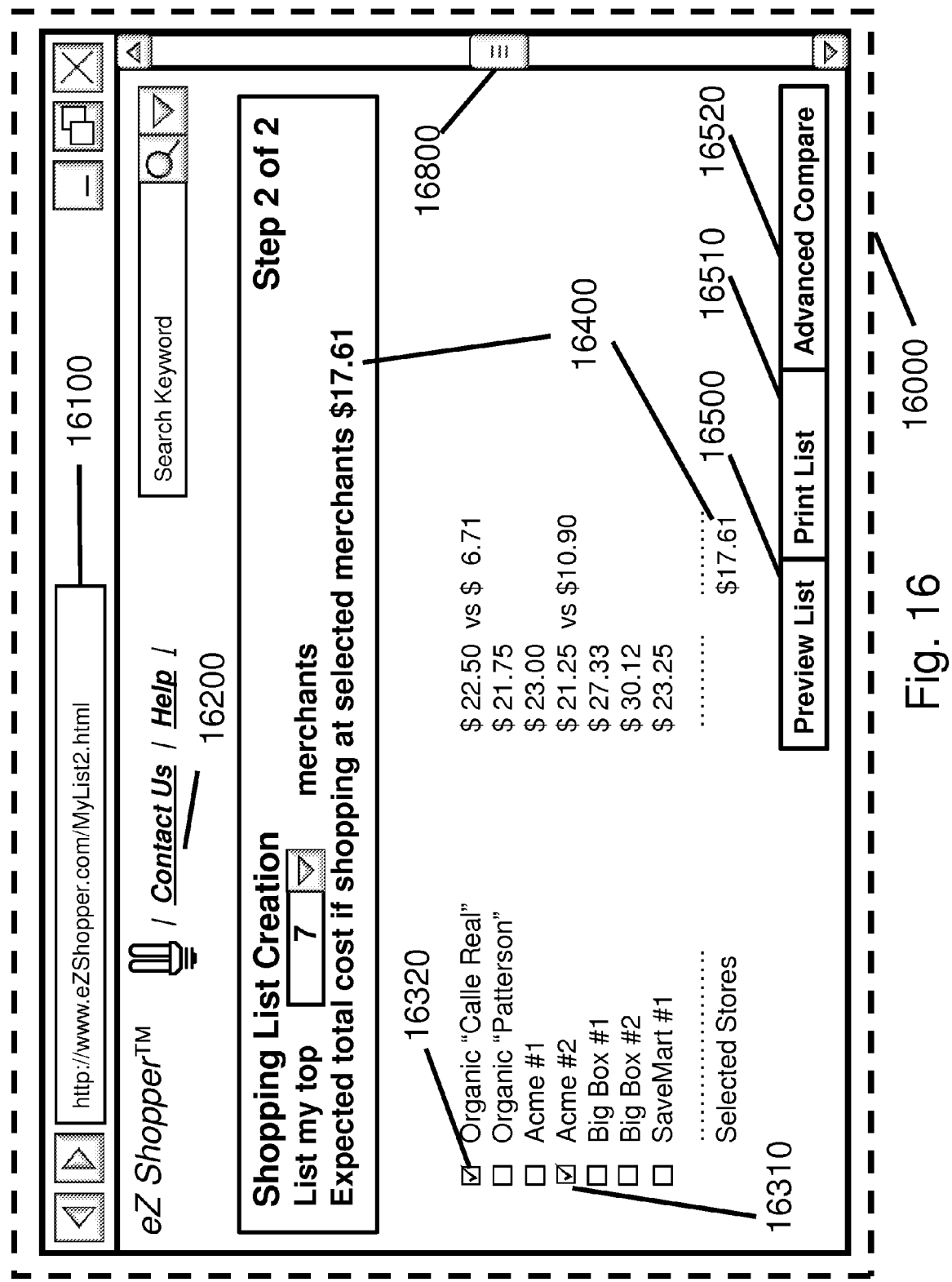
FIG. 16 illustrates another example Web-based SA user interface display of merchant selection for one or more shopping list items. In this example, the user has selected a second merchant.

To determine the shopping cost of more than one merchant, the user selects one or more merchants using the merchant control 15310. If more than one merchant is selected, optionally a new cost 16400 is calculated based on the optimal purchasing of items across the two merchants and is displayed to the user as illustrated in FIG. 16. In this example, the user selected merchant "Organic Calle Real" by selecting the merchant control 16320 in addition to the system default selection 16310 of the merchant "Acme #2". The selection of lowest cost items at the two merchants results in an overall savings to the user of $4.89 ($21.50 of shopping at "Acme #2" only minus the total cost of $17.61 by shopping at both "Organic Calle Real" and "Acme #2"). Optionally, if one or more merchants are selected and certain items on the shopping list are not available at the selected merchants, a warning or error message is displayed. To remove a merchant from the shopping list, the user selects the check box control to toggle between checked and unchecked. To print the merchant specific shopping list(s), the user selects the print shopping list control 15510/16510 and a shopping list for each merchant is printed. To preview a shopping list(s), the user selects the preview control 15500/16500. In response, the SA system displays two shopping lists for the user to print out and take with them to the merchant, see FIG. 17. Optionally, there is an advanced compare control 15520 and 16520 allowing the user to compare merchant pricing for a list of items at two separate geographic locations.

FIG. 16 illustrates an example Shopping Assistant system user interface 16000 presented via a browser (or other interface application) to a user. The user interface illustrates changes to the user interface web page FIG. 15 described above after the user has selected a second merchant 16320. In this example, shopping at two merchants reduces the user's overall shopping costs as described above.

Figure 17:
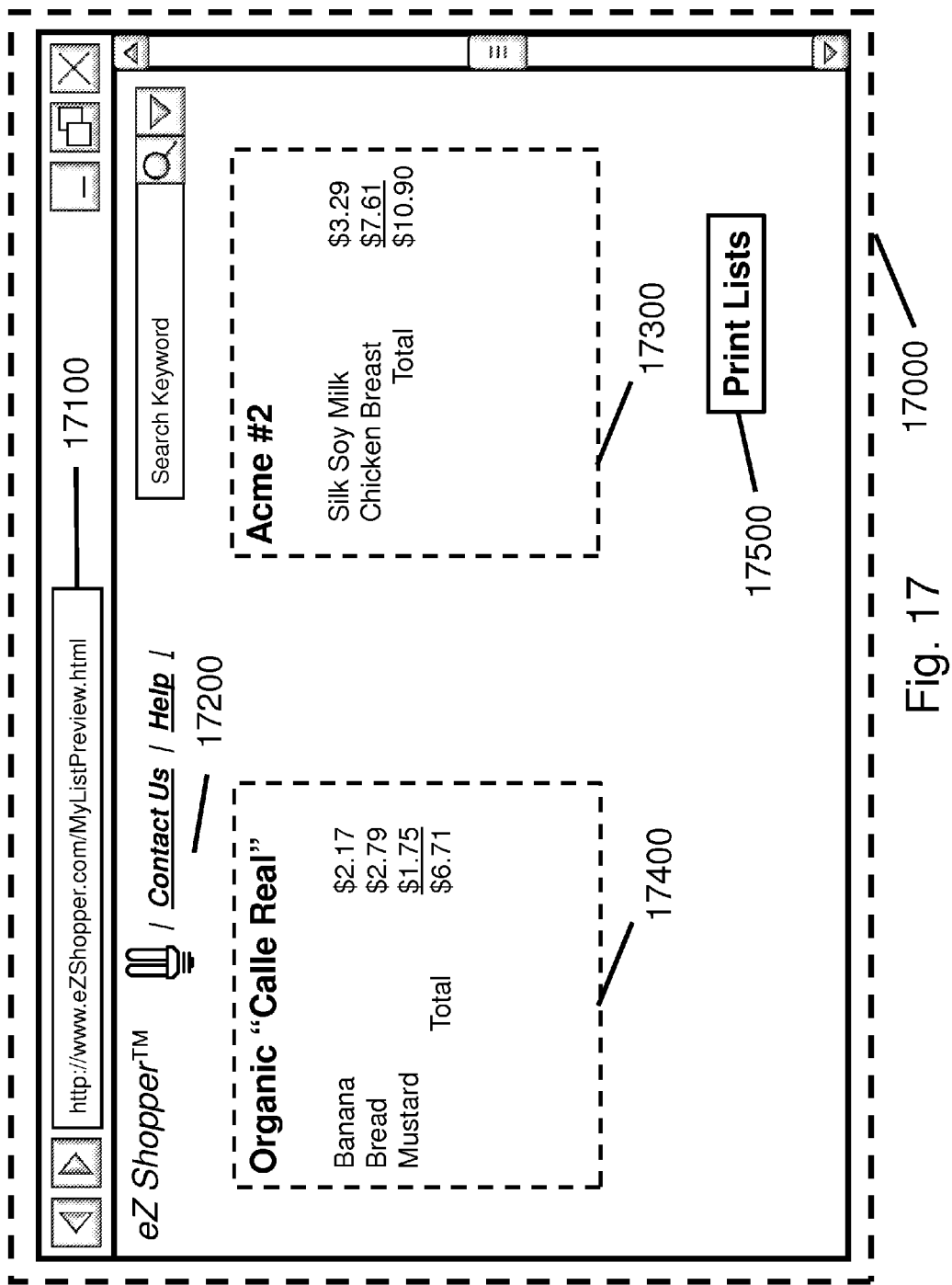
FIG. 17 illustrates another example Web-based SA user interface display of two merchant shopping lists.

FIG. 17 illustrates an example Shopping Assistant system user interface 17000 presented via a browser (or other interface application) to a user. The example user interface is used to preview one or more shopping lists 17300 and 17400 created from the SA system 1000 step 1 shopping item selection(s) and SA system 1000 step 2 merchant selection(s). The web page can optionally be accessed by selecting a control on a widget/gadget application program, by supplying the appropriate Uniform Resource Locator (URL) to the browser 17100, by selecting a link in response to a search query, or the like (the latter two access methods optionally would require the user first login by submitting a user id and/or password), by selecting the list preview control 15500 in FIG. 15 or control 16500 in FIG. 16. Optionally, the browser user interface display includes a collection of web-site common controls 17200 including branding, an alert/notifier control (when selected by the user displays the Shopping Assistant Home Page including any listed alert messages—see FIG. 11), search, and contact and help information links. Optionally, the user can print the shopping lists 17300 and 17400 by selecting the print control 17500.

Figure 18:
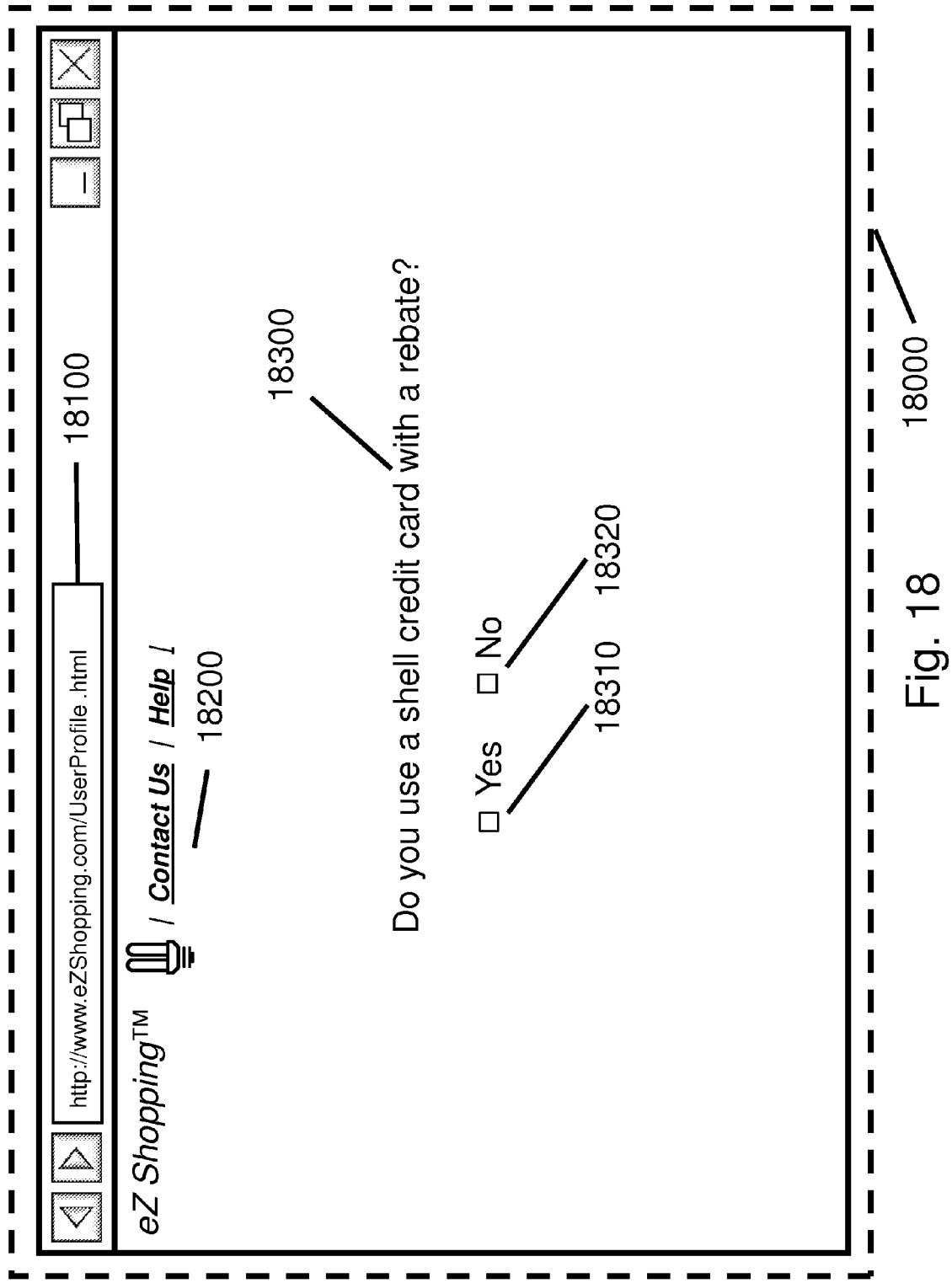
FIG. 18 illustrates another example Web-based SA user interface display of a user account profile update.

FIG. 18 illustrates an example Shopping Assistant system user interface 18000 presented via a browser (or other interface application) to a user. The example user interface is shown to confirm a user's choice of a type of credit card used in the purchase of items (e.g., gasoline). Optionally, the Shopping Assistant system determines the use of a particular credit card based on previous purchase history recorded in the Shopping Assistant system. Optionally, the browser user interface display includes a collection of web-site common controls 18200 including branding, an alert/notifier control (when selected by the user displays the Shopping Assistant Home Page including any listed alert messages—see FIG. 11), and contact and help information links. In response to a user yes 18310 or no 18320 control selection, the user's account profile is updated in the user account database 900.

Figure 19:
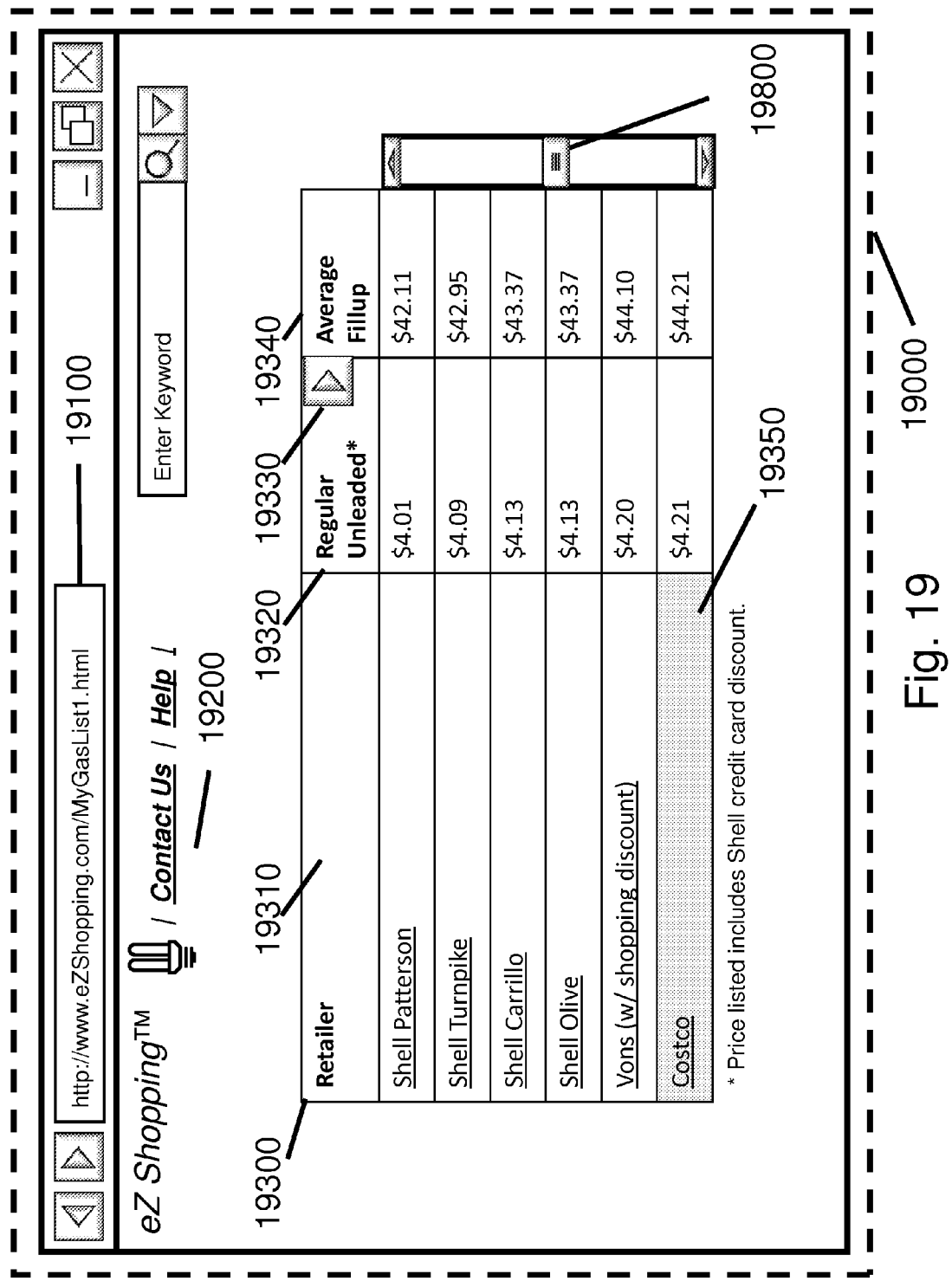
FIG. 19 illustrates another example Web-based SA user interface display of local gasoline merchants and their fuel costs.

FIG. 19 illustrates an example Shopping Assistant system user interface 19000 presented via a browser (or other interface application) to a user. The example user interface displays a collection of lowest price, local gasoline merchants.

Figure 20:
FIG. 20 illustrates another example Web-based SA user interface display of local gasoline merchants and their fuel costs across different blends/grades.

The web page can optionally be accessed by selecting a control on a widget/gadget application program 5500, see FIG. 5, by supplying the appropriate Uniform Resource Locator (URL) to the browser 19100, by selecting a link in response to a search query, by selecting a gasoline control on a web page 11920, see FIG. 11, or the like. Optionally, the browser user interface display includes a collection of web-site common controls 19200. Optionally, the example web page display includes a price comparison listing of local gasoline merchants 19300. The display optionally includes a listing of gasoline merchants 19310, the cost to purchase an amount (e.g. gallon) of a particular blend/grade of fuel 19320 (e.g., regular) from the merchant, the cost to fillup the user's automobile from the merchant based on the average number of gallons a user purchases 19340 (e.g., based on previous purchase detail). Those local merchants never frequented by a user (or at least as determined by the SA system), but have low per gallon costs, are optionally displayed to the user (e.g., via a shaded merchant box 19350). Optionally, the display includes an expand control 19330 which when selected by a user expands the display to list all major gasoline blends/grades and their respective pricing. An expanded web page view of gasoline blends/grades 20000 is illustrated in FIG. 20. Optionally, to allow for the larger expanded view, the average fillup column 19330 is removed from the display 20000. Optionally, the gasoline merchant pricing display FIG. 20 includes a contract control 20330 which when selected returns the display back to the single gasoline blend/grade and average fillup cost display 19300 of FIG. 19. Optionally, if there are more merchants than can fit within the display, a scroll control 19800 is provided.

FIG. 20 illustrates an example Shopping Assistant system user interface 20000 presented via a browser (or other interface application) to a user. The user interface illustrates changes to the user interface web page of FIG. 19 if the expand gasoline grades/blend control 19330 is selected by a user. The display expands to list all major gasoline blends/grades and their respective pricing. The user can optionally return to the FIG. 19 display format by selecting the contract control 20330.

Figure 21:
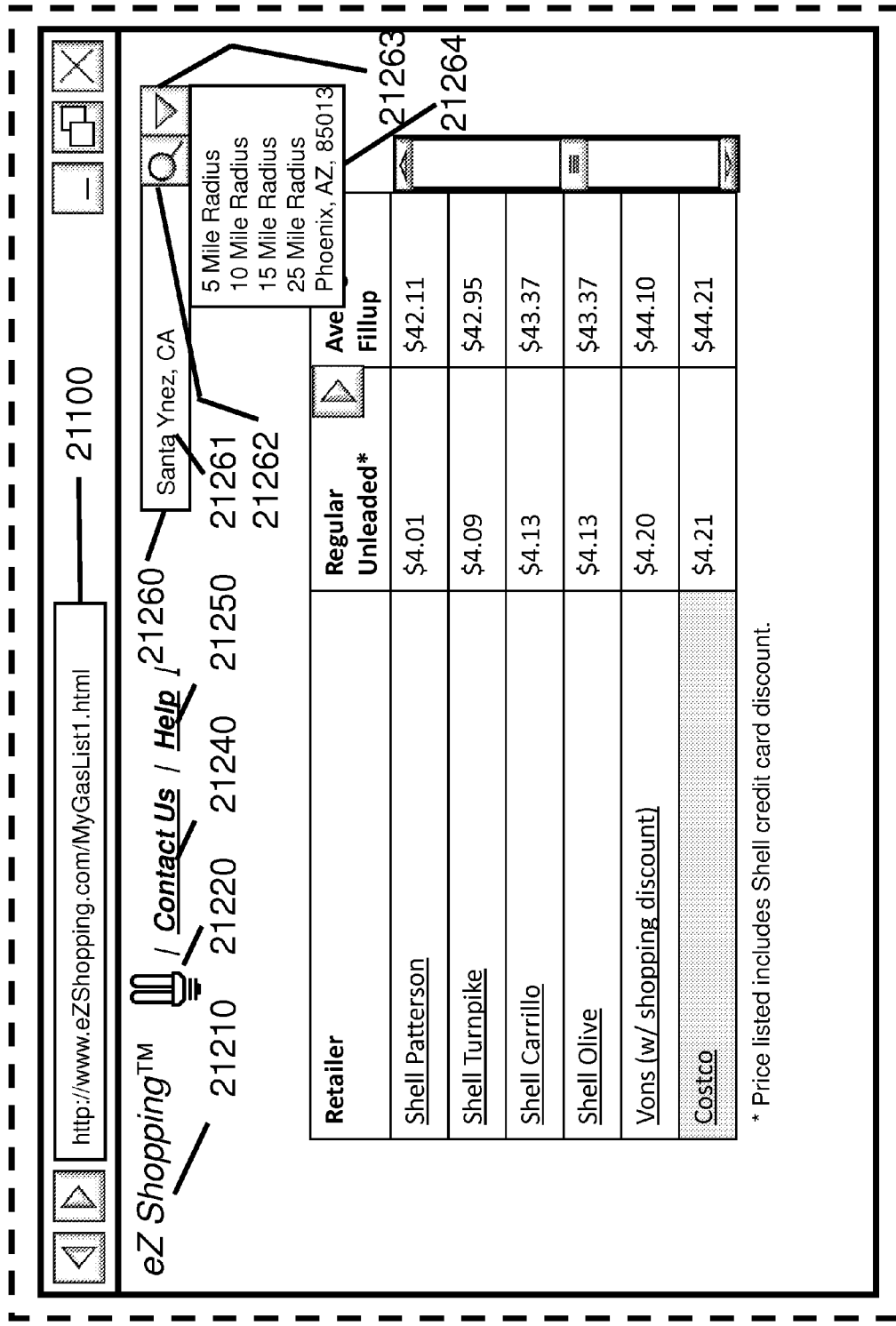
FIG. 21 illustrates another example Web-based SA user interface display of a user entering a search request for fuel costs outside the user's local area.

FIG. 21 illustrates an example Shopping Assistant system user interface 21000 presented via a browser (or other interface application) to a user. The example user interface illustrates the use of the search control 21260 in the gasoline price comparison area of the Shopping Assistant web site.

The web page can optionally be accessed by selecting a control on a widget/gadget application program 5500 (see FIG. 5), by supplying the appropriate Uniform Resource Locator (URL) to the browser 21100, by selecting a link in response to a search query, by selecting a gasoline control on a web page 11920, see FIG. 11, or the like. Optionally, the browser user interface display includes a collection of web-site common controls including branding 21210, an alert/notifier control 21220, contact and help information links 21240 and 21250 respectively, and a search function 21260. The user can enter a keyword in the search text box 21261 (e.g., Santa Ynez, Calif.) and select the search control 21262, to initiate a Shopping Assistant search. For example, the user might be interested in checking the gasoline price of a particular merchant. In this example, the user can optionally enter the name of the merchant as the keyword. In another example, a user can enter a location (e.g., Santa Ynez, Calif.) in the search text box 21261 to get a listing of lowest price gasoline at the given location. Optionally, a pull down control 21263 is provided which includes a context sensitive set of search terms and/or locations 21264 (e.g., if Phoenix, Ariz., 85013 was previously searched by a user, this term optionally is included in the search pull down menu).

Figure 22:
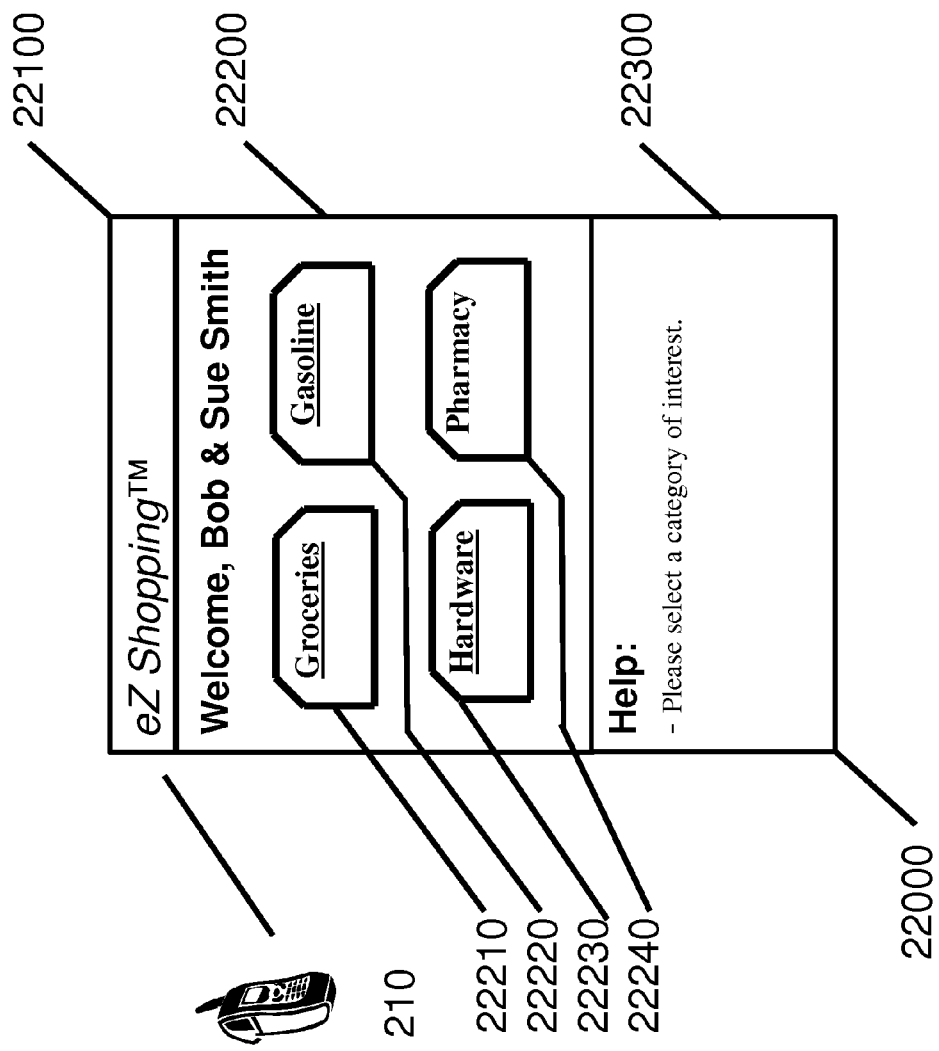
FIG. 22 illustrates an example SA user interface presented on a mobile device. The example interface enables a user to navigate the SA system.

FIG. 22 illustrates an example mobile device 210 user interface screen 22000 displayed by software application program 300. The user interface screens can be presented via a custom software application or by way of a browser or the like. The screen presents a collection of control buttons 22210-22240 which provide functions similar to that described for the widget/gadget controls 5300-5800 in FIG. 5 and 11900-11950 in FIG. 11. In this example user interface, items can be selected via a double click or by scrolling to the item of interest and selecting or activating the control. The user selection is transmitted to web server 800 over the wireless network 300 and/or data network 400. In this example user interface, the screen has a "help" section 22300 which provides the user with additional instructions. In this example user interface, the screen also has a "branding" section 22100.

Figure 23:
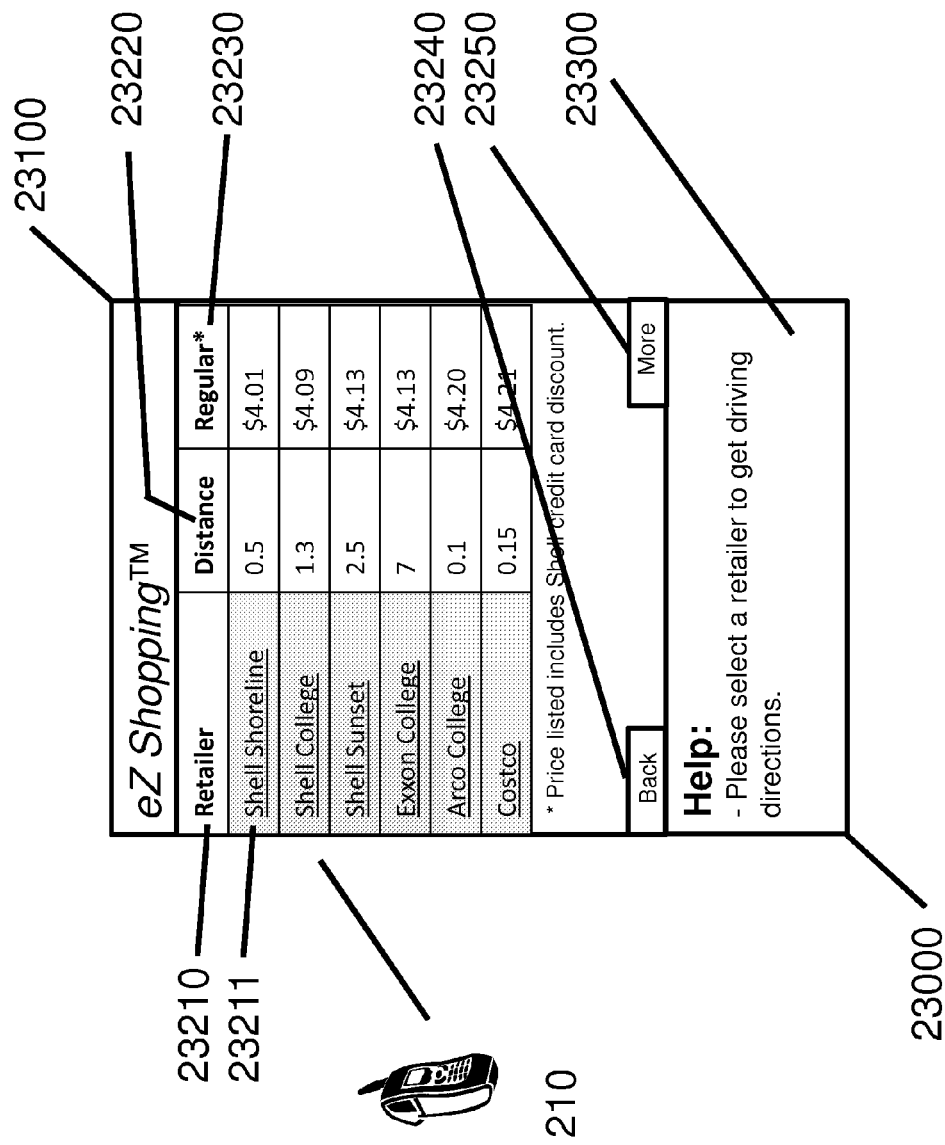
FIG. 23 illustrates another example SA user interface presented on a mobile device. The example interface displays local gasoline merchants and their fuel costs.

FIG. 23 illustrates an example mobile device 210 user interface screen 23000 displayed by software application program 300. The user interface screens can be presented via a custom software application or by way of a browser or the like. The screen presents a listing of local gasoline merchants 23210, the distance from the user's present location to the merchant 23220 (e.g.'s, as measured using GPS from the user's mobile device or user profile or location entered by the user), and the cost of the merchant's regular fuel 23230. In this example user interface, items can be selected via a double click or by scrolling to the item of interest and selecting or activating the control (e.g. selecting "Shell Shoreline" retailer control 23211 for additional detail on the merchant and/or driving directions). Optionally, shaded merchants indicate the user has not purchased fuel from the merchant (e.g., no purchase information from the user regarding the merchant has been entered into the SA system 1000). Optionally, the screen has a back control 23240 that allows the user to navigate to the previous screen, and a more control 23250 that allows the user to display the next listing of gasoline merchants. In this example user interface, the screen has a "help" section 23300 which provides the user with additional instructions. In this example user interface, the screen also has a "branding" section 23100.

Figure 24:
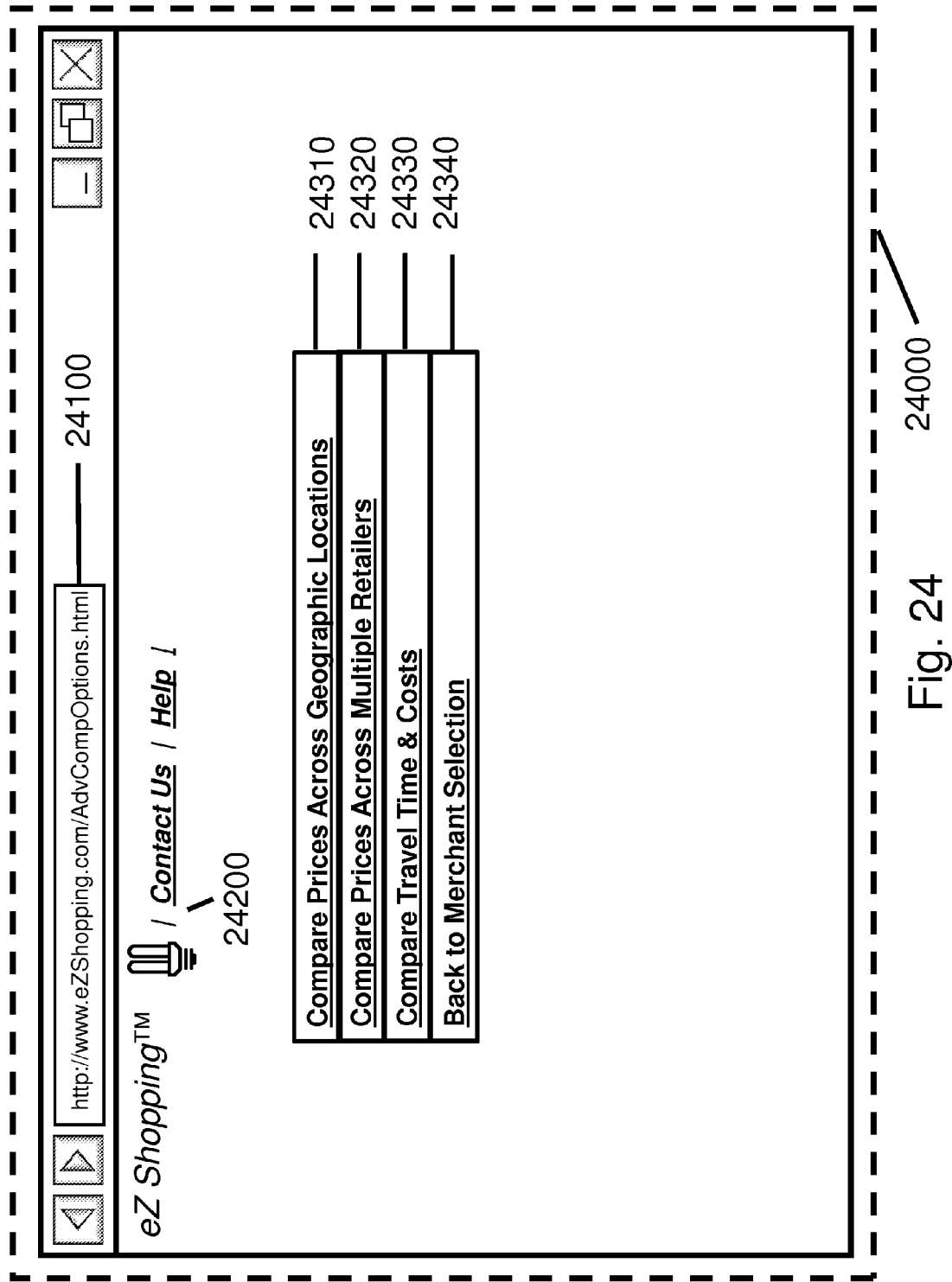
FIG. 24 illustrates another example Web-based SA user interface display of an example advanced comparison menu.

FIG. 24 illustrates an example Shopping Assistant system user interface 24000 presented via a browser (or other interface application) to a user. The example user interface provides the user with a set of advanced shopping comparison options. In this example user interface, the web page of FIG. 24 is displayed in response to a user selecting the Advanced Compare control 16520, see FIG. 16. Optionally, the browser user interface display includes a collection of web-site common controls 24200 including branding, an alert/notifier, and contact and help information links. Optionally, a user can select or click on the geographic price comparison control 24310 which causes a new web page display allowing the user to compare the pricing of items purchased at two or more non-local locations, see FIG. 25. Optionally, the browser user interface display includes other price comparison controls. For example, optionally, the SA system determines the most convenient (least travel time) shopping experience 24330 subject to item availability and threshold pricing. In another example, a user might specify that the system determine the most convenient shopping experience for the selected items provided the total cost of the items does not exceed a threshold price percentage greater than 20% of the lowest cost purchase. In another example, the user can request that the system determine the lowest overall cost to shop for the list of items including the possibility of traveling and shopping at multiple merchants 24330. Again, the user optionally can specify the range (e.g., in miles) and number of merchants as constraints in determining the lowest overall cost. Optionally, the browser user interface display includes a back control 24340.

Figure 25:
FIG. 25 illustrates another example Web-based SA user interface display of merchant selection with a first and second location merchant search control.

FIG. 25 illustrates an example Shopping Assistant system user interface 25000 presented via a browser (or other interface application) to a user. The example user interface enables the user to compare shopping at two separate locations. In this example user interface, the web page of FIG. 25 is displayed in response to a user selecting the Geographic Advanced Compare control 24310 in FIG. 24. Optionally, the browser user interface display includes a collection of web-site common controls 25200 including branding, an alert/notifier, contact and help information links, and a search function to assist the user in finding receipts, merchant locations, and/or individual shopping items. Additionally, in this example user interface display, there is a second location control 25300. User's can type (or cut and paste) into the text box, a geographic location in which a selection of items is to be compared. Optionally, the user can select a previously entered location (location stored by the SA system) by selecting the pull down menu control 25330 or select from other options (e.g., radius of search in miles, kilometers, etc.). Optionally, once a user has typed in a location and/or selected a location from a list of locations, the user then instructs the system to begin a comparison by clicking the search control 25310. Optionally, invalid distances and/or locations will result in the display of an error message. Optionally, a first location control 25400 is displayed with controls similar to that described for the second location control 25300. Optionally, the SA system 1000 enters the user's city, state, and zip code of the first location in the text box 25400.

Figure 26:
FIG. 26 illustrates another example Web-based SA user interface display of a merchant selection with a first and second location merchant search control with a user entered second location.

FIG. 26 illustrates an example Shopping Assistant system user interface 26000 presented via a browser (or other interface application) to a user. The example user interface illustrates a user typing in a geographic location into the text box of the second location control 26300. The browser user interface display 26200 and controls 26310-26330 are the same as those described in FIG. 25.

Figure 27:
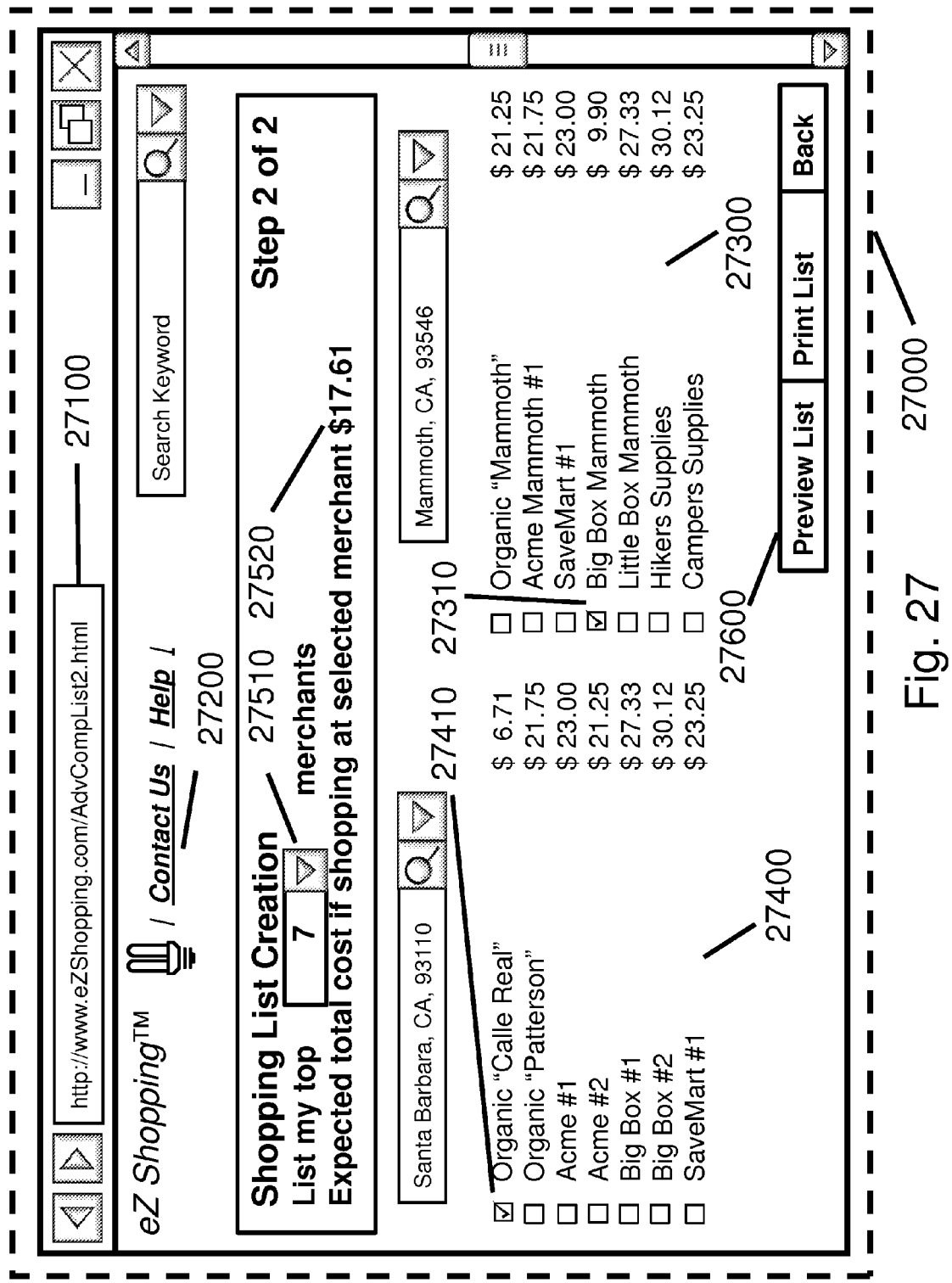
FIG. 27 illustrates another example Web-based SA user interface display of merchant selection with two merchants selected, each in different non-local locations.

FIG. 27 illustrates an example Shopping Assistant system user interface 27000 presented via a browser (or other interface application) to a user. The example user interface displays the results from the SA system comparing shopping at two separate locations. In this example user interface, the web page of FIG. 27 is displayed in response to a user selecting a geographic location 26300 and selecting the search control 26310, see FIG. 26. Optionally, the browser user interface display includes a collection of web-site display items and controls identical to those described in FIG. 25. Additionally, in this example user interface display, the results of the price comparison are displayed using the two specified locations. The SA system 1000 optionally selects the lowest cost merchants, none or one per location (default). The SA system 1000 optionally queries internal or external databases to determine the lowest prices for the selected items. If a user has not frequented merchants in the second location (e.g., not scanned receipts into the SA system), the system will determine other methods of merchant selection. For example, the system might use merchant pricing or frequency of use by other members of the SA system 1000 in the second location. In the example user interface display, the SA system 1000 selects the merchant "Organic Calle Real" 27410 in the Santa Barbara, Calif. list 27400 and "Big Box Mammoth" 27310 in the Mammoth, Calif. list 27300. In this example, the total cost 27520 to the user by visiting a merchant in Santa Barbara and a merchant in Mammoth is $16.61 as compared to the cost 26520 (see FIG. 26) of visiting a single merchant in Santa Barbara at $21.25 and the cost 27520 of $17.61 achieved by visiting two merchants in Santa Barbara.

Figure 28:
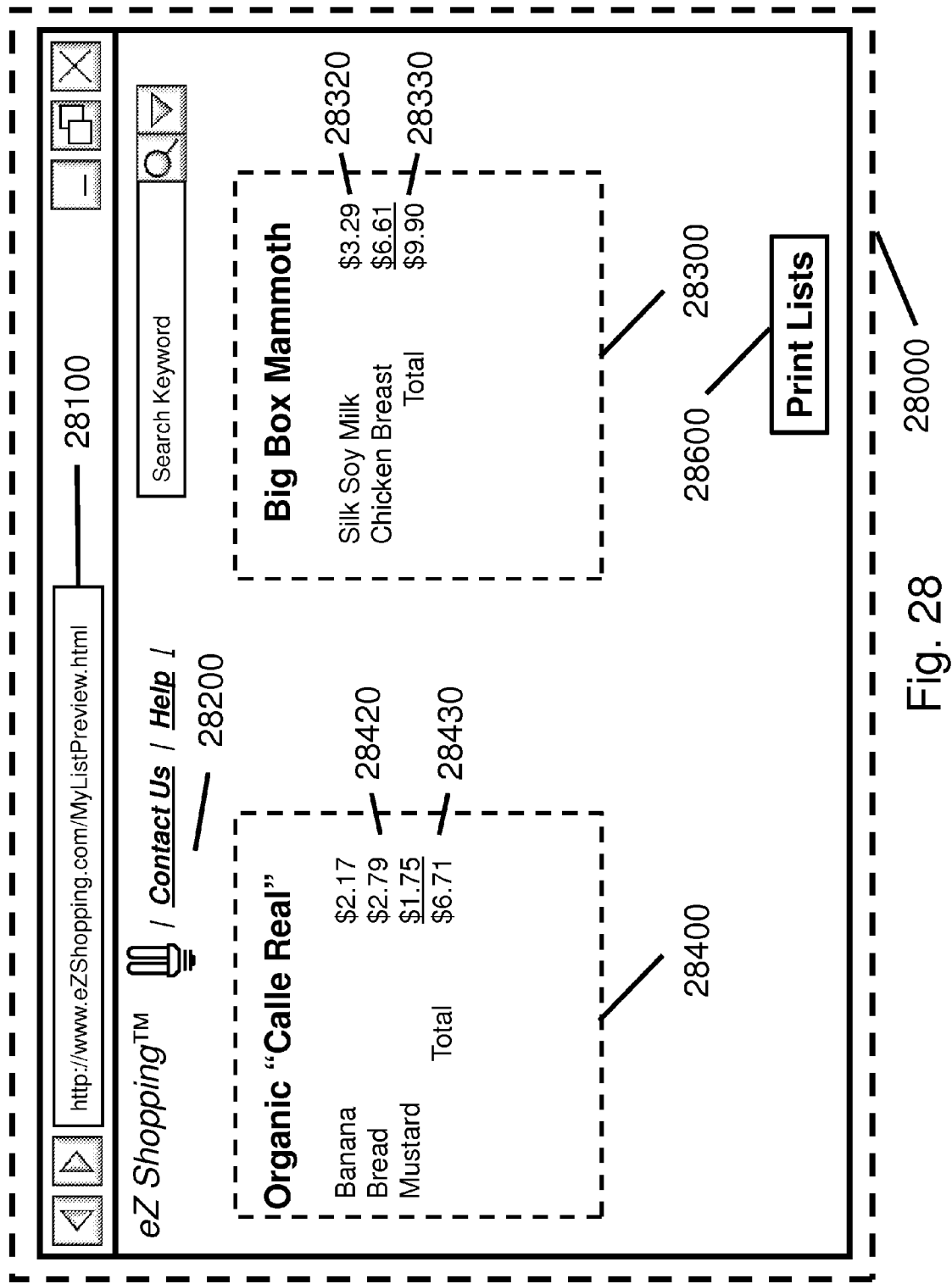
FIG. 28 illustrates another example Web-based SA user interface display of two merchant shopping lists, each in separate non-local locations.

FIG. 28 illustrates an example Shopping Assistant system user interface 28000 presented via a browser (or other interface application) to a user. The example user interface is used to preview one or more shopping lists 28300 and 28400 created from the SA system 1000 step 1 shopping item selection(s) and advanced compare, two separate, non-local merchant selection(s). The web page can optionally be accessed by selecting a control on a widget/gadget application program, by supplying the appropriate Uniform Resource Locator (URL) to the browser 28100, by selecting a link in response to a search query, or the like (the latter two access methods optionally would require the user first login by submitting a user id and/or password), by selecting the list preview control 27600 in FIG. 27. Optionally, the browser user interface display includes a collection of web-site common controls 28200 including branding, an alert/notifier control (when selected by the user displays the Shopping Assistant Home Page including any listed alert messages (see FIG. 11)), search, and contact and help information links. Optionally, the user can print the shopping lists 28300 and 28400 by selecting the print control 28600.

Figure 29:
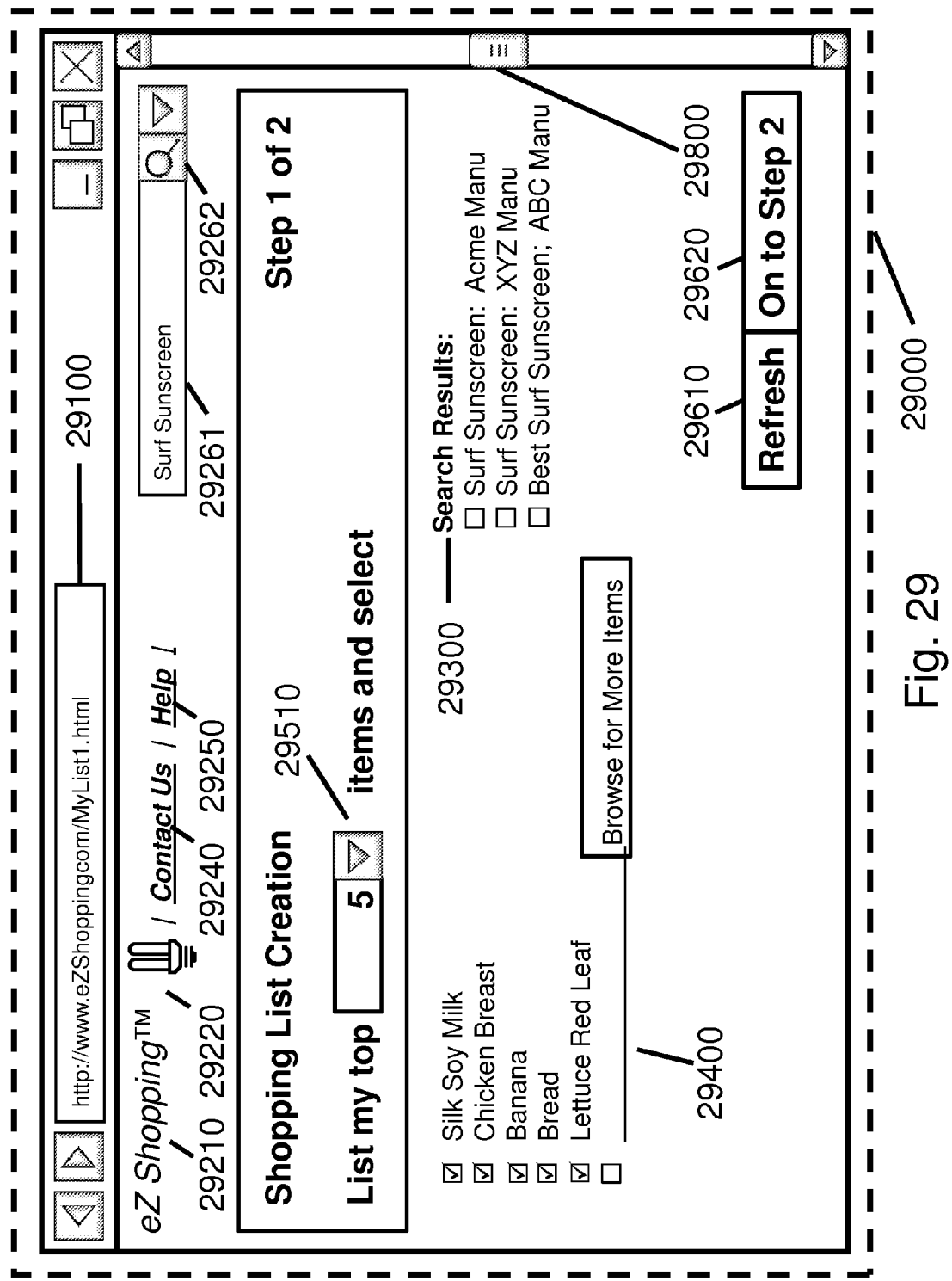
FIG. 29 illustrates another example Web-based SA user interface display of the creation of a shopping list of items using a SA search control.

FIG. 29 illustrates an example Shopping Assistant system user interface 28000 presented via a browser (or other interface application) to a user. The example user interface provides the first of two steps in creating a shopping list and can also be used to search for specific items. The web page can optionally be accessed by selecting a control on a widget/gadget application program (e.g. 5400 in FIG. 5), by selecting the grocery control 11910 in FIG. 11, by supplying the appropriate Uniform Resource Locator (URL) to the browser 29100, by selecting a link in response to a search query, or the like. Optionally, the browser user interface display includes a collection of web-site common controls including branding 29210, an alert/notifier 29220, and contact and help information links 29240 and 29250. The display and controls in FIG. 29 are similar to those described in FIG. 12. Optionally, when a user accesses the web page, a default number of grocery/shopping items are displayed 29400. In this example, the default number 29510 of items is set to 5. The SA system lists the 5 most commonly purchased grocery items 29400. Optionally, there is a control 29510 which allows the user to display a larger or smaller list (e.g., 10, 15, 25, 30, all items by selecting from a pull down menu). Optionally, the user can select the text box and directly enter the desired number of items (e.g., a user can type in the number 7 to see a display of the 7 most common items purchased). Optionally, if the user enters a value exceeding the number of items entered into the system by the user, the system displays all items entered into the SA system 1000 by the user. Optionally, if there are more items in the list than can fit in a single web page view, the browser includes a scroll control 29800. Each of the items in the list 29400 is a linked URL that when selected provides the user with additional detail regarding the selected item (for example by displaying additional information underneath the item or presenting a new web page window with the additional information—see FIG. 10 for an example display of additional information 10221-10224 that can be provided by the SA system). To finish creating a shopping list, the user selects the On to Step 2 button/control 29620 which links to another web page (see FIG. 15).

Optionally, a user can type in a keyword in the text box 29261 and request a search for an item by selecting the control 29262. Optionally the results of the search 29300 are displayed to the right of the shopping list 29400.

Figure 30:
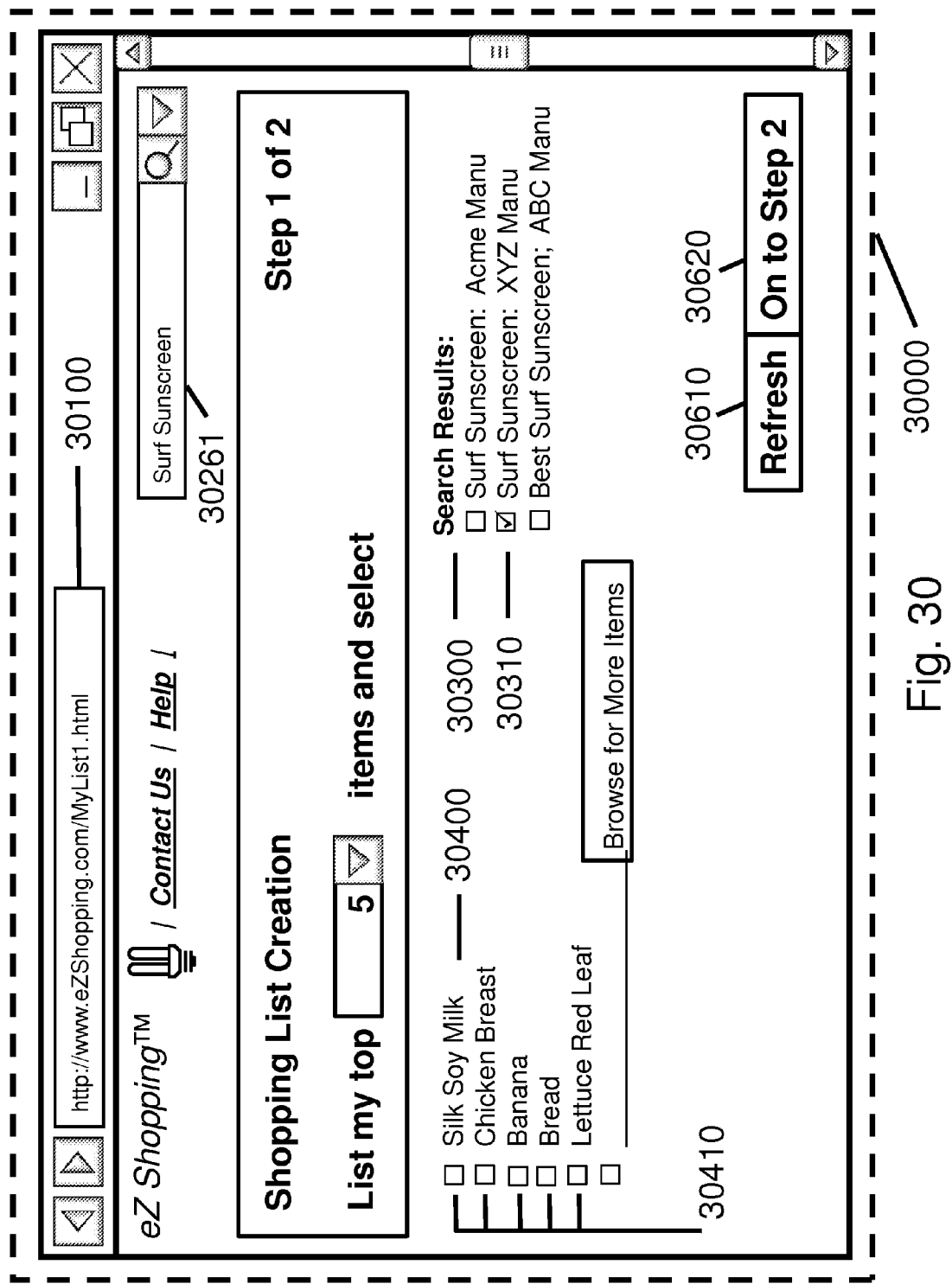
FIG. 30 illustrates another example Web-based SA user interface display of the creation of a shopping list of items with an item selected from SA search results.

FIG. 30 illustrates an example Shopping Assistant system user interface 30000 presented via a browser (or other interface application) to a user. The example user interface illustrates changes to the user interface web page of FIG. 29 if the user unselects a list of preselected items 30410 and selects an item from the search results, "Surf Sunscreen XYZ Manufacturer" 30310. A user selecting an item indicates to the SA system 1000 that the item is to be included in the user's shopping list. Other display elements and controls of FIG. 30 are identical to those described in FIG. 29.

Figure 31:
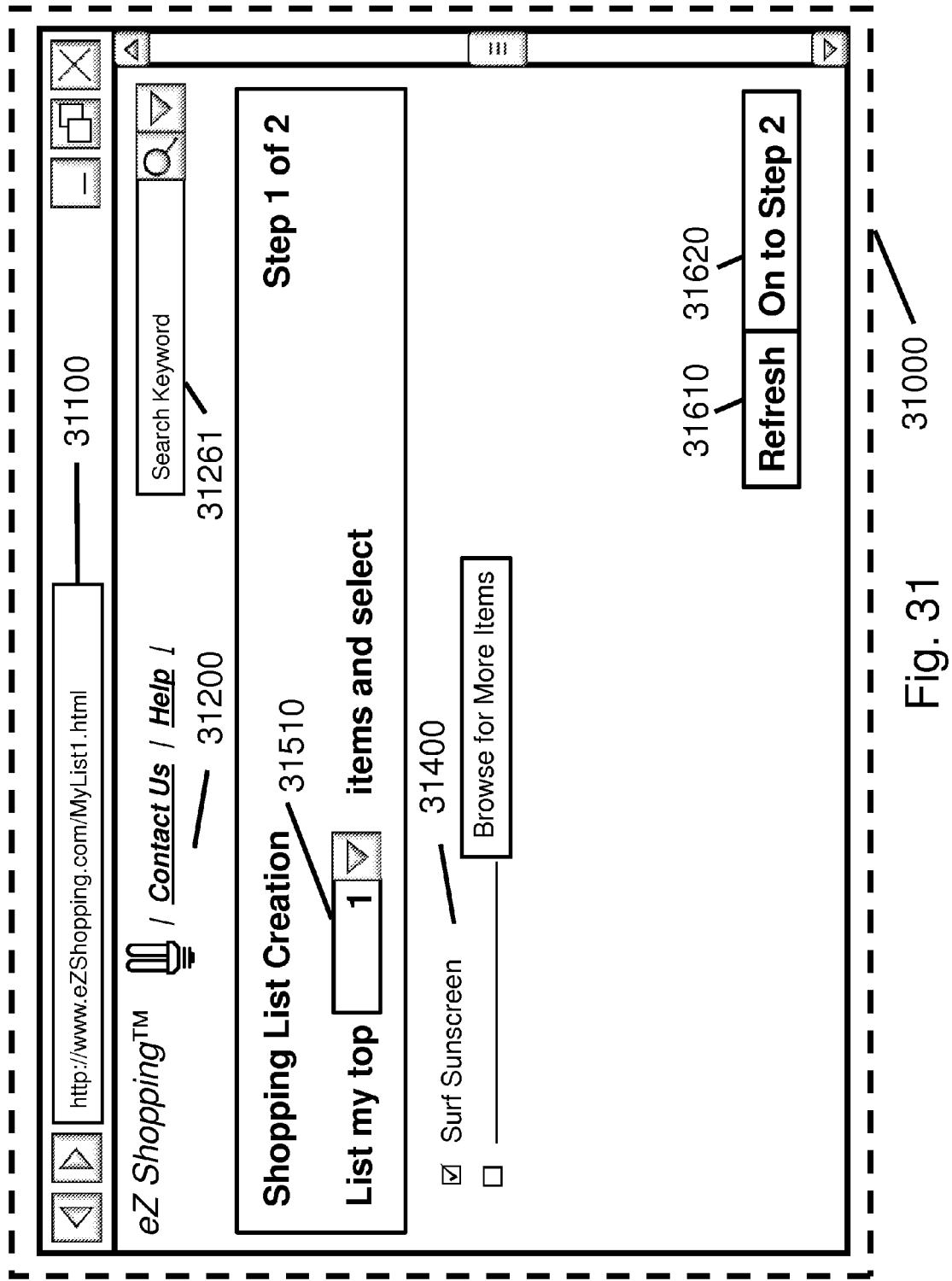
FIG. 31 illustrates another example Web-based SA user interface display of the creation of a shopping list after a user selected one or more items and unselected one or more items then selected the refresh screen control.

FIG. 31 illustrates an example Shopping Assistant system user interface 31000 presented via a browser (or other interface application) to a user. The example user interface illustrates changes to the web display of FIG. 30 if a user has selected an item 30310 from a search result, deselected other shopping list items 30410, and then selected the web page refresh control 30610. Optionally, the SA system 1000 removes the deselected items and displays the selected items in the shopping list area of the screen 31400. Other display elements and controls of FIG. 31 are similar to those described in FIG. 29.

Figure 32:
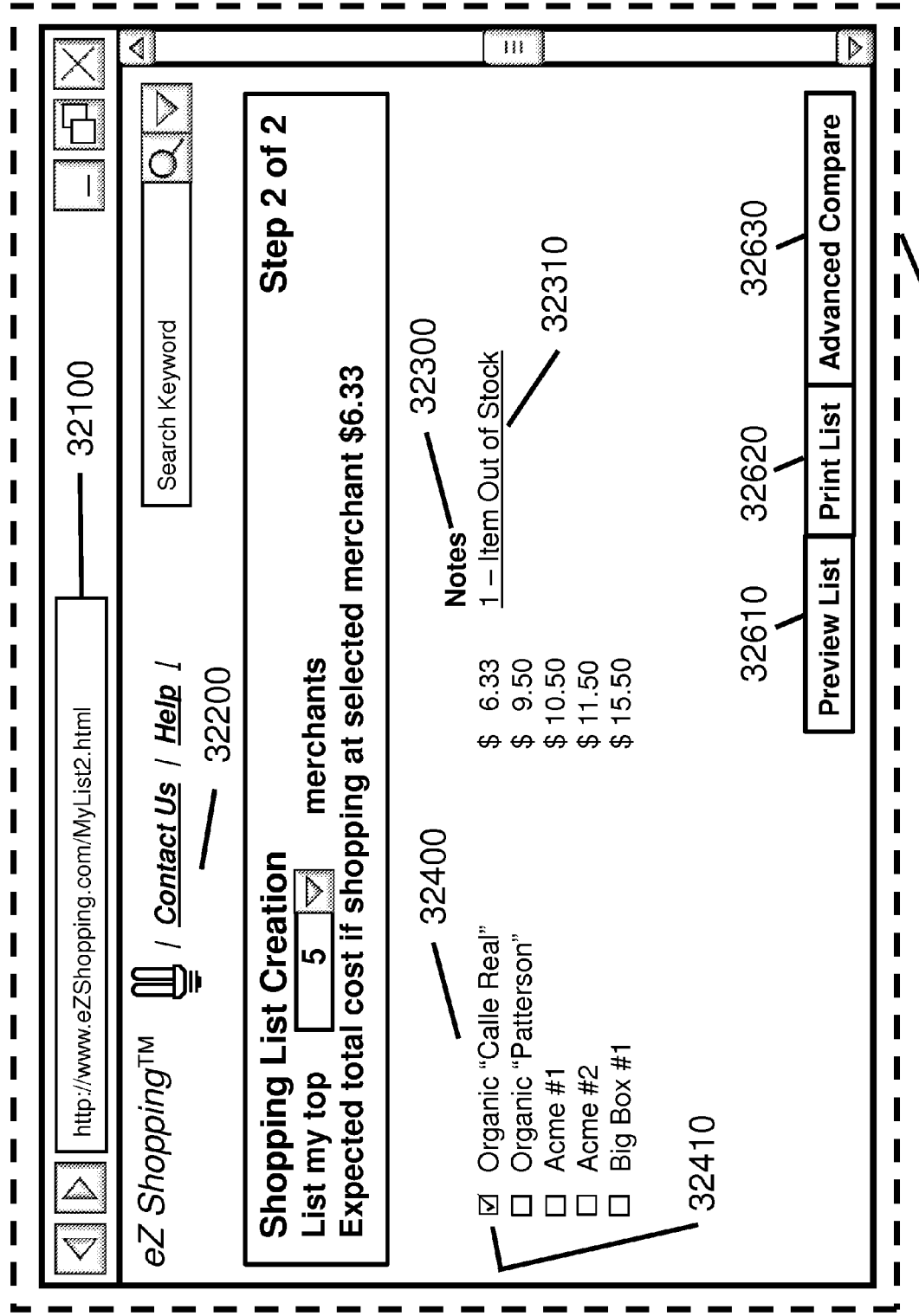
FIG. 32 illustrates another example Web-based SA user interface display of merchant selection of one or more items, including a merchant in which an item in the user's shopping list is out-of-stock.

FIG. 32 illustrates an example Shopping Assistant system user interface 32000 presented via a browser (or other interface application) to a user. The example user interface provides the second of two steps in creating a shopping list. Optionally, the browser user interface display includes a collection of web-site common controls 32200 similar to those described in FIG. 15. In this example, the SA system displays a list 32400 of the local merchants frequented by the user and where an item selected in a Search request can be purchased. In this example items out-of-stock at a particular merchant are noted in area 32300 to the right of the merchant list. Optionally, the out-of-stock note 32310 is a control which opens a new web page (or child web page) to display additional information about one or more out-of-stock items.

Figure 33:
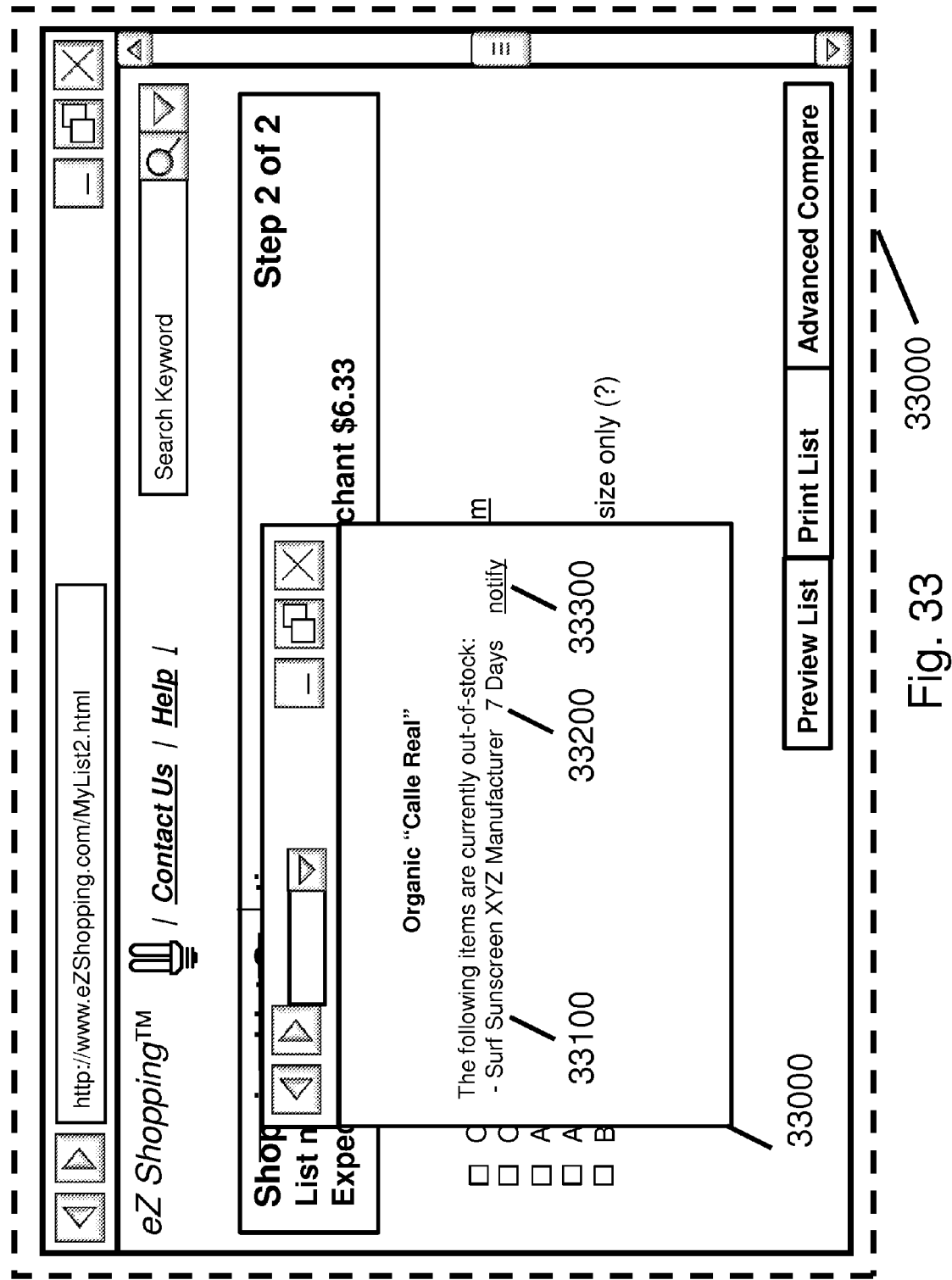
FIG. 33 illustrates another example Web-based SA user interface display of a child Web page providing additional information on an out-of-stock item.

FIG. 33 illustrates an example Shopping Assistant system user interface 33000 presented via a browser (or other interface application) to a user. The example user interface provides additional information on out of stock item(s). The web page display is presented in response to a user selecting the out-of-stock control 32310 as described in FIG. 32. The web page 33000 in this example is a new or child web page with limited controls. The web page 33000 provides additional information to the user including, for example, the item description 33100, the expected period before the item is restocked at the merchant 33200, and a notification control 33300.

Figure 34:
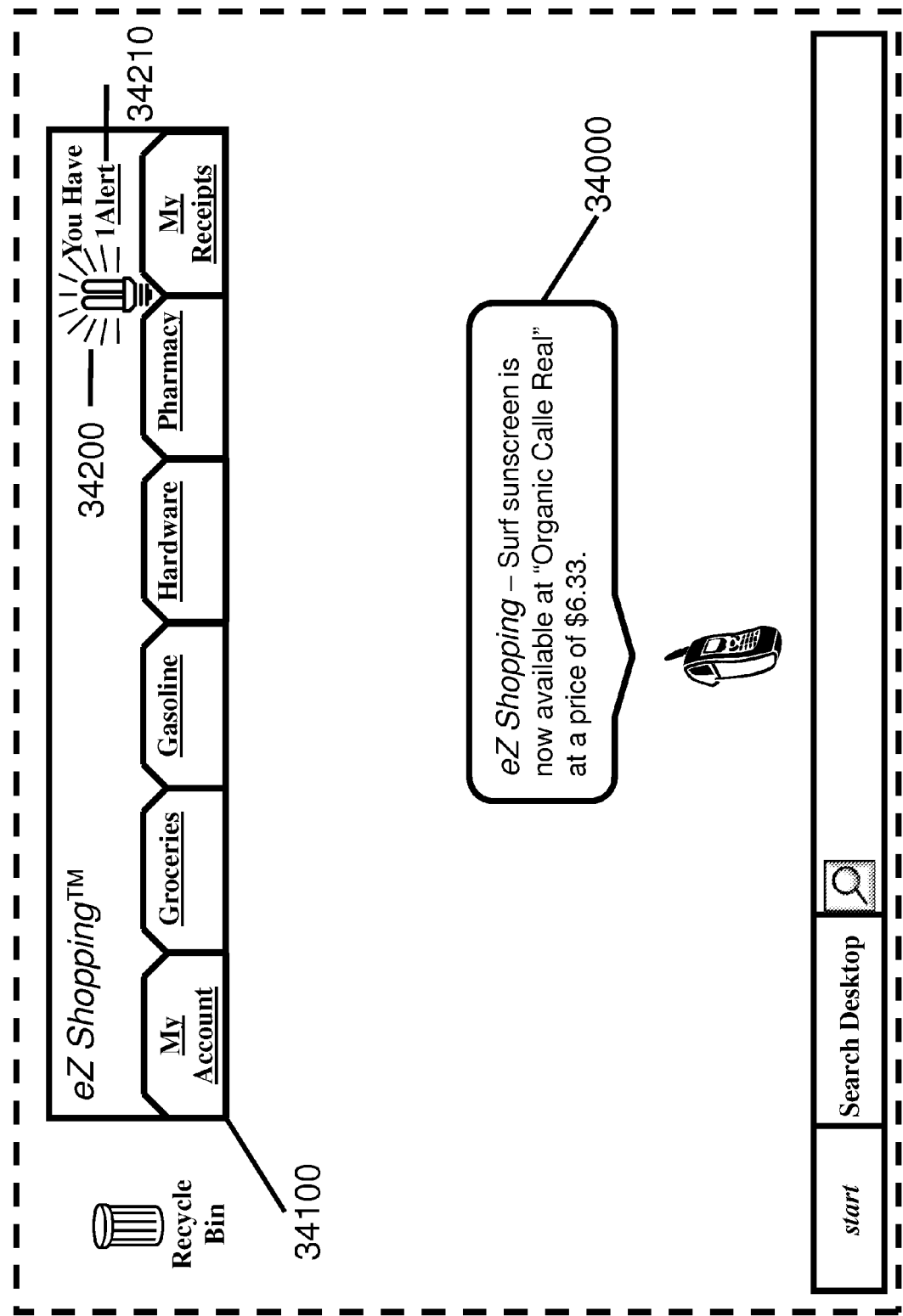
FIG. 34 illustrates an example text message and widget/gadget notification alert from the SA system.

FIG. 34 illustrates an example alert from the SA system to a user's mobile device 210. In this example alert notification, the SA system sends the message "Surf sunscreen is now available at "Organic Calle Real" at a price of $6.33" 34000. This message alerts the user to the availability of an item which was previously out of stock at the merchant Organic "Calle Real". In this example, the Widget user interface display 34100 also notifies the user that one or more alerts 334200 and 34210 are pending the user's review.

Figure 35:
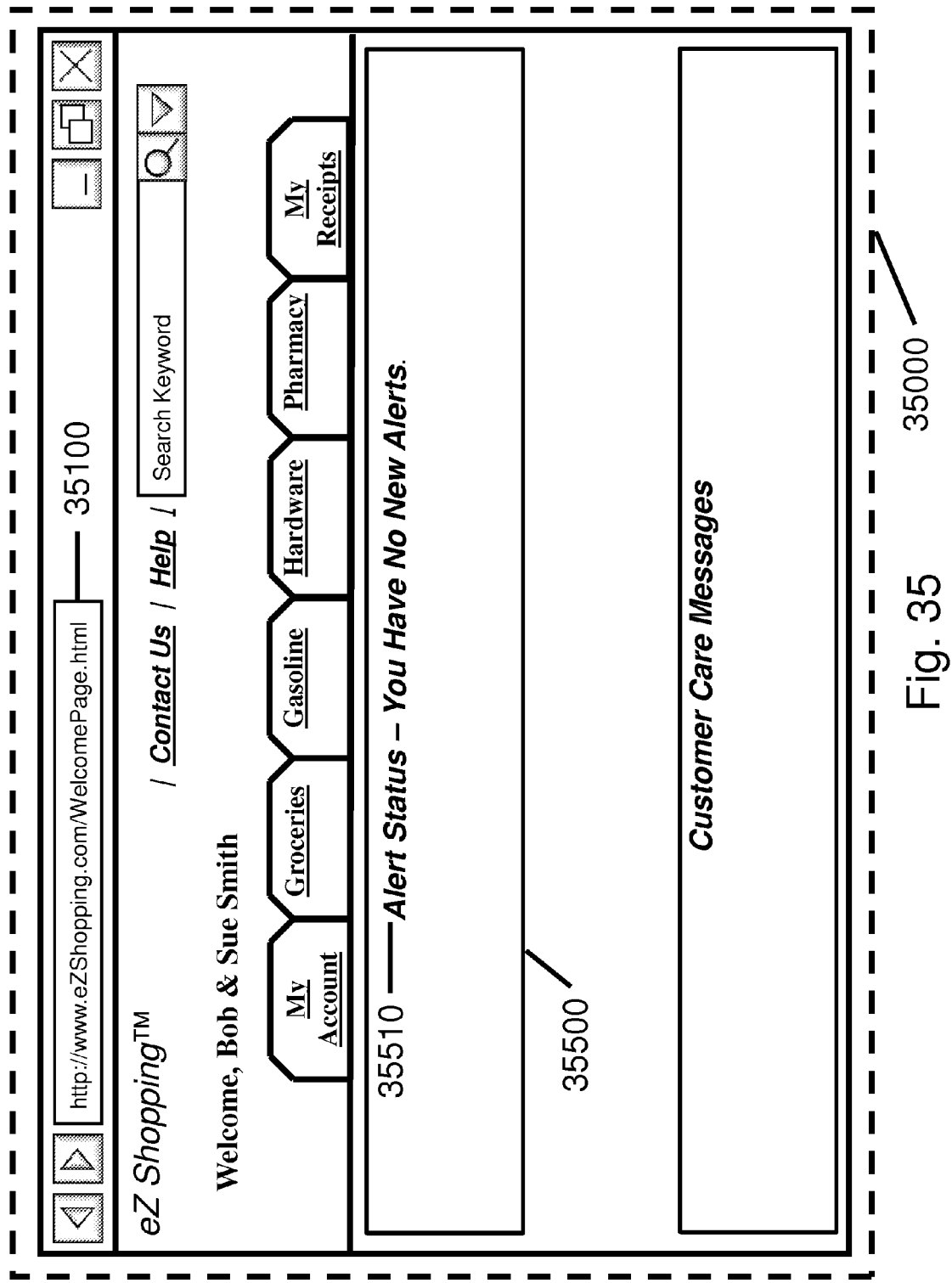
FIG. 35 illustrates another example Web-based SA user interface display of the user's Home/Welcome page to display, alerts, account summary status, and to provide navigational controls.

FIG. 35 illustrates an example Shopping Assistant system user interface 35000 presented via a browser (or other interface application) to a user. The example user interface illustrates changes to the web display of FIG. 11 if a user selects an alert message 11400 by using the select control 11710, and clicking the delete control 11720. Optionally, the SA system 1000 replaces the alert message from the alert display 35500 with a "You Have No New Alerts" message 35510. Other display elements and controls of FIG. 35 are similar to those described in FIG. 11.

Example Embodiments

See FIGS. 36-45

FIGS. 36 through 43 illustrate example workflows of operation of a Shopping Assistant system described in detail above in this document. Process states are listed on the left and major elements of the operating environment of FIG. 1 are listed across the top. Using solid lines with arrows to signify the direction of information flow, the diagram pictorially represents process flow and interactions between the elements in each example embodiment.

Figure 36:
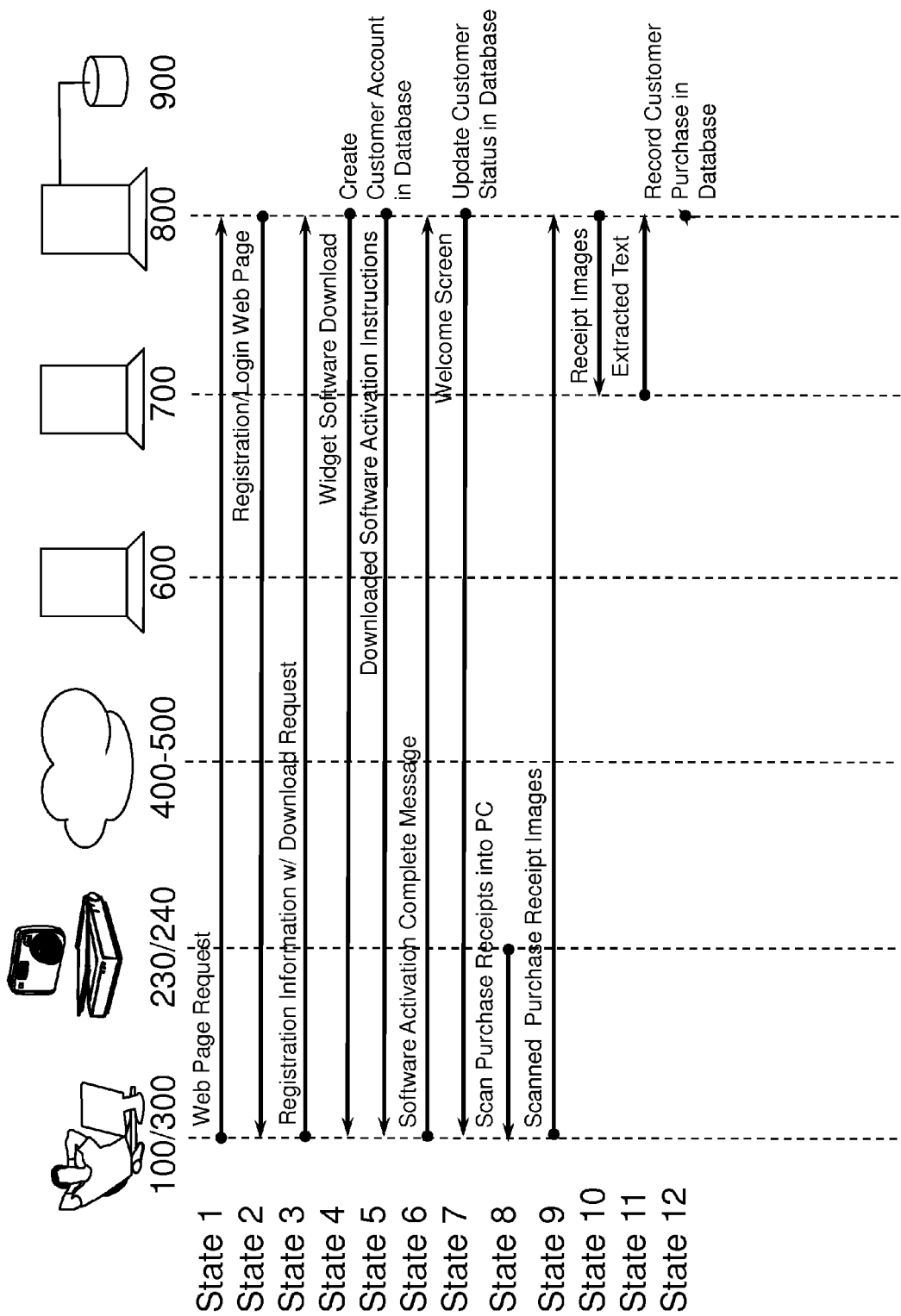
FIG. 36 illustrates the first twelve states of a first example operating environment/process for a Shopping Assistant system.
Figure 37:
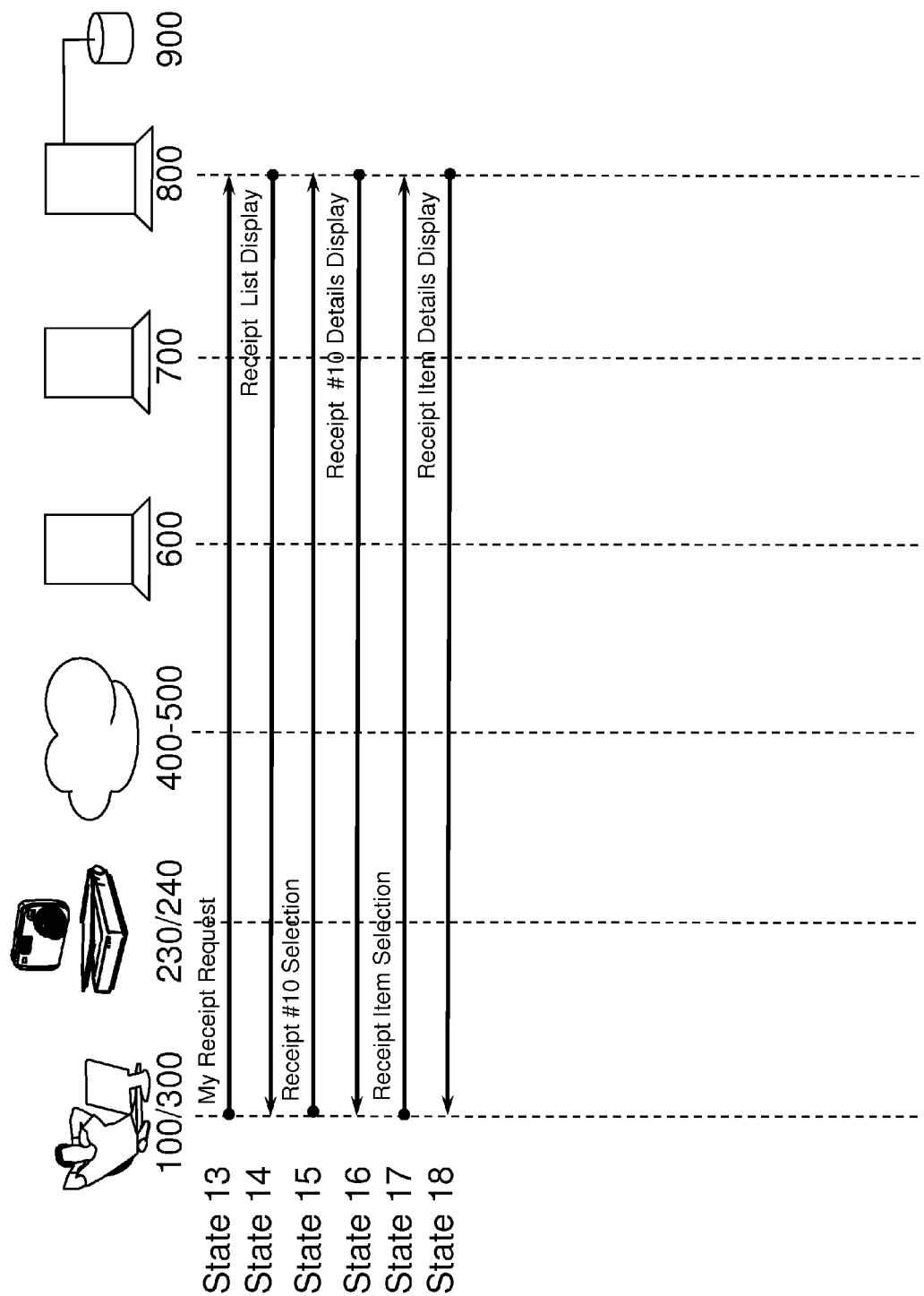
FIG. 37 illustrates states thirteen through eighteen of a first example operating environment/process for a Shopping Assistant system.
Figure 38:
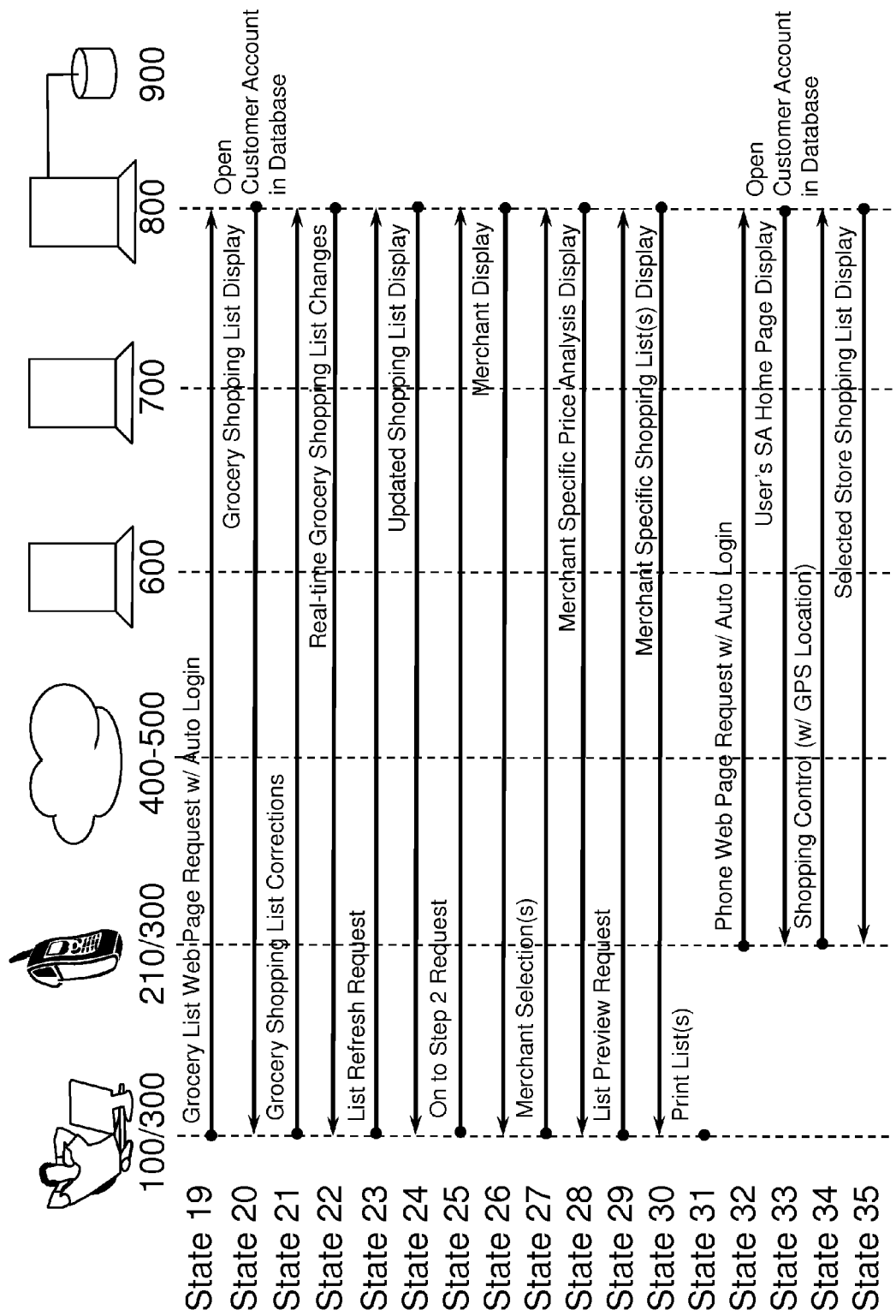
FIG. 38 illustrates states nineteen through thirty-five of a first example operating environment/process for a Shopping Assistant system.
Figure 39:
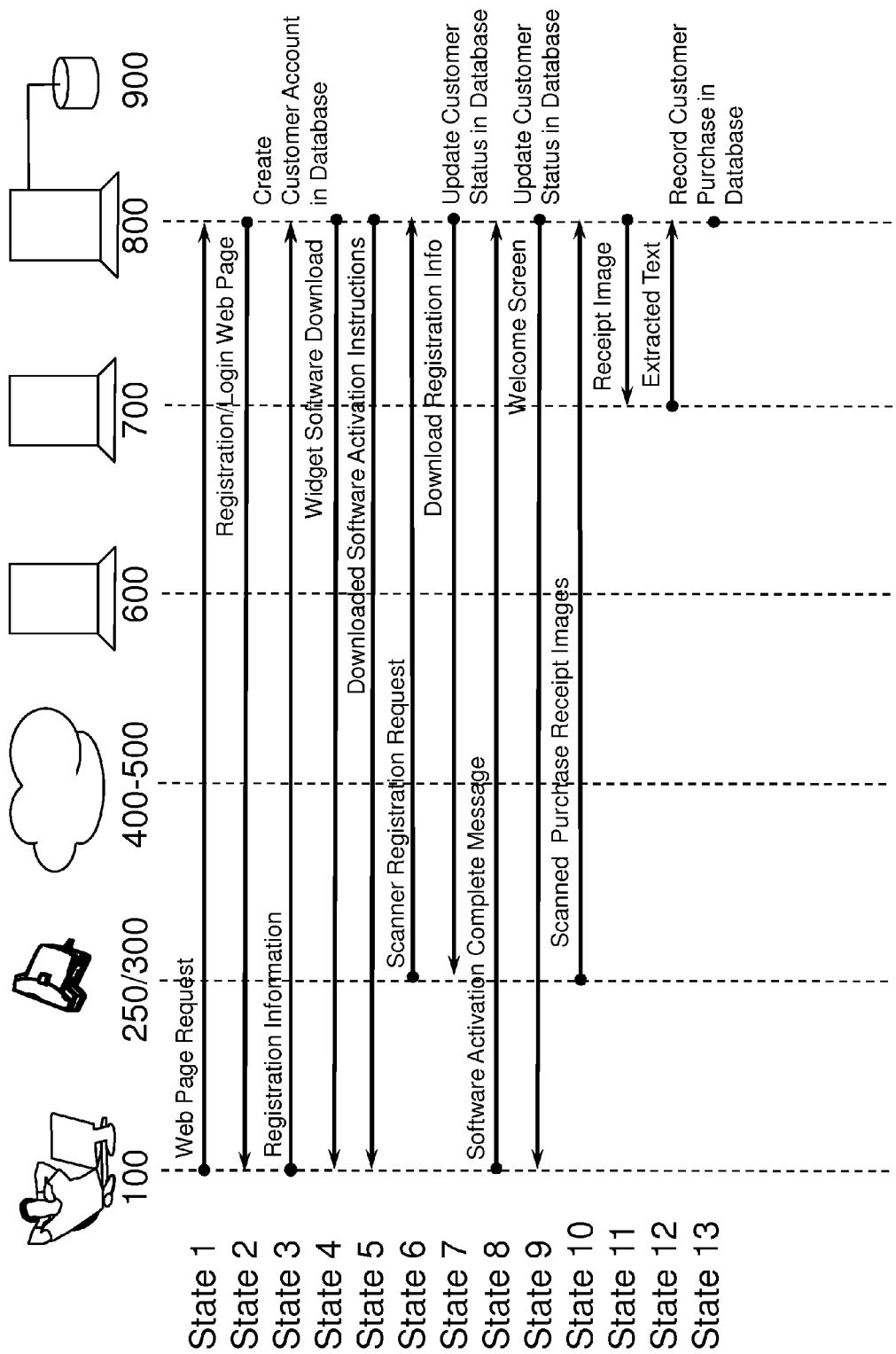
FIG. 39 illustrates the first thirteen states of a second example operating environment/process for a Shopping Assistant system.
Figure 40:
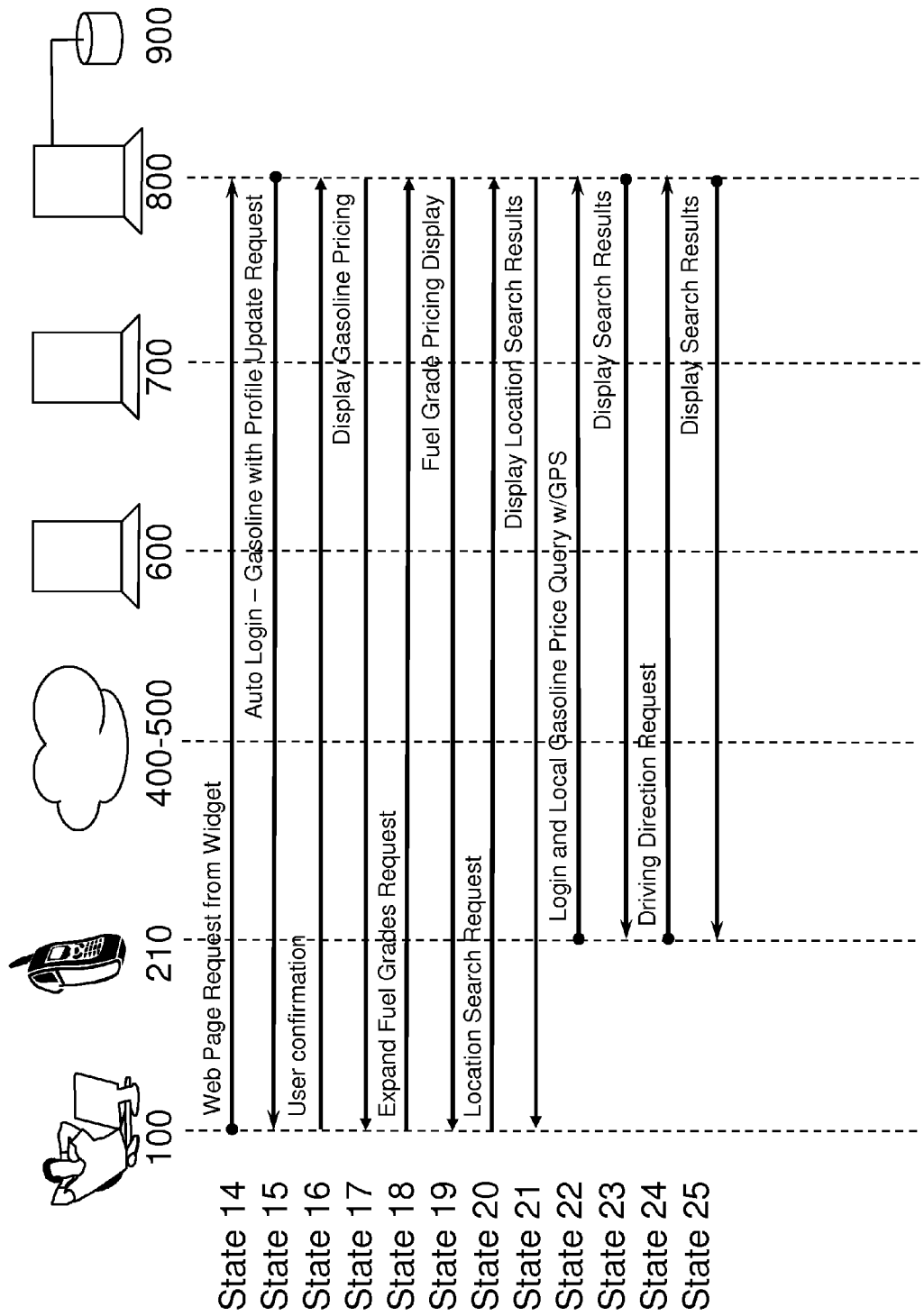
FIG. 40 illustrates states fourteen through twenty-five of a second example operating environment/process for a Shopping Assistant system.

FIGS. 36-43 depicts example embodiments where a user purchases items from a retail merchant and the user scans in the associated receipts or the purchase data is accessed electronically from the merchant. The data from receipts/purchases are recorded in a database/file store and used to create a user purchase history which is then used to create shopping lists based on a user selected merchant and the best price. FIGS. 36-38 detail the first example scenario where the user scans in their merchant receipts and later creates a price optimized grocery shopping list. FIGS. 39-40 detail the second example scenario where the user scans in their gasoline purchase receipts and later uses the SA system to determine the best price to fill up the user's automobile. A third example scenario, detailed in FIG. 41, describes the use of the SA system to compare shopping for items in two separate non-local geographic areas. A fourth example scenario, detailed in FIGS. 42-43, describes the use of the SA system to track the availability of a specific item at one or more merchants.

First Example Embodiment

See FIGS. 36-38

In this example, the user deploys a PC connected scanner 230 or camera 240 to capture an electronic image of their purchase receipts. A couple of weeks after registration and receipt capture, the user creates a least cost grocery shopping list. PC connected scanner/camera types can optionally include a pull through scanner, a flatbed scanner, a handheld scanning wand, a fax machine, a mobile phone camera, a digital camera, etc. Alternatively, a customized receipt scanner 250 with a direct network attachment arrangement can also be used. Purchase item renaming and web site access is managed by client software 300 that runs on the user's PC 100.

State 1 of FIG. 36. The user accesses the Shopping Assistant (SA) service provider web site. In this example, the user browses to the SA web site using a PC 100 connected to data network 400. Optionally, any data networking capable device can be used by the user including for example, a mobile phone with data networking capabilities.

State 2. The SA service provider's web hosting server 800 receives the web page URL and presents a login/registration web page to the user.

State 3. The user fills in the user ID and password fields in the web form and clicks a register and/or download button.

State 4. The hosting web server 800 receives the information entered by the user and in this example creates a new customer account in the Shopping Assistant Database 900. In this example, one or more software programs 300 are next downloaded from the SA server 800 over the data network 400 and installed on the user's PC 100. These application programs 300 can be native client software, web browser plug-ins, or a standalone widget/gadget.

State 5. The web server 800 notifies the user over the data network 400 at the PC 100 that the software program download (e.g., widget or gadget) is complete and provides instructions to the user on how to activate the software program 300.

State 6. The user follows the provided instructions to activate the downloaded software program 300 on their PC 100. The software 300 optionally acknowledges the activation by sending a message to the web server 800.

State 7. The SA server 800 records that the user account is operational and optionally causes a Welcome web page to be displayed on the user's PC 100. In addition, the client widget 300 is also launched (see FIG. 5, note a Welcome web page is not displayed in this example).

State 8. At some point in the future, the user purchases items from a conventional bricks-and-mortar merchant (e.g. a local grocery store). The user next scans the merchant purchase receipt by using a conventional scanner 230 connected to the user's PC 100. The scanned receipt is optionally stored in a folder C:\MyDocuments\eZShopping\ScannedFiles 6100 (see FIG. 6). In this example, the scanned receipt 6200 is labeled SA__2008-09-05-1.pdf.

State 9. The user then optionally drags-and-drops the scanned image file 7200 onto the widget 7000 running on their desktop (see FIG. 7). This causes the widget 7000 to transmit the scanned image file 7200 of the purchase receipts along with any and all necessary user account login and password information to the SA server 800. The widget drop down message display 7100, see FIG. 7, notifies the user that information processing is under way and that they should wait a moment before proceeding further. Alternatively, the user emails the scanned image of their receipts to the SA provider server 800 and adds their login credentials/account information to the email body or subject line. In another alternative embodiment, the user faxes a copy of the receipt to the SA service provider's Phone Server 600 with user account information on an attached cover page.

State 10. The SA web server 800 optionally forwards the receipt image file on to the DSP server 700 for image processing.

State 11. The scanned receipt is optionally converted into a text document by the DSP servers 700 which it returns to the SA server 800.

State 12. The SA server 800 optionally parses the text document to extract key parameters about the purchase. The server 800 then optionally stores the receipt image and its extracted text fields in the registered customer's account in the SA database 900 or server file system.

State 13 of FIG. 37. Later, the user later decides to confirm the receipt was received and stored by the system. The user selects the "My Receipt" control 5800, see FIG. 5.

State 14. The server 800 receives the user request, opens a new browser on the user's PC 100 and displays a collection of images of user receipts 8300, see FIG. 8.

State 15. In this example, the user selects merchant receipt #10 8310 to review, see FIG. 8. The user is interested in reviewing and/or editing the details of the receipt. The user double clicks on the receipt thumbnail 8310.

State 16. The web server 800 receives the user request to review the individual receipt #10 8310. The web server 800 displays the receipt together with the extracted text of the purchase items 9300, see FIG. 9.

State 17. The user elects to see additional details associated with the item labeled "BC Muffin Mix" 9220, see FIG. 9. The user selects the additional item detail control 9210.

State 18. The web server 800 receives the user request for additional item detail and, in this example, displays to the user the item name 10221, manufacturer 10222, model 10223, and quantity 10224, see FIG. 10.

States 8-12. The user repeatedly scans their merchant receipts after shopping using the process described above. The SA accumulates the receipt data and creates a list of shopping items and merchants frequented by the user.

State 19 of FIG. 38. The user is getting low on milk and needs to go to the local merchant. The user decides to use the SA to generate a grocery list. The user accesses their account by clicking on the groceries desktop widget control 5400, see FIG. 5, that opens a browser and auto logs the customer into their account's grocery shopping list creation page, see FIG. 12.

State 20. Upon receipt of the account access request, the SA server 800 performs any login authentication, opens the user's grocery shopping list creation web page, queries the SA database 900, retrieves an ordered list of the 5 (default) most common grocery shopping items, and displays them to the user, see FIG. 12.

State 21. The user decides to shop for 4 of the 5 items listed and unchecks the lettuce item by toggling the check box control 12310 next to the lettuce line item, see FIG. 12. In addition, the user needs to purchase some mustard so the user begins to type mustard in the text field 13320, see FIG. 13.

State 22. The SA server 800 receives the characters entered by the user in substantially real-time and after a match is detected, auto-fills the entry for the user with the word "mustard". (For example, the SA system queries an internal database of grocery items to determine an item name match.) Optionally, the user can browse through a list of grocery items by selecting the browse more items control 13330.

State 23. The user is finished creating the list of items for shopping and selects the refresh control 13500 to clean up the list (remove unchecked items and underlines).

State 24. In response to the user selecting the refresh control 13500, the SA server 800 redisplays the web page with unselected items removed from the list as shown in FIG. 14.

State 25. The user selects the "On to Step 2" control 14600, see FIG. 14.

State 26. The SA server 800 receives the request and queries an internal database to determine the lowest cost merchant (in this example, the SA server determines the lowest cost at a single merchant rather than multiple merchants) where the user can purchase all of the items listed on the user's shopping list. The SA server verifies all the items listed are in stock, determines the current price of the items at all of the merchants frequented by the user (as determined by a previous user selection/configuration and/or by the receipts previously scanned by the user), and displays the list of merchants and the associated expected total costs. The SA system optionally preselects the lowest cost merchant 15310, see FIG. 15.

State 27. The user decides that there is time to shop at a second merchant nearby so the user selects the merchant "Organic Calle Real" by selecting the check box control 15320, see FIG. 15.

State 28. The SA server 800 receives the request, acknowledges the selection by checking the displayed box control 16320 (see FIG. 16), and queries an internal database to determine which merchant each item in the list can be purchased from to minimize the user's overall cost. The results are displayed to the user. As can be seen in FIG. 16, the total cost for the list of items 16400 is $17.61, a lower total cost than purchasing all the items at a single merchant for $21.25.

State 29. The user previews the grocery shopping lists by selecting the List Preview control 16500, See FIG. 16.

State 30. In response to the user request, the SA server 800 displays two merchant shopping lists 17300 and 17400, item pricing, and expected total shopping costs at each merchant, see FIG. 17.

State 31. The user prints the shopping lists by selecting the print control 17500.

State 32. The user travels to the first merchant "Organic Calle Real" and realizes the printout of the shopping list is sitting on the printer. The user accesses the SA server 800 web site either by browsing on the phone or invoking a client/widget application on the user's mobile phone.

State 33. The SA server 800 remotely logs the user into their account and returns the user's SA Welcome display for their phone 22000, see FIG. 22.

State 34. The user selects the "Grocery shopping" control 22210, see FIG. 22.

State 35. The SA server 800 receives the "shopping" request and the GPS location coordinates of the user. The SA server 800 queries one or more databases and determines that the user is at or very near the "Organic Calle Real" merchant. The SA server 800 transmits the "Organic Calle Real" grocery list to the user's mobile phone for display to the user.

States 32-35. After shopping at "Organic Calle Real", the user travels to ACME #2. The user again accesses the SA server 800 web site to retrieve their shopping list either by browsing on the mobile phone or by invoking a client application on the user's mobile phone as described in States 32-35.

States 8-12. After the user returns home and stores the purchased items, the user scans the purchase receipts received from both stores as described in States 8-12.

Second Example Embodiment

See FIGS. 39-40

States 1-7. In this example, the user deploys a customized receipt scanner 250 to capture an electronic image of their gasoline purchase receipts. The user registers for the service, optionally downloads client software and/or a widget to the user's desktop PC and/or mobile phone using the process outlined in states 1-7 in the first example above.

State 1 of FIG. 39. The user accesses the Shopping Assistant service by browsing to the SA web site using a PC 100 connected to data network 400.

State 2. The SA service provider's web hosting server 800 receives the web page URL and presents a login/registration web page to the user.

State 3. The user fills in the user ID and password fields in the web form and clicks a register and/or download button.

State 4. The hosting web server 800 receives the information entered by the user and creates a new customer account in the Shopping Assistant Database 900. In this example, one or more software programs 300 are next downloaded from the SA server 800 over the data network 400 and installed on the user's PC 100.

State 5. The web server 800 notifies the user over the data network 400 at the PC 100 that the software program download is complete and provides instructions to the user on how to activate their shopping assistant service.

State 6. The user follows the service activation instructions to register their special purpose receipt scanner 250. This causes the scanner 250 to send a request to the SA web server 800 over data network 400.

State 7. The SA server 800 assigns and delivers a unique login identifier to the scanner 250.

State 8. The user follows the provided instructions to activate the downloaded software program 300 on their PC 100. The software 300 optionally acknowledges the activation by sending a message to the web server 800.

State 9. The SA server 800 records that the user account is operational and optionally causes a Welcome web page to be displayed on the user's PC 100. In addition, the client widget 300 is also launched.

States 10-13. The user next repeatedly records their gasoline purchases by scanning their receipts into the SA system 1000 using a similar process to that outlined in states 8-12 in the first example above. The SA system 1000 accumulates the receipt data and creates a database of the average amount of gasoline purchased, the frequency of purchases, the retail outlets (e.g., Shell), method of payment, and blend of fuel.

State 10. The user scans their gasoline purchase receipt using the special purpose receipt scanner 250. The scanner 250 sends the receipt image to the SA server 800 over data network 400. The scanner 250 also sends its unique scanner identifier.

State 11. The SA server 800 opens the user's account using the scanner identifier and records the receipt image in the database 900. The SA web server 800 optionally forwards the receipt image file on to the DSP server 700 for image processing.

State 12. The scanned receipt is optionally converted into a text document by the DSP servers 700 which it returns to the SA server 800.

State 13. The SA server 800 optionally parses the text document to extract key parameters about the purchase. The server 800 then optionally stores the extracted text fields from the receipt image in the registered customer's account in the SA database 900 or server file system.

State 14 of FIG. 40. After a couple of weeks the user is getting low on fuel so the user queries the Shopping Assistant service to determine the current lowest price for a local gasoline purchase. The user accesses their account by clicking on the desktop widget Gasoline control 5500 (see FIG. 5).

State 15. The SA server 800 receives the request from the widget over the data network 400, opens a browser on the user's PC 100, and auto logs the customer into the user's gasoline price comparison web page. In this example embodiment, the SA server 800 detects that all gasoline purchases by the user were made with a credit card with the last four digits ending in 1234. In addition, greater than a configurable threshold of purchases (e.g., 90%) were made from a particular retail outlet (e.g., Shell), indicating that the user might be using a reward/rebate credit card when purchasing automotive fuel.

Optionally, the SA server 800 prompts the user 18300 (see FIG. 18) to determine whether they have a credit card which rewards/rebates the user for fuel purchases from a specific retailer (for example, purchasing gasoline at a Shell station with a Shell credit card entitling a user to a 5% cash rebate). Optionally, the SA server 800 can infer the credit card type and simply prompt the user to confirm and/or the user can specify any discount associated with credit card purchase from a particular retailer.

State 16. In this example, the user selects the yes control 18310 confirming that they typically purchase fuel using a reward/rebate credit card from a particular credit card company, see FIG. 18. Optionally, the next time the user accesses the Gasoline section, the SA server 800 does not prompt the user to determine whether they have a reward/rebate credit card. Optionally the system logs the user directly into the gasoline price comparison (e.g., control passes directly to State 17, see FIG. 19).

State 17. The SA server 800 receives the user profile information regarding credit card purchases and updates the user's account profile in the SA database 900. Optionally, the SA server 800 next queries the SA database 900 and retrieves and displays on the user's PC 100 an ordered list (by frequency of use) of the gasoline stations frequented by the user 19310, the retailer's current gasoline prices for the grade typically purchased by the user 19320, and the expected cost for the user's average refueling 19340 (e.g., based on the average number of gallons of fuel purchased from the user's previously scanned gasoline receipts), see FIG. 19. Optionally, the system lists both credit card and cash prices. In some cases the credit price may be higher; in other cases it may be lower. For example, some gasoline stations offer a discount for cash purchases. In other cases, some service stations offer discounts and/or reward points for using a particular credit card. In this example embodiment, the user receives a 5% rebate if the purchase is made at a Shell gasoline retailer using the user's Shell credit card. The shaded box 19350 indicates those gasoline retailers offering competitive fuel prices but not visited by the user (e.g.'s, receipt not scanned or the user has not indicated to the SA system 1000 they have used the gasoline retailer). Each retailer listed 19310 is a clickable link. Clicking on a link optionally provides additional information on the retailer and driving directions from the user's home location to the gasoline retailer.

State 18. The user is curious what the price of premium fuel is at the listed retailers. To see prices for different grades of fuel the user selects the expand control 19330, see FIG. 19.

State 19. The SA server 800 receives the expand list fuel type request, queries the SA database, and displays the prices for the other grades of fuel at the 5 listed stations, see FIG. 20.

State 20. The user will be traveling out of town in the afternoon and will need to gas up outside the area. The user can select the location control 21260 and select gas stations within the local vicinity (e.g., 5 mile radius, 10 mile radius, 15 mile radius, 25 mile radius, etc.) using the pull down menu control 21263, see FIG. 21. Optionally, the user can select a new location by specifying the city and/or zip or other methods of location identification (e.g., airport codes) in the text field 21261. In this example the user types in the location "Santa Ynez, Calif." into the text box 21261 and selects the search control 21262.

State 21. The SA server 800 receives the search request, queries the SA database, and displays the lowest prices for Santa Ynez, Calif. subject to the user's profile (e.g., the SA system takes into account the discount the user would receive if the user patronizes a Shell station and pays with the user's Shell credit card), see FIG. 19 for an example display.

State 22. When traveling to Santa Ynez, the user unexpectedly gets a phone call and needs to continue on to San Luis Obisbo to attend an impromptu meeting. Rather than refueling in Santa Ynez, the user is pressed for time and travels directly to San Luis Obisbo. After the meeting, the user decides to go to a gasoline retailer to refuel. The user accesses the SA service from the user's mobile phone from the San Luis Obisbo area. The user activates the SA client on the user's mobile phone and selects the gasoline control 22220, see FIG. 22. The SA client running in the user's phone transmits the gasoline price query (and optionally the client application transmits user authentication information) to the SA server 800. Optionally, the user's location coordinates (e.g., GPS coordinates) are transmitted with the request in order for the SA server 800 to query one or more databases to determine local retailers and proximity of the user to the Gasoline retailers.

State 23. The SA server 800 receives the user request, queries an internal database regarding the local prices in San Luis Obisbo matching the user's profile, and displays on the user's mobile device 210 an ordered list (e.g., ordered by lowest price or by shortest travel distance) to the user, see FIG. 23. Optionally, in this example, given the limited screen size on the mobile phone the average cost to refuel is not displayed. Optionally, in this example, the distance 23220 from the user to the gasoline retailer is displayed. Optionally, each listed retailer 23210 is an active link. If selected by the user, a display of driving directions to the retailer is displayed.

State 24. The user decides to go to the "Shell Shoreline" retailer. The cursor is optionally positioned on the lowest cost option, which in this case is "Shell Shoreline". The user selects the "Shell Shoreline" control 23211 to get a display of driving directions from the user's present location to the Shell Shoreline station, see FIG. 23.

State 25. The SA server 800 receives the directions request from the SA client in the mobile phone, queries a location database with the "Shell Shoreline" location and the user's location based on the user's GPS location. The resulting driving directions are transmitted to the SA Client and displayed to the user (not shown in the figures).

Third Example Embodiment

Figure 41:
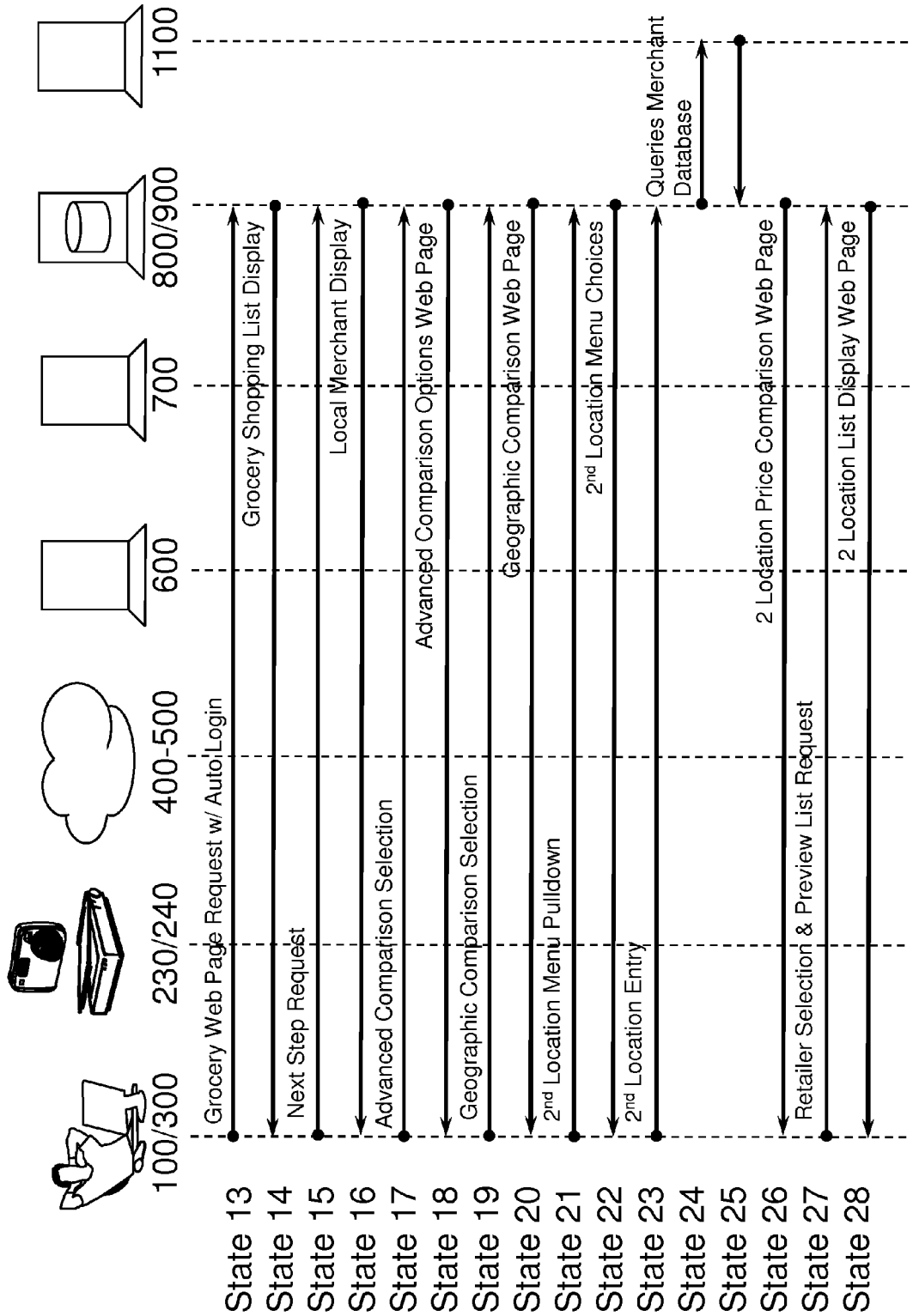
FIG. 41 illustrates states thirteen through twenty-eight of a third example operating environment/process for a Shopping Assistant system.

See FIG. 41

This example embodiment is similar to the first example. The user, living in Santa Barbara, Calif., is using the Shopping Assistant service to create a grocery list. In this case, the user is planning to spend the weekend in their second home in Mammoth, Calif. The user is interested in purchasing their vacation groceries and is curious as to whether the items should be purchased only in Santa Barbara, only in Mammoth, or some groceries in each location. As illustrated below, the user selects the advanced comparison option of the Shopping Assistant system and determines that the total shopping expense can be minimized by purchasing some items in Santa Barbara and by purchased the remaining items in Mammoth.

States 1-12 of FIG. 36. Normal system installation and operational usage procedures are repeated from example embodiment 1 above. The user registers for the service, optionally downloads client software and/or a widget to the user's desktop PC and/or mobile phone, and logs purchases into the SA system 1000 by scanning receipts.

State 13 of FIG. 41. The user is interested in comparing the prices of items to be purchased in Santa Barbara, Calif. and Mammoth, Calif. The user accesses the SA system by clicking the Groceries tab 5400 in their SA widget 5000 (see FIG. 5).

State 14. The SA server 800 receives the user request (optionally including any necessary authentication credentials), logs the user into their account, opens a new browser on the user's PC 100, and displays the default list of grocery items for the user to review, see FIG. 12.

State 15. The user reviews the grocery list 12300, makes appropriate list changes (none in this example), and requests to advance to the next phase of analysis by clicking the "On to Step 2" control 12600.

State 16. The SA server 800 receives the user request and analyzes the selected item prices across several local retailers (e.g., those retailers frequented by a user) and presents a summary cost of seven (default in this example) local retailers in a web page, see FIG. 15. The SA system 1000 optionally selects the lowest cost retailer 15310.

State 17. The user selects the Advanced Compare control 15520, see FIG. 15.

State 18. The SA server 800 receives the user selection and displays a new web page with Advanced Comparison options (see FIG. 24).

State 19. In this example, the user selects the geographic price comparison control 24310, see FIG. 24.

State 20. The SA server 800 receives the user selection request and displays a new web page, similar to FIG. 15 but with two new location selection controls 25300 and 25400, see FIG. 25.

State 21. The user selects the pull down menu control 25320 to determine if the Mammoth, Calif. location had been previously entered as a search request and stored in the SA system 1000.

State 22. The SA server 800 receives the user selection request and displays a list of optional distance locations from the user's residence and other previously entered locations 25330, see FIG. 25. In this example, the user had not previously entered Mammoth Calif. and is therefore not an option in the pulldown menu.

State 23. The user types in "Mammoth, Calif., 93546" into the text box location control 26300 and selects the search or activate control 26310, see FIG. 26.

State 24. The SA server 800 receives the selected location search query request from the user. In this example, the SA system 1000 has access to one or more merchant pricing databases. The SA server 800 queries the local merchant databases for the pricing of the items selected by the user.

State 25. The SA system 1000 receives the pricing results from the local merchant database along with item availability.

States 26. In this example, since the user has not scanned any Mammoth shopping receipts or configured their personal profile with specific merchants in the area, the SA server 800 displays the top 7 (configurable default) 27510 merchants as frequented by users of the SA system in which the shopping list items can be purchased. In this example, the system further determines that purchasing some items in Santa Barbara and other items in Mammoth will reduce the user's overall cost as compared to purchasing the items from a single merchant in Santa Barbara. The SA server 800 displays the results to the user. In this example, the optimal cost 27520 is $16.61, a $4.64 savings as compared to visiting a single merchant in Santa Barbara (e.g., Organic Calle Real) where the optimal cost 25510 of a single merchant visit is $21.25, see FIG. 25. As illustrated in this example, the lowest cost is shown by visiting a merchant in Santa Barbara, Calif. (e.g., Organic Calle Real) 27410 and Mammoth, Calif. (Big Box Mammoth) 27310.

State 27. The user is satisfied with the expected cost results and previews the grocery lists by selecting the preview list control 27600, see FIG. 27.

State 28. The SA server 800 receives the request and displays two merchant shopping lists 28400 and 28300, item pricing 28420 and 28320, and expected shopping costs at each merchant 28430 and 28330, see FIG. 28. The user prints the shopping lists by selecting the print control 28600.

Fourth Example Embodiment

Figure 42:
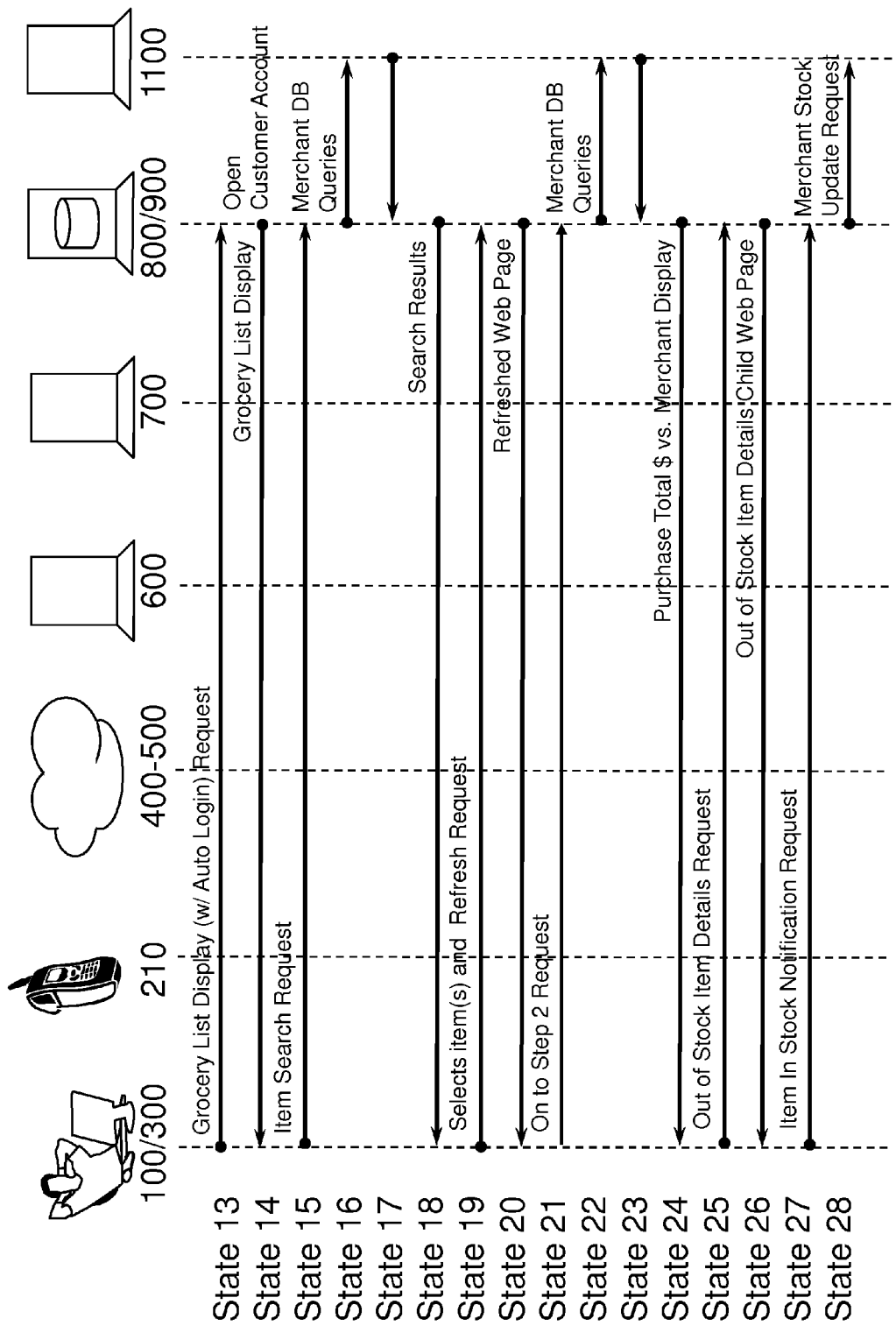
FIG. 42 illustrates states thirteen through twenty-eight of a fourth example operating environment/process for a Shopping Assistant system.
Figure 43:
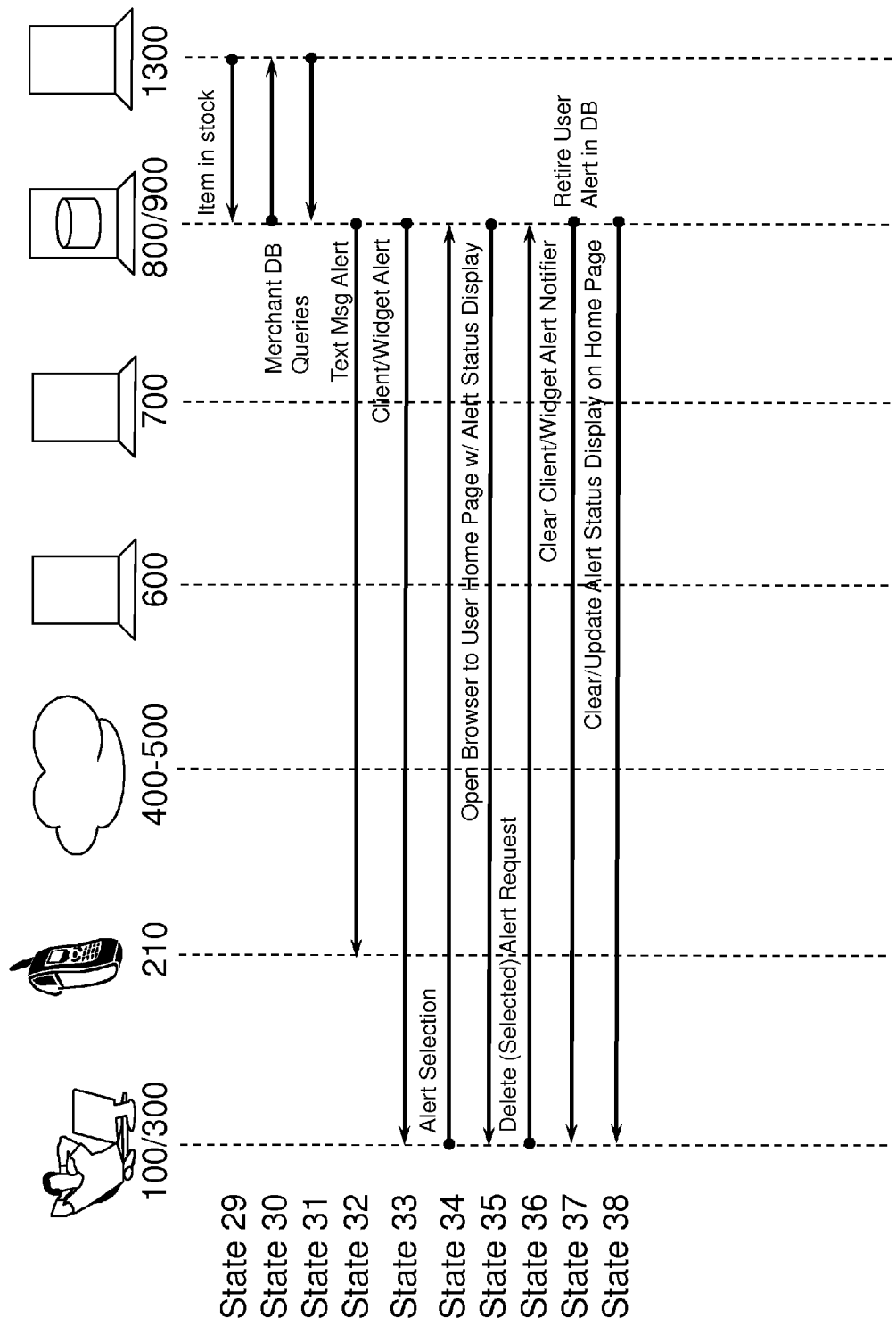
FIG. 43 illustrates states twenty-nine through thirty-eight of a fourth example operating environment/process for a Shopping Assistant system.

See FIG. 42-43

In this example embodiment, the user is interested in purchasing a particular type of water proof sunscreen called "Surf Sunscreen". The user utilizes the Shopping Assistant to locate a merchant that carries the item. In this example, the user wants to purchase the item at the lowest cost price but the item is currently out-of-stock. The user configures a notification to alert him when the item is back in stock at the lowest cost retailer.

States 1-12 of FIG. 36. Normal system installation and operational usage procedures are repeated from example embodiment 1 above. The user registers for the service and optionally downloads client software and/or a widget to the user's desktop PC and/or mobile phone (see states 1-7). Additionally, the user then repetitively logs their purchase receipts into the SA system (see states 8-12).

State 13 of FIG. 42. The user is interested in purchasing a special type of water proof sunscreen labeled "Surf Sunscreen". The user accesses their SA account by clicking the Groceries tab 5400 on their Shopping Assistant widget display 5000 (see FIG. 5).

State 14. Upon receipt of the list display request (optionally, authentication credentials are included with the request), the SA server 800 logs the user into their account, retrieves their default grocery list and returns a web page display of the list information.

State 15. In this example the user is interested in only one item. The user types in the keywords "Surf Sunscreen" into the search window 29261 and activates the search by selecting the magnifying glass search control 29262, see FIG. 29.

States 16. The SA server 800 receives the user's search request, and queries one or more internal or external databases. In this example, the SA server 800 queries one or more external merchant databases 1100 for the item "Surf Sunscreen".

State 17. In this example, the merchants return results for the requested query to the SA system 1000.

State 18. The SA system 1000 analyzes the results, and in this example, displays 3 search match results 29300 corresponding to the search keywords entered by the user, see FIG. 29.

State 19. The user selects Surf Sunscreen XYZ manufacturer by checking its corresponding web control box 30310 and unselects the other grocery list items listed on the web page by unchecking their associated web control boxes 30410, see FIG. 30. The user removes the unchecked items from the display by selecting the "Refresh" control 30610, see FIG. 30.

State 20. The SA server 800 receives the refresh page request and in this example embodiment redisplays the web page. In this example, the unselected grocery items (30410 in FIG. 30) have been removed and the item selected from the search results 30310, see FIG. 30, replaces the grocery list items 30400 in FIG. 30, the search results (30300 in FIG. 30) is removed from the display, the count of the number of list items is updated 31510, and the user entered keyword 31261 is removed from the search box, see FIG. 31.

State 21. The user selects the "On to Step 2" control 31620, see FIG. 31.

States 22. The SA server 800 receives the user request. In this example, the SA system 1000 has access to one or more merchant pricing databases. The SA server 800 queries the local merchant 1100 databases for the pricing of the item "Surf Sunscreen" 31300 selected by the user, see FIG. 31.

State 23. The SA system 1000 receives the pricing results from the local merchant database along with item availability.

State 24. The SA system 1000 displays the list of merchants and the associated expected costs 32400. The SA system optionally preselects the lowest cost merchant 32410, see FIG. 32. Optionally, out of stock items are flagged with a note 32300 in the displayed list, see FIG. 32.

State 25. The user notices that the merchant with the lowest price 32410 is out of stock 32310, see FIG. 32. The user does not need to purchase the item immediately, so the user double clicks on the control "1—Item Out of Stock" 32310 which is a link to a new page.

State 26. The SA server 800 receives the user selection request and in response opens a new child browser 33000 providing additional detail on the out-of-stock sunscreen item, see FIG. 33. Optionally, the SA server 800 provides the name of the out-of-stock item 33100, the expected restocking period 33200 (or date) optionally determined by querying the merchant database or from historical restocking periods of similar items at the merchant (or similar merchants), and a control 33300 to configure a notification when the item is restocked, see FIG. 33.

State 27. The user selects the notify option 33300, see FIG. 33.

State 28. The SA server 800 receives the user notification request and in response configures a notification event to occur when the restocking of the sunscreen at the particular merchant occurs. The SA server 800 requests a notification message from the merchant's Database server 1100 when the item has been restocked. Alternatively, the SA server 800 can poll the merchant's Database server 1100 periodically to detect the end of the out of stock condition. The SA server 800 can also periodically query for sales and/or price reductions at other local merchants at this same time. Alternatively, the SA server 800 can detect when a user of the SA system 1000 purchases the item at the merchant.

State 29 of FIG. 43. Five days later the merchant restocks the formerly out of stock item and updates their inventory database 1100. In this example, this causes the merchant server to send a notification to the SA server 800.

States 30. Upon receipt of the restocking notification message the SA server 800 queries one or more merchant databases in this example to determine if the item (Surf Sunscreen) is still being sold at or lower than the price of other local merchants.

State 31. The SA server receives the database query results and determines that the notifying merchant is the lowest cost retailer from the user's seven (default) frequented merchants.

State 32. The SA server 800 optionally sends a text message notification 34000 to the user's phone 210, alerting the user to the fact that the Surf sunscreen is now available at "Organic Calle Real" at a price of $6.33, see FIG. 34.

State 33. Optionally, the user's SA widget 5000 alert indicator 5200 is activated, see FIG. 5.

State 34. The user notices the flashing SA widget alert indicator 5200 on the user's desktop PC and clicks the alert control 5210, see FIG. 5.

State 35. The SA server 800 receives the request (optionally, the request includes authentication credentials), auto-logs the user into their SA account, causes a new browser to open on the user's PC 100 desktop, and displays the user's SA welcome/home page 11000, see FIG. 11. The Alert Status window 11500 displays the notification that the item Surf sunscreen 11300 is now available at "Organic Calle Real" at a price of six dollars and 33 cents 11400, see FIG. 11.

State 36. The user selects the alert using the Alert selection check box 11710 and then clicks the delete control 11720.

State 37. The SA server 800 receives the request and changes the state of the user's alert status in the SA database 900 to off. The SA server 800 then clears the alert indicator 5200 in the widget 5000, see FIG. 5.

State 38. Finally, the SA server 800 clears the alert from the home page Alert Status window 35500 and displays the message "You Have No New Alerts" 35510, see FIG. 35.

What is claimed is:

1. A method of processing user transactions in a data network comprising:

receiving at a user transaction processing system coupled to at least one data network, a first list of purchased items purchased from a first merchant by a first user wherein the first list of purchased items includes associated item transaction information;

recording in computer readable memory, the first list of purchased items purchased from the first merchant by the first user;

receiving at the user transaction processing system coupled to at least one data network, a second list of purchased items purchased from a second merchant by the first user wherein the second list of purchased items includes associated item transaction information;

recording in computer readable memory, the second list of purchased items purchased from the second merchant by the first user;

providing by the user transaction processing system, a first list of items to be purchased generation instruction to the first user prior to receiving the first list of items to be purchased generation instruction from the first user wherein the first list of items to be purchased generation instruction directs the first user regarding how to provide the first list of items to be purchased generation instruction;

receiving at the user transaction processing system, the generation instruction from the first user;

generating by a user transaction processing system computing device, a first list of items to be purchased by the first user based at least in part on the recorded first and second lists of purchased items by the first user;

transmitting over the data network to the first user, the first list of items to be purchased by the first user;

receiving at the user transaction processing system coupled to at least one data network, a third list of purchased items purchased from the first, the second, or a third merchant by a second user wherein the third list of purchased items includes associated item transaction information and the third merchant is different than the first merchant and the second merchant;

recording in computer readable memory, the third list of purchased items purchased from the first, second, or third merchant by the second user;

comparing by the computing device, the transaction information for items on the first list of items to be purchased by the first user wherein the comparison is based at least in part on the third list of purchased items;

generating by the computing device, a second list of items to be purchased by the first user based at least in part on the comparison wherein the second list includes one or more merchant identifiers for each item;

and, transmitting from the computing device to the first user over the data network, the second list of items to be purchased by the first user.

2. The method as defined in claim 1, wherein the first list of purchased items is received from the first merchant's stored customer purchase transactions associated with the first user.

3. The method as defined in claim 1, wherein the generation of the first list of items to be purchased is based at least in part on repeat items purchased.

4. The method as defined in claim 1, further comprising notifying the first user by the user computing device when previously out-of-stock items become in-stock at the first, second, or third merchants.

5. The method as defined in claim 1, further comprising selecting by the computing device which merchants to include in the transaction information comparison based at least in part on the first user's location.

6. The method as defined in claim 5, wherein the first user's location is determined based at least in part on the user's GPS coordinates.

7. The method as defined in claim 1, further comprising specifying by the first user which merchants to include in the transaction information comparison based at least in part on one or more locations wherein the one or more specified locations may or may not be local to each other.

8. The method as defined in claim 1, wherein the transaction information comparison includes discounts the first user could receive as a member of the merchant's customer loyalty program.

9. The method as defined in claim 1, wherein the transaction information comparison includes rewards points the first user could receive as a member of the merchant's customer loyalty program.

10. The method as defined in claim 1, wherein the transaction information comparison includes travel costs the first user would incur to travel to the merchant.

11. The method as defined in claim 1, wherein the transaction information comparison includes travel and shopping time the first user would incur to travel and shop at the merchant.

12. The method as defined in claim 1, wherein the third list of purchased items is received from the associated merchant's stored customer transactions associated with the second user.

13. The method as defined in claim 1, wherein one of the merchant identifiers is the identifier for the operator of the user transaction processing system.

14. The method as defined in claim 1, wherein one of the merchant identifiers is the identifier for a preferred provider of the user transaction processing system.

15. The method as defined in claim 1, wherein one of the merchant identifier's is the identifier for a merchant that delivers the item to be purchased to the first user.

16. The method as defined in claim 1, wherein one of the merchant identifiers is the identifier for a merchant that ships the item to be purchased to the first user.

17. The method as defined in claim 1, wherein the second user is a plurality of users other than the first user.

18. A method of processing user transactions in a data network comprising:
  receiving at a user transaction processing system coupled to at least one data network, a first list of purchased items purchased from a first merchant by a first user wherein the first list of purchased items includes associated item transaction information;
  recording in computer readable memory, the first list of purchased items purchased from the first merchant by the first user;
  receiving at the user transaction processing system coupled to at least one data network, a second list of purchased items purchased from a second merchant by the first user wherein the second list of purchased items includes associated item transaction information;
  recording in computer readable memory, the second list of purchased items purchased from the second merchant by the first user;
  providing by the user transaction processing system, a first list of items to be purchased generation instruction to the first user prior to receiving the first list of items to be purchased generation instruction from the first user wherein the first list of items to be purchased generation instruction directs the first user regarding how to provide the first list of items to be purchased generation instruction;
  receiving at the user transaction processing system, the generation instruction from the first user;
  generating by a user transaction processing system computing device, a first list of items to be purchased by the first user based at least in part on the recorded first and second lists of purchased items by the first user;
  transmitting over the data network to the first user, the first list of items to be purchased by the first user;
  receiving at the user transaction processing system coupled to at least one data network, a third list of purchased items purchased from the first, the second, or a third merchant by a second user wherein the third list of purchased items includes associated item transaction information and the third merchant is different than the first merchant and the second merchant;
  recording in computer readable memory, the third list of purchased items purchased from the first, second, or third merchant by the second user;
  comparing by the computing device, the transaction information for items on the first list of items to be purchased by the first user wherein the comparison includes item pricing based at least in part on the third list of purchased items;
  generating by the computing device, a second list of items to be purchased by the first user based at least in part on the comparison wherein the second list includes one or more merchant identifiers for each item;
  and, transmitting from the computing device to the first user over the data network the second list of items to be purchased by the first user.

19. A method of processing user transactions in a data network comprising:
  receiving at a user transaction processing system coupled to at least one data network, a first list of purchased items purchased from a first merchant by a first user wherein the first list of purchased items includes associated item transaction information;
  recording in computer readable memory, the first list of purchased items purchased from the first merchant by the first user;
  receiving at the user transaction processing system coupled to at least one data network, a second list of purchased items purchased from a second merchant by the first user wherein the second list of purchased items includes associated item transaction information;
  recording in computer readable memory, the second list of purchased items purchased from the second merchant by the first user;
  providing by the user transaction processing system, a first list of items to be purchased generation instruction to the first user prior to receiving the first list of items to be purchased generation instruction from the first user wherein the first list of items to be purchased generation instruction directs the first user regarding how to provide the first list of items to be purchased generation instruction;
  receiving at the user transaction processing system, the generation instruction from the first user;
  generating by a user transaction processing system computing device, a first list of items to be purchased by the first user based at least in part on the recorded first and second lists of purchased items by the first user;
  transmitting over the data network, to the first user the first list of items to be purchased by the first user;
  receiving at the user transaction processing system coupled to at least one data network, a third list of purchased items purchased from the first, the second, or a third merchant by a second user wherein the third list of purchased items includes associated item transaction information and the third merchant is different than the first merchant and the second merchant;
  recording in computer readable memory, the third list of purchased items purchased from the first, second, or third merchant by the second user;
  comparing by the computing device, the transaction information for items on the first list of items to be purchased by the first user wherein the comparison includes item pricing and item availability based at least in part on the third list of purchased items;
  generating by the computing device, a second list of items to be purchased to be purchased by the first user based at least in part on the comparison wherein the second list includes one or more merchant identifiers for each item;
  and, transmitting from the computing device, to the first user over the data network the second list of items to be purchased by the first user.

20. A system for processing user transactions in a data network comprising:
  one or more processing devices;
  instructions stored in non-transitory computer readable memory that, when executed by the one or more processing devices, cause the system to perform operations comprising:
  receiving a first list of purchased items purchased from a first merchant by a first user wherein the first list of purchased items includes associated item transaction information;

recording the first list of purchased items purchased from the first merchant by the first user;

receiving a second list of purchased items purchased from a second merchant by the first user wherein the second list of purchased items includes associated item transaction information;

recording the second list of purchased items purchased from the second merchant by the first user;

providing a first list of items to be purchased generation instruction to the first user prior to receiving the first list of items to be purchased generation instruction from the first user wherein the first list of items to be purchased generation instruction directs the first user regarding how to provide the first list of items to be purchased generation instruction;

receiving the generation instruction from the first user;

generating a first list of items to be purchased by the first user based at least in part on the recorded first and second lists of purchased items by the first user;

transmitting over the data network to the first user, the first list of items to be purchased by the first user;

receiving a third list of purchased items purchased from the first, the second, or a third merchant by a second user wherein the third list of purchased items includes associated item transaction information and the third merchant is different than the first merchant and the second merchant;

recording the third list of purchased items purchased from the first, second, or third merchant by the second user;

comparing the transaction information for items on the first list of items to be purchased by the first user wherein the comparison is based at least in part on the third list of purchased items;

generating a second list of items to be purchased by the first user based at least in part on the comparison wherein the second list includes one or more merchant identifiers for each item;

and, transmitting to the first user over the data network, the second list of items to be purchased by the first user.

* * * * *